(12) United States Patent
Kilian et al.

(10) Patent No.: US 11,817,897 B2
(45) Date of Patent: Nov. 14, 2023

(54) SYNCHRONIZATION BEACON

(71) Applicants: Fraunhofer-Gesellschaft zur Förderung der angewandten Forschung e.V., Munich (DE); Friedrich-Alexander-Universitaet Erlangen-Nuernberg, Erlangen (DE)

(72) Inventors: Gerd Kilian, Erlangen (DE); Josef Bernhard, Erlangen (DE); Frank Obernosterer, Nuremberg (DE); Raimund Meyer, Fürth (DE); Johannes Wechsler, Erlangen (DE); Jakob Kneißl, Erlangen (DE); Dominik Soller, Erlangen (DE); Jörg Robert, Uttenreuth (DE)

(73) Assignees: FRAUNHOFER-GESELLSCHAFT ZUR FÖRDERUNG DER ANGEWANDTEN FORSCHUNG E.V., Munich (DE); FRIEDRICH-ALEXANDER-UNIVERSITAET ERLANGEN-NUERNBERG, Erlangen (DE)

(*) Notice: Subject to any disclaimer, the term of this patent is extended or adjusted under 35 U.S.C. 154(b) by 0 days.

(21) Appl. No.: 17/189,444

(22) Filed: Mar. 2, 2021

(65) Prior Publication Data
US 2021/0194538 A1 Jun. 24, 2021

Related U.S. Application Data

(63) Continuation of application No. PCT/EP2019/073168, filed on Aug. 30, 2019.

(30) Foreign Application Priority Data

Sep. 6, 2018 (DE) .................. 10 2018 215 193.8

(51) Int. Cl.
*H04B 1/7156* (2011.01)
*H04B 1/7143* (2011.01)

(52) U.S. Cl.
CPC ......... *H04B 1/7156* (2013.01); *H04B 1/7143* (2013.01); *H04B 2001/71563* (2013.01); *H04B 2001/71566* (2013.01)

(58) Field of Classification Search
CPC .... H04B 1/713; H04B 1/7143; H04B 1/7156; H04B 2001/71563; H04B 2001/71566;
(Continued)

(56) References Cited

U.S. PATENT DOCUMENTS 6,208,635 B1 * 3/2001 Altvater ................. H04L 5/06
375/293
9,354,081 B2 5/2016 Bernhard et al.
(Continued)

FOREIGN PATENT DOCUMENTS

DE 102011082098 A1 3/2013
DE 102017204186 A1 9/2018
(Continued)

OTHER PUBLICATIONS

A. A. Tabassam et al.: "Bluetooth Clock Recovery and Hop Sequence Synchronization Using Software Defined Radios", Region 5 Conference, 2008 IEEE, IEEE, Piscataway, NJ, USA, Apr. 17, 2008; p. 1-5, XP031285302,ISBN: 978-1-4244-2076-6.
(Continued)

*Primary Examiner* — Young T. Tse
(74) *Attorney, Agent, or Firm* — McClure, Qualey & Rodack, LLP

(57) ABSTRACT

Embodiments provide a terminal point of a communication system, wherein a control signal is emitted in the communication system for coordinating the participants of the communication system, wherein the control signal is trans-
(Continued)

ferred distributed in correspondence with a frequency hop-based occupancy of resources of the frequency band, indicated by a control signal hopping pattern, wherein the terminal point has a receiver, wherein a receive bandwidth of the receiver is smaller at least by the factor 3 than a bandwidth of the frequency hop-based occupancy of resources of the frequency band, indicated by the control signal hopping pattern, wherein the terminal point is configured to receive a reference signal, the reference signal having information on the control signal, wherein the terminal point is configured to receive the control signal based on the information on the control signal.

67 Claims, 37 Drawing Sheets

(58) Field of Classification Search
CPC ... H04L 1/0041; H04L 1/0045; H04L 1/0071; H04L 1/0072; H04L 5/0048
USPC .......... 375/132–137; 370/336, 343, 345, 350
See application file for complete search history.

(56) References Cited

U.S. PATENT DOCUMENTS

| | | |
|---|---|---|
| 2002/0080769 A1 | 6/2002 | Spencer et al. |
| 2003/0060206 A1* | 3/2003 | Sointula ............... H04W 16/14 455/450 |
| 2006/0013285 A1* | 1/2006 | Kobayashi .......... H04B 1/7143 375/E1.035 |
| 2008/0198902 A1* | 8/2008 | Malladi .................. H04B 7/12 375/E1.035 |
| 2018/0227011 A1 | 8/2018 | Yerramalli et al. |
| 2019/0253101 A1 | 4/2019 | Kilian et al. |
| 2019/0394636 A1 | 12/2019 | Kilian et al. |

FOREIGN PATENT DOCUMENTS

| | | | |
|---|---|---|---|
| DE | 10201622883 | 12/2019 | |
| DE | 102018210245 A1 | 12/2019 | |
| EP | 2151928 A1 | 2/2010 | |
| EP | 3220696 A1 | 9/2017 | |
| WO | WO-2018077770 A2 * | 5/2018 | ........... H04B 1/7143 |
| WO | WO-2019037726 A1 * | 2/2019 | ............. H04B 1/713 |
| WO | 2019243466 A1 | 12/2019 | |

OTHER PUBLICATIONS

B. S. Peterson et al.: "Bluetooth Inquiry Time Characterization and Selection", IEEE Transactions on Mobile Computing, IEEE Service Center, Los Alamitos, CA, US, vol. 5, No. 9, Sep. 1, 2006, pp. 1173-1187, XP001546026,ISSN: 1536-1233, DOI: 10.1109/TMC.2006.125.

T. Thamrin et al.: "The Inquiry and Page Procedure in Bluetooth Connection", Soft Computing and Pattern Recognition, 2009. SOCPAR '09. International Conference of, IEEE, Piscataway, NJ, USA, Dec. 4, 2009, pp. 218-222, XP031593782, ISBN: 978-1-4244-5330-6.

G. Kilian et al.: "Improved coverage for low-power telemetry systems using telegram splitting," in Proceedings of 2013 European Conference on Smart Objects, Systems and Technologies (SmartSysTech), 2013.

G. Kilian et al.: "Increasing Transmission Reliability for Telemetry Systems Using Telegram Splitting," IEEE Transactions on Communications, vol. 63, No. 3, pp. 949-961, Mar. 2015.

International Search Report and Written Opinion, dated Nov. 27, 2019, from PCT/EP2019/073168.

English Translation of International Search Report and Written Opinion, dated Nov. 27, 2019, from PCT/EP2019/073168.

Written Opinion, dated Nov. 17, 2020, from PCT/EP2019/073168.

IEEE Std. 802.15.5—2015—IEEE Standard for Low-Rate Wireless Networks, 2015.

International Preliminary Examination Report on Patentability (English translation), in PCT/EP2019/03168, dated Jan. 28, 2021.

* cited by examiner

| application cases | $T_{frame}$ (ms) | A | $T_{RE}$ (ms) | F | Z | F x Z resource elements per resource frame |
|---|---|---|---|---|---|---|
| latency-critical (battery-operated) | 360 | 0.33 | 15 | 1 | 8 | 8 |
| latency-critical (power supply network) | 480 | 0.50 | 15 | 5 | 16 | 80 |
| interference-robust (battery-operated) | 9000 | 0.10 | 30 | 1 | 30 | 30 |
| interference-robust (power supply network) | 9000 | 0.33 | 30 | 10 | 100 | 1000 |

Fig. 24

SYNCHRONIZATION BEACON

CROSS-REFERENCE TO RELATED APPLICATIONS

This application is a continuation of copending International Application No. PCT/EP2019/073168, filed Aug. 30, 2019, which is incorporated herein by reference in its entirety, and additionally claims priority from German Application No. 10 2018 215 193.8, filed Sep. 6, 2018, which is also incorporated herein by reference in its entirety.

BACKGROUND OF THE INVENTION

Embodiments of the present invention relate to a terminal point and a base station of a communication system which communicates wirelessly in a frequency band used for communication by a plurality of communication systems. Further embodiments relate to methods for operating a terminal point and a base station of such a communication system. Some embodiments relate to a synchronization (sync) beacon.

The telegrams splitting method is known from [1], according to which a telegram (or data packet) is split onto a plurality of sub-data packets which are transferred distributed in time and, optionally, in frequency using a hopping pattern.

An improved range for LPWAN (Low-Power Wide Area Network) systems which make use of the telegram splitting method is described in [3].

An improved transfer security for LPWAN systems which make use of the telegram splitting method is described in [4].

In telegram splitting-based communication systems, very broad-banded signals are used due to the used hopping pattern based on which the sub-data packets are transferred distributed in time and frequency. New participants to be introduced in such a communication system do not know the hopping patterns used in the communication system. Additionally, due to crystal tolerances, new participants to be introduced do not know the precise frequency position of the signals or time occurrence of the signals, so that full search for the signals in time and frequency is entailed.

Low-cost battery-operated participants, like sensor nodes, however, usually comprise a receiver the receive bandwidth of which is considerably narrower than the bandwidth across which the signals used in telegram splitting-based communication systems extend due to the hopping patterns used. Additionally, in such low-cost battery-operated participants, the computing power available is adjusted to the receive bandwidth of the receiver.

This means that no way of registering (or logging in) in such a network is available for a low-cost participant.

Thus, the object underlying the present invention is providing a concept allowing participants which have at their disposal only a small receive bandwidth and/or restricted computing power to register in in a communication system which uses high a signal bandwidth for communication.

SUMMARY

An embodiment may have a terminal point of a communication system, wherein a control signal is emitted in the communication system for coordinating the participants of the communication system, the control signal being transferred distributed in correspondence with a frequency hop-based occupancy of resources of the frequency band, indicated by a control signal hopping pattern, wherein the terminal point has a receiver, wherein a receive bandwidth of the receiver is smaller by at least the factor 3 than a bandwidth of the frequency hop-based occupancy of resources of the frequency band, indicated by the control signal hopping pattern; wherein the terminal point is configured to receive a reference signal, wherein the reference signal has information on the control signal, wherein the terminal point is configured to receive the control signal based on the information on the control signal, wherein the information on the control signal, which have the reference signal, have information on the control signal hopping pattern or information on the resources of the frequency band usable by the communication system for transferring the control signal, wherein the reference signal is transferred in a predetermined frequency range of the frequency band, wherein the reference signal has a plurality of partial reference data packets which contain the information on the control signal, wherein the reference signal is transferred in correspondence with a reference hopping pattern, wherein the reference hopping pattern indicates a frequency hop and/or time hop-based occupancy of resources of the predetermined frequency range, wherein the terminal point is configured to receive the reference signal in correspondence with the reference hopping pattern to obtain at least a part of the plurality of partial reference data packets sufficient for decoding. Another embodiment may have a base station of a communication system, wherein the base station is configured to transmit a control signal for coordinating the participants of the communication system, wherein the control signal is transferred distributed in correspondence with a frequency hop-based occupancy of resources of the frequency band, indicated by a control signal hopping pattern, wherein the base station is configured to transmit a reference signal in a predetermined frequency range of the frequency band, wherein the reference signal has information on the control signal, wherein the predetermined frequency range is smaller by at least the factor 3 than a frequency range of the frequency band in which the control signal is transferred distributed in correspondence with the control hopping pattern, wherein the information on the control signal, which have the reference signal, have information on the control signal hopping pattern or information on the resources of the frequency band usable by the communication system for transferring the control signal, wherein the base station is configured to provide the reference signal with a plurality of partial reference data packets which contain the information on the control signal, wherein the base station is configured to transmit the reference signal in correspondence with a reference signal hopping pattern, wherein the reference signal hopping pattern indicates a frequency hop and/or time hop-based occupancy of resources of the predetermined frequency range.

According to another embodiment, a communication system may have: an inventive terminal point as mentioned above, and an inventive base station as mentioned above.

According to another embodiment, a method for operating a terminal point of a communication system, wherein a control signal is emitted in the communication system for coordinating the participants of the communication system, wherein the control signal is transferred distributed in correspondence with a frequency hop-based occupancy of resources of the frequency band, indicated by a control signal hopping pattern, wherein the terminal point has a receiver, wherein a receive bandwidth of the receiver is smaller by at least the factor 3 than a bandwidth of the frequency hop-based occupancy of resources of the frequency band, indicated by the control signal hopping pattern, may have the steps of: receiving a reference signal, wherein the reference signal has information on the control signal, and receiving the control signal based on the information on the control signal, wherein the information on the control signal, which have the reference signal, have information on the control signal hopping pattern or information on the resources of the frequency band usable by the communication system for transferring the control signal, wherein the reference signal is transferred in a predetermined frequency range of the frequency band, wherein the reference signal has a plurality of partial reference data packets which contain the information on the control signal, wherein the reference signal is transferred in correspondence with a reference hopping pattern, wherein the reference hopping pattern indicates a frequency hop and/or time hop-based occupancy of resources of the predetermined frequency range, wherein the terminal point is configured to receive the reference signal in correspondence with the reference hopping pattern to obtain at least a part of the plurality of partial reference data packets sufficient for decoding.

According to still another embodiment, a method for operating a base station of a communication system may have the steps of: transmitting a control signal for coordinating the participants of the communication system, wherein the control signal is transferred distributed in correspondence with a frequency hop-based occupancy of resources of the frequency band, indicated by a control signal hopping pattern, transmitting a reference signal in a predetermined frequency range of the frequency band, wherein the reference signal has information on the control signal, wherein the predetermined frequency range is smaller by at least the factor 3 than a frequency range of the frequency band in which the control signal is transferred distributed in correspondence with the control hopping pattern, wherein the information on the control signal, which have the reference signal, have information on the control signal hopping pattern or information on the resources of the frequency band usable by the communication system for transferring the control signal, wherein the reference signal is provided with a plurality of partial reference data packets which contain the information on the control signal, wherein the reference signal is transferred in correspondence with a reference signal hopping pattern, wherein the reference hopping pattern indicates a frequency hop and/or time hop-based occupancy of resources of the predetermined frequency range.

Another embodiment may have a non-transitory digital storage medium having stored thereon a computer program for performing a method for operating a terminal point of a communication system, wherein a control signal is emitted in the communication system for coordinating the participants of the communication system, wherein the control signal is transferred distributed in correspondence with a frequency hop-based occupancy of resources of the frequency band, indicated by a control signal hopping pattern, wherein the terminal point has a receiver, wherein a receive bandwidth of the receiver is smaller by at least the factor 3 than a bandwidth of the frequency hop-based occupancy of resources of the frequency band, indicated by the control signal hopping pattern, the method having the steps of: receiving a reference signal, wherein the reference signal has information on the control signal, receiving the control signal based on the information on the control signal, wherein the information on the control signal, which have the reference signal, have information on the control signal hopping pattern or information on the resources of the frequency band usable by the communication system for transferring the control signal, wherein the reference signal is transferred in a predetermined frequency range of the frequency band, wherein the reference signal has a plurality of partial reference data packets which contain the information on the control signal, wherein the reference signal is transferred in correspondence with a reference hopping pattern, wherein the reference hopping pattern indicates a frequency hop and/or time hop-based occupancy of resources of the predetermined frequency range, wherein the terminal point is configured to receive the reference signal in correspondence with the reference hopping pattern to obtain at least a part of the plurality of partial reference data packets sufficient for decoding, when said computer program is run by a computer.

Another embodiment may have a non-transitory digital storage medium having stored thereon a computer program for performing a method for operating a base station of a communication system, the method having the steps of: transmitting a control signal for coordinating the participants of the communication system, wherein the control signal is transferred distributed in correspondence with a frequency hop-based occupancy of resources of the frequency band, indicated by a control signal hopping pattern, transmitting a reference signal in a predetermined frequency range of the frequency band, wherein the reference signal has information on the control signal, wherein the predetermined frequency range is smaller by at least the factor 3 than a frequency range of the frequency band in which the control signal is transferred distributed in correspondence with the control hopping pattern, wherein the information on the control signal, which have the reference signal, have information on the control signal hopping pattern or information on the resources of the frequency band usable by the communication system for transferring the control signal, wherein the reference signal is provided with a plurality of partial reference data packets which contain the information on the control signal, wherein the reference signal is transferred in correspondence with a reference signal hopping pattern, wherein the reference hopping pattern indicates a frequency hop and/or time hop-based occupancy of resources of the predetermined frequency range, when said computer program is run by a computer.

Embodiments provide a terminal point of a communication system, wherein a control signal is emitted in the communication system [like a base station of the communication system, for example] for coordinating the participants of the communication system, the control signal being transferred distributed in correspondence with a frequency hop-based [and time hop-based] occupancy of resources of the frequency band, indicated by a control signal hopping pattern, wherein the terminal point comprises a receiver, wherein a receive bandwidth of the receiver is smaller by at least the factor 3 than a bandwidth of the frequency hop-based [and, for example, time hop-based] occupancy of resources of the frequency band, indicated by the control signal hopping pattern, wherein the terminal point is configured to receive a reference signal [like synchronization signal, for example], wherein the reference signal comprises information on the control signal, wherein the terminal point is configured to receive the control signal based on the information on the control signal.

In embodiments, the reference signal can be transferred in a predetermined frequency range [like one or more frequency channels] of the frequency band.

In embodiments, a receive bandwidth of the receiver can be smaller by at least the factor 5 than a bandwidth of the frequency hop-based occupancy of resources of the frequency band, indicated by the control signal hopping pattern.

In embodiments, a receive bandwidth of the receiver can be smaller by at least the factor 10 than a bandwidth of the frequency hop-based occupancy of resources of the frequency band, indicated by the control signal hopping pattern.

In embodiments, the terminal point can be configured to switch a receive frequency of the receiver of the terminal point to the respective resources of the frequency band, indicated by the control signal hopping pattern [like defined by time slots and frequency channels into which the frequency band is split/divided], based on the control signal hopping pattern to receive the control signal.

In embodiments, the information on the control signal, which comprises the reference signal, can comprise information on the control signal hopping pattern or information on the resources of the frequency band usable by the communication system [like base station, for example] for transferring the control signal.

Exemplarily, the information on the control signal hopping pattern can be the control signal hopping pattern itself.

Exemplarily, the control signal hopping pattern can be derivable from the information on the control signal hopping pattern.

Exemplarily, the information on the control signal hopping pattern can be a control signal hopping pattern index which unambiguously identifies the control signal hopping pattern from a set of control signal hopping patterns which different control signal hopping pattern indices are associated to.

Exemplarily, the resources of the frequency band usable by the communication system for transferring the control signal can be predetermined by a channel access pattern, wherein the control signal is transferred, for example, in correspondence with a control signal hopping pattern (=relative channel access pattern) in a subset of the resources indicated by the channel access pattern, for example.

Exemplarily, the information on the resources usable by the communication system for transferring the control signal can describe a state (like PAN counter, for example) of a numerical sequence generator for generating a numerical sequence or a number of a numerical sequence, wherein the numerical sequence determines the channel access pattern. Additionally, the information on the resources usable by the communication system for transferring the control signal can describe an individual piece of information of the communication system (like PAN-ID, for example).

In embodiments, the information on the control signal can comprise information on a time and frequency position of the control signal relative to the reference signal.

In embodiments, the terminal point can be configured to synchronize a timer and/or frequency generator of the terminal point to the reference signal.

In embodiments, the reference signal and the control signal can be temporally mutually synchronized [like exhibit a defined temporal spacing].

In embodiments, the receiver of the terminal point can comprise a receive bandwidth which corresponds to a bandwidth of two to ten directly adjacent frequency channels which the frequency band is divided into.

Exemplarily, a receive bandwidth of the receiver of the terminal point can be as large as a bandwidth of two to four directly adjacent frequency channels, so that the receiver is able to simultaneously receive the two to four frequency channels, for example.

In embodiments, the receiver of the terminal point can comprise a receive bandwidth which corresponds to a bandwidth of two to four directly adjacent frequency channels which the frequency band is divided into.

In embodiments, the receiver of the terminal point can comprise a receive bandwidth of 250 kHz or less.

In embodiments, the receiver of the terminal point can comprise a receive bandwidth of 100 kHz or less.

In embodiments, the terminal point can be battery-operated.

In embodiments, the predetermined frequency range is predetermined fixedly and known to the terminal point.

In embodiments, the predetermined frequency range can comprise at least one frequency channel of the frequency band.

In embodiments, the predetermined frequency range can comprise a plurality of frequency channels, wherein at least two frequency channels of the plurality of frequency channels are spaced apart from one another at most to such an extent that the two frequency channels are within a frequency bandwidth which corresponds to the receive bandwidth of the receiver [wherein at least two frequency channels of the plurality of frequency channels are directly adjacent frequency channels of the frequency band].

Exemplarily, the reference signal can comprise three sub-data packets, wherein the terminal point can be configured to receive at least two of the sub-data packets to decode the contents, and wherein the terminal point can be configured to precisely temporally synchronize, due to the arrangement of the two sub-data packets.

In embodiments, the reference signal [like synchronization signal, for example] can comprise a plurality of partial reference data packets which contain the information on the control signal, wherein the reference signal is transferred in correspondence with a reference hopping pattern, wherein the reference hopping pattern indicates a frequency hop and/or time hop-based occupancy of resources of the predetermined frequency range, wherein the terminal point can be configured to receive the reference signal in correspondence with the reference hopping pattern to obtain at least a part of the plurality of partial reference data packets sufficient for decoding.

In embodiments, a reference data packet [like synchronization data packet, for example] having the information on the control signal can be split into the plurality of partial reference data packets such that each of the partial reference data packets comprises only a part of the reference data packet, wherein the plurality of partial reference data packets can be channel-encoded such that only a subset of the plurality of partial reference data packets is required for successfully decoding the reference data packet, wherein the terminal point can be configured to receive and decode at least a part of the plurality of partial reference data packets to obtain the reference data packet having the information on the control signal.

In embodiments, the predetermined frequency range can comprise one or more partial frequency ranges, wherein the predetermined frequency range can be broader than the receive bandwidth of the receiver of the terminal point, wherein at least as many of the plurality of partial reference data packets are transferred per partial frequency range within the predetermined frequency range in correspondence with the reference hopping pattern as are required for successfully decoding the reference data packet, wherein each of the one or more partial frequency ranges corresponds to the receive bandwidth of the receiver of the terminal point.

In embodiments, the reference signal can be emitted in predetermined distances [like periodically, for example], wherein the reference signal is emitted alternatingly in at least two predetermined partial frequency ranges of the predetermined frequency range known to the terminal point.

In embodiments, the at least two predetermined partial frequency ranges can be spaced apart from one another in frequency to such an extent that inadvertent synchronization, due to a frequency offset, to the respective other predetermined partial frequency range is not possible.

In embodiments, the reference signal can be transferred in correspondence with a reference hopping pattern, wherein the reference hopping pattern indicates a frequency hop and/or time hop-based occupancy of resources of the predetermined frequency range, wherein the resources are defined by frequency channels, wherein at least two adjacent frequency channels of the frequency channels occupied in correspondence with the reference hopping pattern are spaced apart from one another in frequency to such an extent that these do not overlap, not even with a frequency offset [like caused by crystal, for example].

In embodiments, the reference signal can be transferred in correspondence with a reference hopping pattern, wherein the reference hopping pattern indicates a frequency hop and/or time hop-based occupancy of resources of the predetermined frequency range, wherein an occupancy of resources indicated by the reference hopping pattern does not comprise any repetitive identical distances between the resources in time and/or frequency.

In embodiments, the reference signal can comprise a plurality of partial reference data packets, wherein the at least two of the plurality of partial reference data packets comprise information [like an ID of the communication system, for example] known to the terminal point, wherein the terminal point can be configured to perform synchronization based on the known information.

In embodiments, at least two of the plurality of partial reference data packets can comprise partial synchronization sequences which are known to the terminal point, wherein the terminal point can be configured to perform synchronization based on the partial synchronization sequences and the known information.

In embodiments, within the at least two of the plurality of partial reference data packets, the respective partial synchronization sequence and the respective known information can form virtual synchronization sequences, wherein the terminal point can be configured to perform synchronization based on the virtual synchronization sequences of the at least two [or all] of the plurality of partial reference data packets.

In embodiments, within the at least two of the plurality of partial reference data packets, the respective partial synchronization sequence and the respective known information can comprise a predetermined mutual distance [like follow each other directly or being spaced apart from each other by a predetermined number of symbols].

In embodiments, the communication system can communicate wirelessly in a frequency band which is used for communication by a plurality of communication systems [wherein the communication systems are mutually uncoordinated, for example].

In embodiments, the control signal and/or the reference signal can comprise information on a network-specific channel access pattern, wherein a network-specific channel access pattern indicates a frequency hop and/or time hop-based occupancy of resources of the frequency band, usable for communication of the communication system.

In embodiments, the control signal hopping pattern can (1) be defined fixedly and be the same with each emission of the control signal (like beacon, for example) (the control signal hopping pattern from a repository is, for example, used) or the control signal hopping pattern can (2) be part of the channel access pattern and thus change with each emission of the control signal (like beacon, for example). In the first case, a terminal point can receive the control signal hopping pattern without knowing the state (like counter, for example) of the numerical sequence generator for generating a numerical sequence which determines the channel access pattern, and the individual information of the communication system (like ID, for example). The ID and the current counter for the following channel access pattern are transferred in the control signal hopping pattern. In the second case, the participant, which receives the control signal, already knows the ID and the counter since the channel access pattern is computed from these parameters. In the first case, no information on the ID and the counter have to be present in the reference signal (like synchronization/sync beacon), but in the second case.

In embodiments, the control signal hopping pattern can be a fixed hopping pattern. In this case, the ID (like PAN-ID, for example) and the counter are transferred in the control signal (like data beacon, for example) to signal the channel access pattern for the following data transfer. In embodiments, the control signal hopping pattern can be part of the channel access pattern. In this case, the reference signal contains the ID (like PAN-ID, for example) and the counter. Further data for coordinating or controlling participants (like downlink times for certain nodes, for example) are transferred in the control signal (like data beacon, for example).

In embodiments, the information on the control signal can comprise [like be, for example] information on a network-specific channel access pattern, wherein the network-specific channel access pattern indicates a frequency hop and/or time hop-based occupancy of resources of the frequency band, usable for communication of the communication system, wherein the control signal hopping pattern is a relative channel access pattern, wherein the control signal is transferred in correspondence with the relative channel access pattern in at least a subset of the resources of the frequency band indicated by the channel access pattern.

In embodiments, the control signal can be transferred in correspondence with the relative channel access pattern in the first resources of the resources of the frequency band indicated by the channel access pattern.

In embodiments, the terminal point can be configured to split a data packet ready for transmission [like of the bit transmission layer in the OSI model, for example] into a plurality of sub-data packets which are each shorter than the data packet, and to transmit a data signal which comprises the plurality of sub-data packets, in correspondence with a relative channel access pattern in a subset of the usable frequency hop and/or time hop-based occupancy of resources of the frequency band, indicated by the network-specific channel access pattern.

Further embodiments provide a base station of a communication system, wherein the base station is configured to transmit a control signal [like beacon signal, for example] for coordinating the participants of the communication system, wherein the control signal is transferred distributed in correspondence with a frequency hop-based [and, for example, time hop-based] occupancy of resources of the frequency band, indicated by a control signal hopping pattern, wherein the base station is configured to transmit a reference signal [like synchronization signal, for example], wherein the reference signal comprises information on the control signal, wherein the predetermined frequency range is smaller by at least the factor 3 [like narrower, for example] than a frequency range of the frequency band in which the control signal is transferred distributed in correspondence with the control hopping pattern.

In embodiments, the base station can be configured to transmit the reference signal in a predetermined frequency range [like one or more frequency channels, for example] of the frequency band.

In embodiments, the predetermined frequency range can be adjusted to a receive bandwidth of a receiver of the terminal point, wherein the frequency range of the frequency band in which the control signal is transferred distributed in correspondence with the control signal hopping pattern can be greater by the factor 3 than the predetermined frequency range.

In embodiments, the predetermined frequency range can comprise at least one frequency channel of the frequency band.

In embodiments, the predetermined frequency range can comprise a plurality of frequency channels, wherein at least two frequency channels of the plurality of frequency channels are spaced apart from one another at most to such an extent that the two frequency channels are within one frequency bandwidth which corresponds to a receive bandwidth of a receiver of a terminal point of the communication system [wherein at least two frequency channels of the plurality of frequency channels are directly adjacent frequency channels of the frequency band, for example].

In embodiments, the information on the control signal which comprises the reference signal can comprise information on the control signal hopping pattern or information on the resources of the frequency band usable by the communication system [like base station] for transferring the control signal.

Exemplarily, the information on the control signal hopping pattern can be the control signal hopping pattern itself.

Exemplarily, the control signal hopping pattern can be derivable from the information on the control signal hopping pattern.

Exemplarily, the information on the control signal hopping pattern can be a control signal hopping pattern index which unambiguously identifies the control signal hopping pattern from a set of control signal hopping patterns which different control signal hopping pattern indices are associated to.

Exemplarily, the resources of the frequency band usable by the communication system for transferring the control signal can be predetermined by a channel access pattern, wherein the control signal is, for example, transferred in correspondence with the control signal hopping pattern (=relative channel access pattern) in a subset of the resources indicated by the channel access pattern, for example.

Exemplarily, the information on the resources usable by the communication system for transferring the control signal can describe a state (like PAN counter) of a numerical sequence generator for generating a numerical sequence or a number of a numerical sequence, wherein the numerical sequence determines the channel access pattern.

Additionally, the information on the resources usable by the communication system for transferring the control signal can describe an individual piece of information of the communication system (like PAN-ID, for example).

In embodiments, the information on the control signal can comprise information on a time and frequency position of the control signal relative to the reference signal.

In embodiments, the base station can be configured to transmit the reference signal and the control signal in a temporally mutually synchronized manner [like with a defined mutual temporal spacing].

In embodiments, the base station can be configured to provide the reference signal [like synchronization signal, for example] with a plurality of partial reference data packets which contain the information on the control signal, wherein the base station can be configured to transmit the reference signal in correspondence with a reference signal hopping pattern, wherein the reference signal hopping pattern indicates a frequency hop and/or time hop-based occupancy of resources of the predetermined frequency range.

In embodiments, the base station can be configured to split a reference data packet [like synchronization data packet, for example] having the information on the control signal into the plurality of partial reference data packets so that each of the partial reference data packets comprises only a part of the reference data packet, wherein the plurality of partial reference data packets are channel-encoded so that only a subset of the plurality of partial reference data packets is required for successfully decoding the reference data packet.

In embodiments, the predetermined frequency range can comprise one or more partial frequency ranges, wherein the predetermined frequency range is broader than a receive bandwidth of a receiver of a terminal point of the communication system, wherein the base station is configured to transmit at least as many of the plurality of partial reference data packets per partial frequency range within the predetermined frequency range in correspondence with the reference signal hopping pattern as are required for successfully decoding the reference data packet, wherein each of the one or more partial frequency ranges corresponds to the receive bandwidth of the receiver of the terminal point.

In embodiments, the base station can be configured to transmit the reference signal in predetermined distances [like periodically, for example], wherein the base station can be configured to transmit the reference signal alternatingly in at least two predetermined partial frequency ranges of the predetermined frequency range known to the terminal point.

In embodiments, the at least two predetermined partial frequency ranges can be spaced apart from one another in frequency to such an extent that an inadvertent synchronization, due to a frequency offset, to the respective other predetermined partial frequency range is not possible.

In embodiments, the reference signal can be transferred in correspondence with a reference hopping pattern, wherein the reference hopping pattern indicates a frequency hop and/or time hop-based occupancy of resources of the predetermined frequency range, wherein the resources are defined by frequency channels, wherein at least two adjacent frequency channels of the frequency channels occupied in correspondence with the reference hopping pattern are spaced apart from one another in frequency to such an extent that these do not overlap, not even with a frequency offset [like due to a crystal].

In embodiments, the reference signal can be transferred in correspondence with a reference hopping pattern, wherein the reference hopping pattern indicates a frequency hop and/or time hop-based occupancy of resources of the predetermined frequency range, wherein an occupancy of resources indicated by a reference hopping pattern does not comprise any repetitive identical distances between the resources in time and/or frequency.

In embodiments, the base station can be configured to transmit the reference signal in predetermined distances [like periodically, for example], wherein the base station can be configured to adjust a distance between at least two successive emissions of the reference signal dynamically to a number of new terminal points to be registered, or wherein the base station is configured to additionally the reference signal responsive to an external event transmit [like between two planned emissions of the reference signal].

In embodiments, the base station can be configured to provide the reference signal with a plurality of partial reference data packets, wherein the base station can be configured to adjust a number of partial reference data packets which the reference signal is provided with, dynamically to a number of new terminal points to be registered.

In embodiments, the base station can be configured to distribute the plurality of partial reference data packets to different frequency channels of the predetermined frequency range in correspondence with a reference signal hopping pattern, wherein the base station can be configured to adjust a number of different frequency channels of the predetermined frequency range which the plurality of partial reference data packets are distributed to, dynamically to the number of new terminal points to be registered.

In embodiments, the base station can be configured to emit the reference signal repeatedly, wherein the base station can be configured to provide the reference signal with a plurality of partial reference data packets, wherein the base station can be configured to temporally interleave the plurality of partial reference data packets of at least two emissions of the reference signal in correspondence with respective reference signal hopping patterns.

In embodiments, the respective reference signal hopping patterns can be versions of one another mutually shifted in time and frequency.

In embodiments, a temporal distance between the plurality of partial reference data packets of the respective reference signal can correspond to the number of repetitions.

In embodiments, the base station can be configured to provide the reference signal with a plurality of partial reference data packets, wherein at least two of the plurality of partial reference data packets comprise data [like an ID of the communication system, for example] known to the terminal point.

In embodiments, the at least two of the plurality of partial reference data packets can be comprise partial synchronization sequences which are known to the terminal point.

In embodiments, within the at least two of the plurality of partial reference data packets, the respective partial synchronization sequence and the respective known data can form virtual synchronization sequences.

In embodiments, within the at least two of the plurality of partial reference data packets, the respective partial synchronization sequence and the respective known data can comprise a predetermined mutual distance [like succeed to one another directly or be spaced apart from one another by a predetermined number of symbols].

In embodiments, the base station can be configured to split data known to the terminal point in an interleaved manner to at least two of the plurality of partial reference data packets so that each of the at least two of the plurality of partial reference data packets comprises a part of the known data.

In embodiments, the base station can be configured to provide the reference signal with a plurality of partial reference data packets, wherein the base station can be configured to adjust a number of partial reference data packets to an error protection code used for the control signal.

In embodiments, the base station can be configured to provide the reference signal and the control signal with the same error protection code or with error protection codes of comparable performance.

In embodiments, the plurality of partial reference data packets can be symbol-identical.

In embodiments, the communication system can communicate wirelessly in a frequency band which is used for communication by a plurality of communication systems [wherein the communication systems are mutually uncoordinated, for example].

In embodiments, the control signal or the reference signal can comprise information on a network-specific channel access pattern, wherein the network-specific channel access pattern indicates a frequency hop and/or time hop-based occupancy of resources of the frequency band usable for communication of the communication system.

In embodiments, the communication system can communicate based on a network-specific channel access pattern, wherein the network-specific channel access pattern indicates a frequency hop and/or time hop-based occupancy of resources of the frequency band usable for communication of the communication system, wherein the control signal hopping pattern is a relative channel access pattern, wherein the base station is configured to transmit the control signal in correspondence with the relative channel access pattern in at least a subset of the resources of the frequency band indicated by the channel access pattern.

In embodiments, the base station can be configured to transmit the control signal in correspondence with the relative channel access pattern in the first resources of the resources of the frequency band indicated by the channel access pattern.

In embodiments, the frequency range of the frequency band in which the control signal is transferred distributed in correspondence with the control signal hopping pattern is greater by the factor 5 than the predetermined frequency range.

In embodiments, the frequency range of the frequency band in which the control signal is transferred distributed in correspondence with the control signal hopping pattern can be greater by the factor 10 than the predetermined frequency range.

Further embodiments provide a communication system comprising a terminal point in accordance with any of the embodiments described herein, and a base station in accordance with any of the embodiments described herein.

Further embodiments provide a method for operating a terminal point of a communication system, wherein a control signal is emitted in the communication system [like a base station of the communication system, for example] for coordinating the participants of the communication system, wherein the control signal is transferred distributed in correspondence with a frequency hop-based [and, for example, time hop-based] occupancy of resources of the frequency band, indicated by a control signal hopping pattern, wherein the terminal point comprises a receiver, wherein a receive bandwidth of the receiver is smaller by at least the factor 3 than a bandwidth of the frequency hop-based [and, for example, time hop-based] occupancy of resources of the frequency band, indicated by the control signal hopping pattern. The method comprises a step of receiving a reference signal [like synchronization signal, for example], wherein the reference signal comprises information on the control signal. Additionally, the method comprises a step of receiving the control signal based on the information on the control signal.

Further embodiments provide a method for operating a base station of a communication system. The method comprises a step of transmitting a control signal for coordinating the participants of the communication system, wherein the control signal is transferred distributed in correspondence with a frequency hop-based [and, for example, time hop-based] occupancy of resources of the frequency band, indicated by a control signal hopping pattern. Additionally, the method comprises a step of transmitting a reference signal [like synchronization signal, for example], wherein the reference signal comprises information on the control signal, wherein the predetermined frequency range is smaller [like narrower, for example] by at least the factor 3 than a frequency range of the frequency band in which the control signal is transferred distributed in correspondence with the control hopping pattern.

In embodiments, a reference signal or synchronization signal (having so-called (partial) data packets, for example) can be inserted before the control signal, which can be used by new participants to be registered for initially synchronizing in time and/or frequency.

BRIEF DESCRIPTION OF THE DRAWINGS

Embodiments of the present invention are described in more detail with reference to the accompanying drawings, in which:

FIG. 24 shows, in a table, a resource calculation for different exemplary application cases;

DETAILED DESCRIPTION OF THE INVENTION

Figure 1:
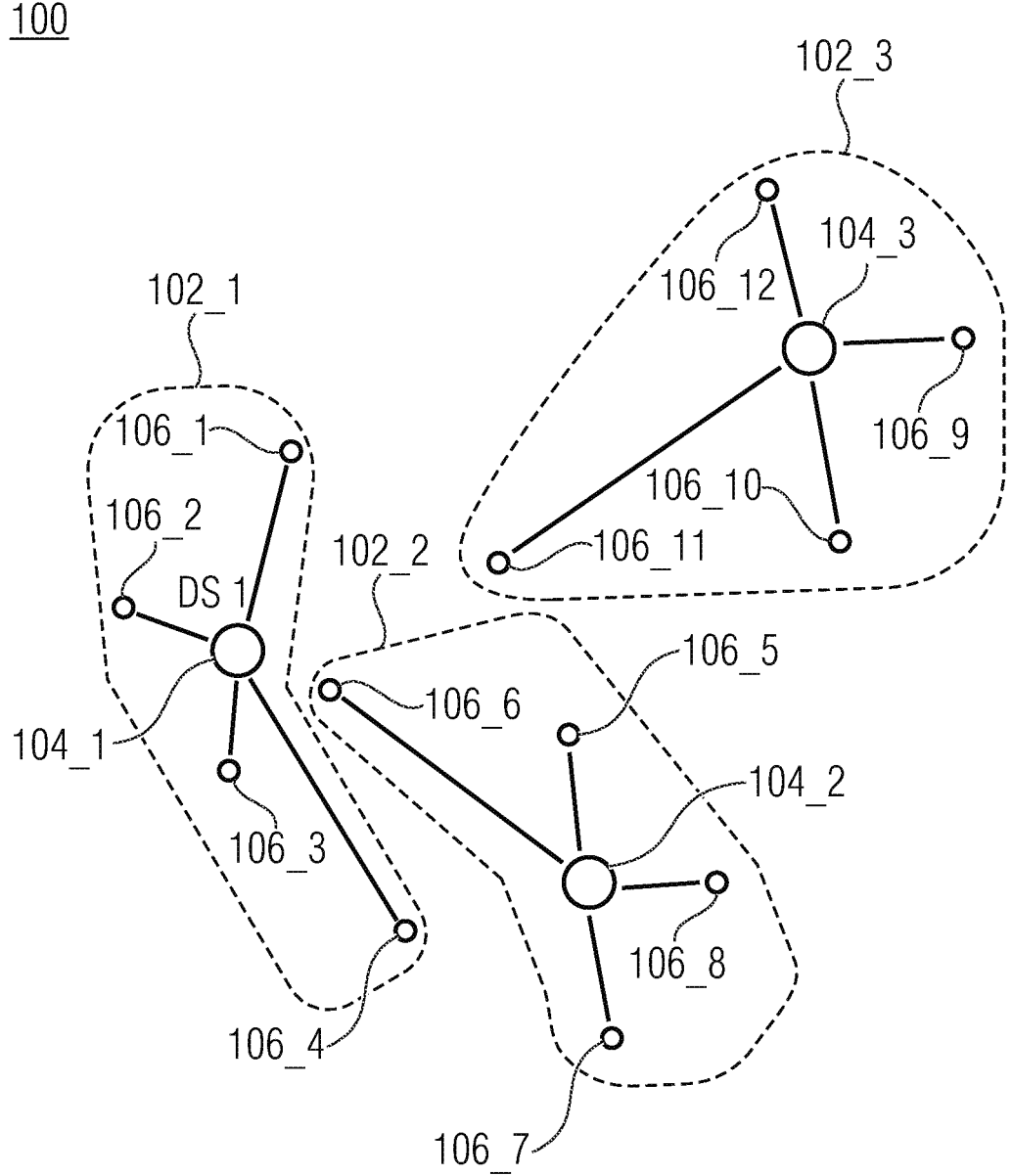
FIG. 1 shows a schematic block circuit diagram of a communication arrangement with a first communication system, according to an embodiment of the present invention.

In the figures, equal elements or elements of equal effects will be provided with equal reference numerals in the following description of embodiments of the present invention, so that the description thereof is mutually interchangeable.

In the following, it is assumed that there are a coordinating instance (subsequently referred to as "base station") and non-coordinating participants (subsequently referred to as "terminal devices") within each network.

For operating low-power wide area networks (LPWANs), transferring messages pursuant to the telegram-splitting method have proven to be particularly advantageous. The basics of this transfer principle are, for example, illustrated in [1], [3], [4]. Here, a message (data packet) is split into a plurality of partial data packets and transferred distributed to different time/frequency resources. The succession of the emissions of the partial data packets in time and frequency is referred to as channel access pattern or hopping pattern.

In channel access methods, a contention-based access is frequently used in LPWAN networks, for example. No exclusively allocated resources are available here for the terminal devices, but several terminal devices access a common range of radio resources on their own initiative. This may result in access conflicts, that is simultaneous occupancy of radio resources by two or more participants. In order to minimize the effects of such access conflicts, a range of mutually different channel access patterns (hopping patterns) is available for the terminal devices.

These channel access patterns (or parameters from which the channel access pattern can be derived) are transferred (see section A) to the participants of the network, typically in the form of a beacon, by the coordinating instance.

In order to minimize the mutual resistance to disturbance of these networks, each network usually uses a different channel access pattern, which usually is also time-dependent.

At first, new participants that want to join a network are not in possession of information on the channel access pattern used or the current state of the channel access pattern. In addition, due to crystal tolerances, they do not know the precise frequency position of the signal or the temporal occurrence of the beacon. This means that they have to perform a full search (in time and frequency) for the beacon.

Typically, networks using a beacon occupy a relatively high signal bandwidth of several 10 kHz. Since, in typical crystal tolerances of 20 ppm, the signal with a 1 GHz carrier can be shifted by a few 10 kHz, a great part of the signal can still be received at the receiver, even when the frequencies are shifted correspondingly. This fact makes compensating the frequency offset easier and thus requires only beacon search overtime.

If, however, a narrow-banded system of low signal bandwidth is used, apart from time, frequency is unknown, too, since the signal bandwidth is smaller and, for a high receive sensitivity, the corresponding filter in front of the receiver is also implemented to be narrower than the frequency offset to be expected. In order to be able to perform a full search, the participant has to have a way of sampling the spectrum with a bandwidth which corresponds at least to the signal bandwidth, plus the frequency offsets.

Additionally, the participant has to be able to process the corresponding signal sampled so quickly that, in the time when the data are processed, the frequency and time offset resulting by the crystal tolerances have not yet resulted in so strong an effect that a new synchronization is required.

If the frequency or channel access pattern for the next beacons is transferred in a beacon, the data processing correspondingly has to be finished before the information is no longer valid.

Networks using the telegram splitting method only use a small bandwidth for a single emission of a partial data packet, but since, for synchronization, receiving several partial sub-packets is required and these are distributed over a great bandwidth by means of frequency hopping methods to reduce the susceptibility to disturbance, for synchronization with a telegram splitting signal still a large frequency range is considered for the initial synchronization.

In small (frequently battery-operated) (low-cost) participants, such a high-rate data processing is not available and a receive bandwidth required for this can usually not be provided. Thus, a (low-cost) participant has no option of registering in a network, even when, as is described in section B, it can easily communicate in the network after having registered successfully.

This is what embodiments of the present invention aim at, by transferring, before the control signal (like beacon signal, for example), a reference signal which can be used by new participants to register for an initial synchronization in time and frequency.

Before describing, in section C, embodiments of the present invention which allow a terminal point to register in a communication system, which uses signals for transferring data, which have a considerably greater bandwidth than a receiver of the terminal point is able to process simultaneously, at first it will be discussed in section A how communication systems which communicate in the same frequency band can be separated from one another by different channel access patterns, wherein subsequently, in section B, it will be discussed how one or more participants of a communication system can access, using a relative channel access pattern, a selection of resources released by the network-specific channel access pattern for the communication system.

A. Network-Specific Channel Access Patterns

FIG. 1 shows a schematic block circuit diagram of a communication arrangement 100 with a first communication system 102_1, according to an embodiment of the present invention.

The first communication system 102_1 may comprise a base station 104_1 and one or several terminal points 106_1-106_$n$, wherein n is a natural number larger than or equal to one. In the embodiment shown in FIG. 1, for illustrative purposes, the first communication system 102_1 comprises four terminal points 106_1-106_4, however, the first communication system 102_1 may also comprise 1, 10, 100, 1,000, 10,000, or even 100,000 terminal points.

The first communication system 102_1 may be configured to wirelessly communicate in a frequency band (e.g. a license-free and/or permission-free frequency band such as the ISM bands) used for communication by a plurality of communication systems. In this case, the frequency band may comprise a significantly larger (e.g. at least larger by a factor of two) bandwidth than reception filters of the participants of the first communication system 102_1.

As is indicated in FIG. 1, a second communication system 102_2 and a third communication system 1023 may be in the range of the first communication system 102_1, for example, wherein these three communication systems 102_1, 102_2, and 102_3 may use the same frequency band to wirelessly communicate.

In embodiments, the first communication system 102_1 may be configured to use for the communication different frequencies or frequency channels of the frequency band (e.g. into which the frequency band is divided) in portions (e.g. in time slots) on the basis of a channel access pattern, regardless of whether these are used by another communication system (e.g. the second communication system 102_2 and/or the third communication system 102_3), wherein the channel access pattern differs from another channel access pattern based on which at least one other communication system of the plurality of other communication systems (e.g. the second communication system 102_2) accesses the frequency band.

In such a communication arrangement 100 shown in FIG. 1, the signals of mutually uncoordinated communication systems (e.g. the first communication system 102_1 and the second communication system 102_2) may therefore be separated from one another by different channel access patterns so that a reciprocal disturbance by interferences is avoided or minimized.

For example, participants of the first communication system 102_1, e.g. a base station 104_1 and several terminal points 106_1-106_4, may wirelessly communicate among themselves on the basis of a first channel access pattern (e.g. which indicates a frequency hop-based occupancy (e.g. of resources) of the frequency band, usable for the communication of the first communication system 102_1), whereas participants of the second communication system 102_2, e.g. a base station 104_2 and several terminal points 106_5-106_8, may wirelessly communicate among themselves on the basis of a second channel access pattern (e.g. which indicates a frequency hop-based occupancy (e.g. of resources) of the frequency band, usable for the communication of the second communication system 102_2), wherein the first channel access pattern and the second channel access pattern are different (e.g. comprise an overlap of less than 20% in the resources used, in the ideal case there is no overlap).

As mentioned above, the communication systems (e.g. the first communication system 102_1 and the second communication system 102_2) are mutually uncoordinated.

The communication systems 102_1, 102_2, 102_3 being mutually uncoordinated refers to the fact that the communication systems mutually (=among the communication systems) do not exchange any information about the respectively used channel access pattern, or, in other words, a communication system does not have any knowledge about the channel access pattern used by another communication system. Thus, the first communication system 102_1 does not know which channel access pattern is used by another communication system (e.g. the second communication system 102_2).

Thus, embodiments refer to a communication arrangement 100 of mutually uncoordinated and, possibly, mutually unsynchronized radio networks (or communication systems) 102_1, 102_2 for the transfer of data which access a mutually used frequency band. In other words, there are at least two radio networks 102_1, 102_2 that operate independently of one another. Both networks 102_1, 102_2 use the same frequency band.

In embodiments, it is assumed that in each individual data transfer only a (small) part of the frequency band is used, e.g. a frequency channel or a partial frequency channel. For example, the frequency band may be split into (partial) frequency channels, wherein a frequency channel is a real subset of the total frequency band. The totality of all available frequency channels constitutes the frequency band used. For example, in the telegram-splitting method, the transfer of a message (data packet) may be carried out consecutively via a sequence of different frequency channels. In this case, embodiments are particularly useful.

Oftentimes, networks (or communication systems) 102_1, 102_2 are arranged such that transmission signals of participants of a network (e.g. the communication system 102_2) can also be received by participants of other nearby networks (e.g. the communication system 102_1). There, they act as disturbance signals (interferences) that, in principal, may significantly decrease the performance of a radio transfer system, as is shown in FIG. 2.

Figure 2:
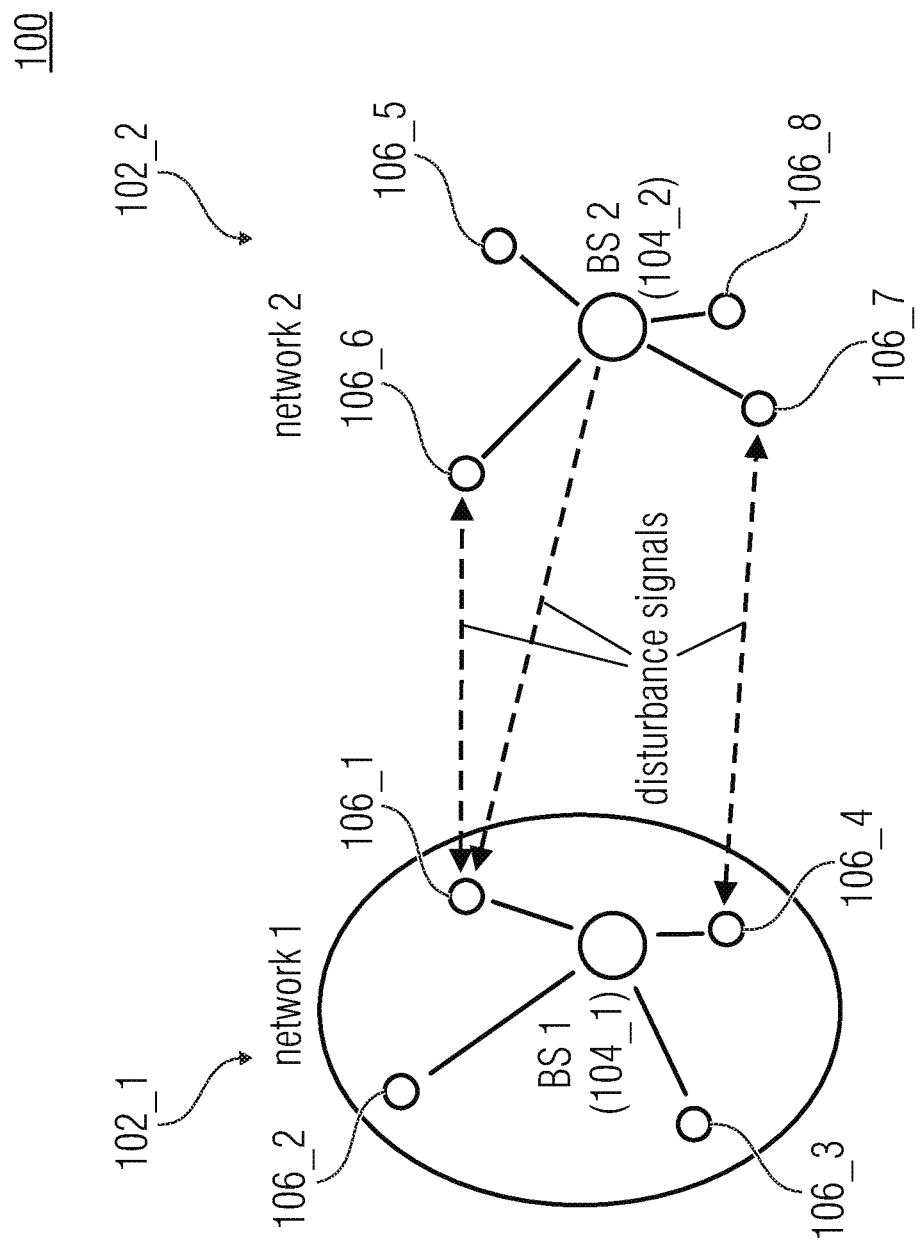
FIG. 2 shows a schematic block circuit diagram of a communication arrangement of two mutually uncoordinated networks having one base station and four associated terminal devices each, according to an embodiment of the present invention.

In detail, FIG. 2 shows a schematic view of two mutually uncoordinated networks 102_1, 102_2 with a base station (BS 1) 104_1, (BS 2) 104_2, respectively, and four associated terminal devices 106_1-106_4, 106_5-106_8, respectively. In other words, FIG. 2 shows an example network topology for two networks 102_1, 102_2 with base stations (BS 1) 104_1, (BS 2) 104_2 and four terminal devices 106_1-106_4, 106_5-106_8 each. The dashed arrows 108 exemplarily symbolize potential disturbance signals, i.e. the radio participants may receive the transmission signals of the receivers from the respectively other network as disturbance signals. Depending on the circumstances, a multitude of networks may be in a mutual reception range so that the participants (base stations or terminal devices) may be possibly exposed to a significant number of disturbers from other networks.

If (as mentioned above) the frequency band as a commonly used resource is divided into individual non-overlapping frequency channels, the effect of the disturbance signals may be significantly reduced. In mutually coordinated networks, a part of the frequency band (a set of frequency channels) may be exclusively allocated to each network so that the reciprocal disturbance (interference) may be minimized. In fully uncoordinated networks, this is not possible.

Thus, in embodiments, accessing the physical transform medium (i.e. the physical radio channel) is implemented in each network such that at least one of the following is fulfilled:

a) the channel access, i.e. the frequency occupancy and time occupancy of the radio channel, in a network has as little overlap as possible in time and frequency with the channel access in another network of the same standard (high degree of "orthogonality"), b) the channel access has a (pseudo) random character within desired specifications (e.g. mean access frequency per time) ("randomness"), c) as far as this is avoidable according to the specifications, there are not any longer sequences of an identical (in time and frequency) channel access between networks ("avoidance of systematic overlaps"), d) all frequency channels within the frequency band are used as regularly as possible in order to achieve as high a frequency diversity as possible and, possibly, the adherence to official regulatory specifications ("uniform distribution of the frequency channel used"), e) the information about the frequency occupancy and time occupancy of the radio channels, e.g. for new participants joining a network, may be transmitted with as little signaling effort as possible ("reduction of signaling information").

Simply put, in embodiments, a mutual disturbance between several networks (intern-network interference) is reduced by carrying out the channel access to the mutually used frequency band differently in frequency and time, advantageously as "orthogonal" as possible and with a (pseudo) random character.

In the following, for illustrative purposes, beside the division of the frequency band into discrete frequency channels (indices c0, c1, c2, . . . ), what is assumed to be also carried out is a temporal discretization of the accesses within a respective network. The associated temporal resources are referred to as time slots and are provided in FIG. 3 with the indices t0, t1, t2, . . . . However, both requirements (discretization in frequency and time) are not necessary prerequisites for the application of embodiments.

Figure 3:
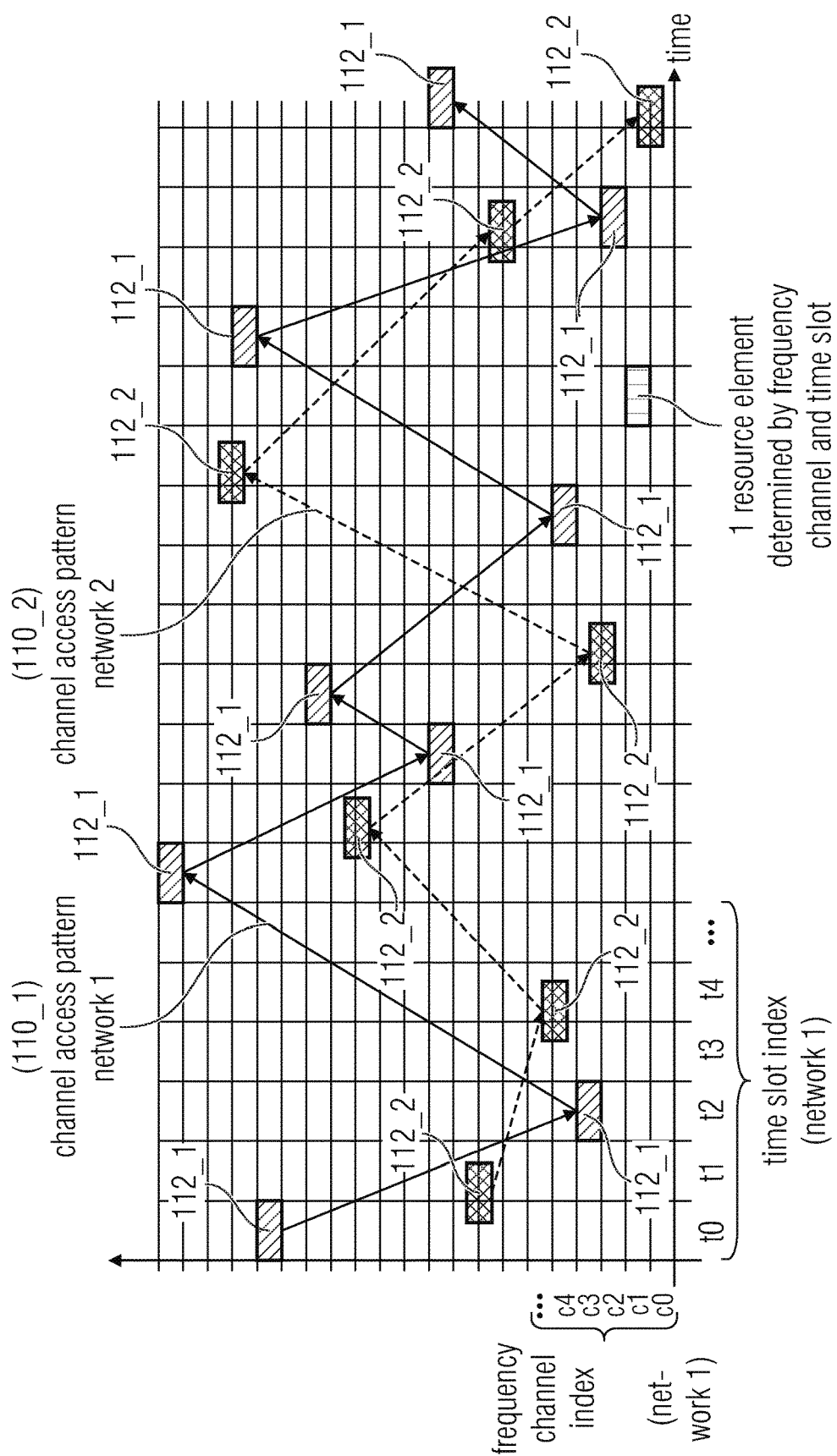
FIG. 3 shows, in a diagram, a division of the frequency band into resources and a frequency hop-based and time hop-based occupancy of the resources of the frequency band defined by two different channel access patterns, according to an embodiment of the present invention.

In detail, FIG. 3 shows, in a diagram, a division of the frequency band into resources and a frequency hop-based and time hop-based occupancy of the resources of the frequency band defined by two different channel access patterns. Here, the ordinate describes the frequency channel indices and the abscissa describes the time slot indices.

For example, the participants of the first communication system 102_1 may wirelessly communicate among themselves on the basis of the first channel access pattern 110_1, which indicates a frequency hop-based occupancy of resources of the frequency band to be used for the communication of the first communication system 102_1, whereas participants of the second communication system 102_2 wirelessly communicate among themselves on the basis of the second channel access pattern 110_2, which indicates a frequency hop-based occupancy of resources of the frequency band, usable for the communication of the second communication system 102_2, wherein the first channel access pattern and the second channel access pattern are different (e.g. comprise an overlap of less than 20%, not comprising any overlap in the ideal case).

In other words, FIG. 3 shows in grid form an overview of all fundamentally available resources in frequency and time (schematic illustration of the frequency channels and time slots and exemplary channel access patterns), wherein an individual resource element in the first communication network 102_1 is determined by allocation of a frequency channel index and a time slot index. As an example, the resources that can be occupied by the first communication network 102_1 are the resource elements indicated with the reference numeral 112_1. The set of all resources that can be occupied within a communication network represent a channel access pattern 110_1. For the first communication network 102_1, these are all resource elements indicated by the reference numeral 112_1 and connected via arrows. Equivalently, the channel access pattern of a further communication network (e.g. the second communication network 102_2) is exemplarily drawn in FIG. 3 (all resource elements indicated by reference numeral 112_2 and connected via arrows), which is not anchored in the same frequency grid and time grid as the first communication network 102_1 (resource elements are shifted in frequency and time from the base grid of the first communication system 102_1).

It is important to differentiate between
- all fundamentally (maximum) available resource elements, i.e. the total quantity of all resource elements from which the channel access pattern selects an appropriate subset (e.g. all elements of the grid in FIG. 3),
- all resource elements (in FIG. 3, all resource elements provided with the reference numeral 112_1) actually included into the channel access pattern, and
- the quantity of resource elements (of the channel access pattern) that can actually be occupied in the network for a data transfer (e.g., with a low amount of data, only every third resource element available in the channel access pattern could actually be used).

The design of the channel access pattern therefore also means a determination of the actively usable resource supply for this communication network (or communication system).

Embodiments of base stations, terminal points, and/or communication systems using channel access patterns that fulfil at least one of the above-mentioned criteria a) to e) for communication are described in the following. In addition, embodiments of the generation of such channel access patterns are described in the following.

A.1. Base Station, Terminal Point and Communication System

Figure 4:
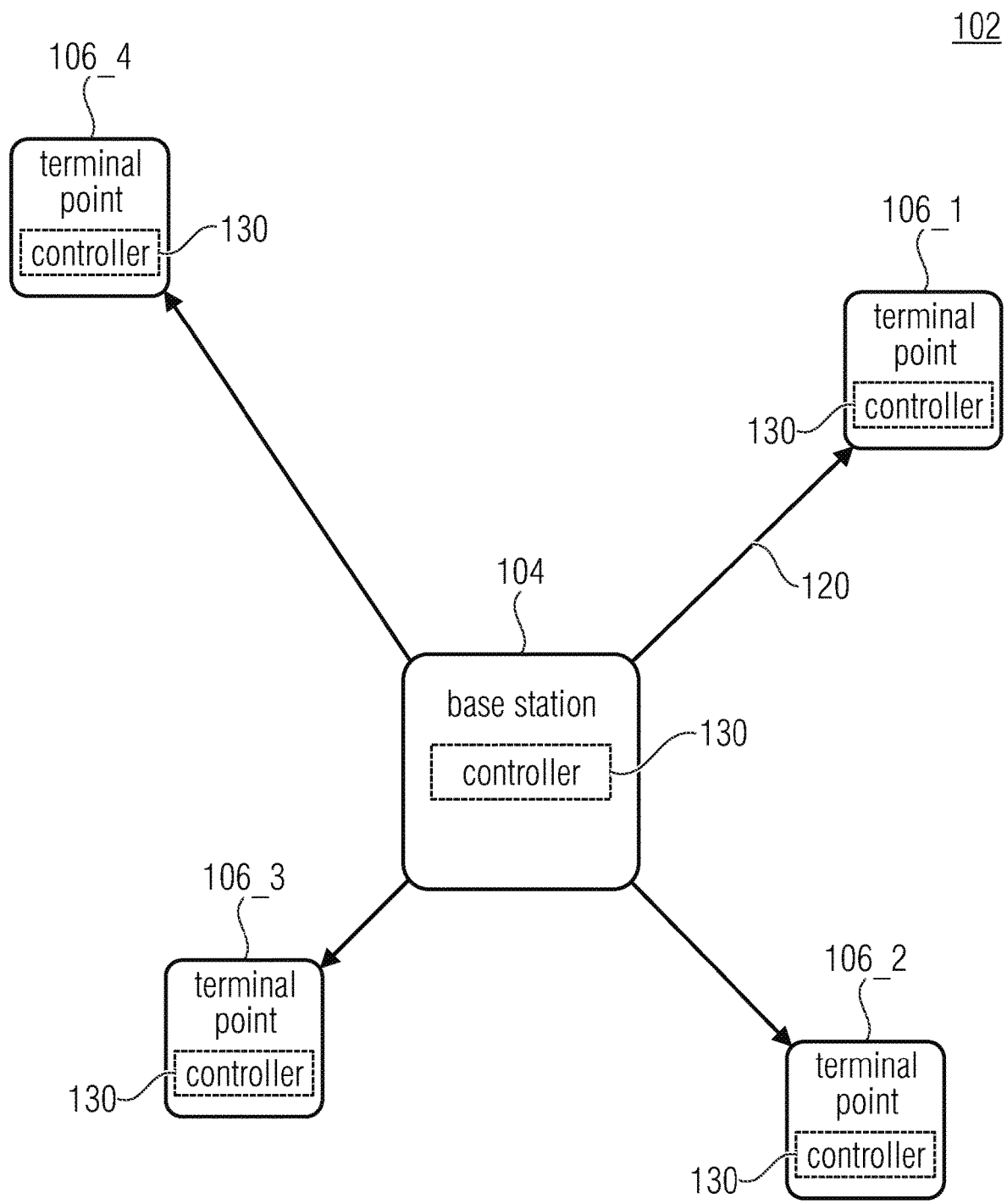
FIG. 4 shows a schematic block circuit diagram of a communication system with one base station and a plurality of terminal points, according to an embodiment of the present invention.

FIG. 4 shows a schematic block circuit diagram of a communication system 102 with one base station 104 and a plurality of terminal points 106_1-106_4, according to an embodiment.

As shown in FIG. 4 according to an embodiment, the communication system 102 may comprise one base station and four terminal points 106_1-106_4. However, the present invention is not limited to such embodiments, rather, the communication system may comprise one or several terminal points 106_1-106_n, wherein n is a natural number larger than or equal to one. For example, the communication system may comprise 1, 10, 100, 1000, 10,000, or even 100,000 terminal points.

The participants (=the base station 104 and terminal points 106_1-106_4) of the communication system shown in FIG. 4 use for mutual communication a frequency band (e.g. a license-free and/or permission-free frequency band such as the ISM bands) used for communication by a plurality of communication systems, as described above with reference to FIGS. 1 to 3. In this case, the communication system 102 operates in an uncoordinated manner with respect to the other communication systems that use the same frequency band.

In embodiments, the base station 104 may be configured to transmit a signal 120, wherein the signal 120 comprises information about a channel access pattern 110, wherein the channel access pattern indicates a frequency hop-based and/or time hop-based occupancy (e.g. of resources) of the frequency band, usable for the communication of the communication system 102 (e.g. a temporal sequence of frequency resources (e.g. distributed across the frequency band) usable for the communication of the communication system), wherein the information describes a state of a numerical sequence generator for generating a numerical sequence, wherein the numerical sequence determines the channel access pattern.

For example, the state of the numerical sequence generator may be an internal state of the numerical sequence generator, wherein a number of the numerical sequence may be derived from the internal state of the numerical sequence generator. On the basis of the internal state of the numerical sequence generator, internal states of the numerical sequence generator following the internal state of the numerical sequence generator may be identified, from which following numbers of the numerical sequence may also be derived.

For example, the number of the numerical sequence may be directly derived from the internal state of the numerical sequence generator (e.g. state=number), e.g. in the implementation of the numerical sequence generator as a counter, or via a mapping function, e.g. in the implementation of the numerical sequence generator as a shift register, possibly with feedback.

In embodiments, at least one of the terminal points 106_1, 106_4 may be configured to receive the signal 120 with the information about the channel access pattern 110, and to identify the channel access pattern 110 on the basis of the information about the channel access pattern, wherein the information describes a state of a numerical sequence generator for generating a numerical sequence, wherein the numerical sequence determines the channel access pattern.

For example, the base station 104 and/or at least one of the terminal points 106_1-106_4 may be configured to pseudo-randomly identify the channel access pattern as a function of the state of the numerical sequence generator, e.g. by using a pseudo-random mapping function.

In addition, the base station 104 and/or at least one of the terminal points 106_1-106_4 may be configured to pseudo-randomly identify the channel access pattern as a function of individual information of the communication system (e.g. intrinsic information of the communication system such as a network-specific identifier).

Embodiments of the generation of channel access patterns are described in the following. In this case, the channel access patterns are generated by the base station 104 and may be identified by one (or all) of the terminal points 106_1-106_4 shown in FIG. 4 on the basis of the signal with the information 120 via the channel access pattern, e.g. by a controller (controlling device, controlling unit) 130 each, implemented into the base station 104 and/or into the terminal points 106_1-106_4. In this case, the specification of the channel access patterns is done (exclusively) by the base station 104, whereas the terminal points 106_1-106_4 only "know" the channel access pattern, i.e. they generate the same according to the same method as the base station 104.

The following description assumes a radio transfer system (or a communication arrangement) with several independent, mutually uncoordinated communication networks whose participants are in a mutual reception range so the transmission signals from participants of one network may potentially be considered as disturbance signals for participants of other networks. For the application of embodiments, it is not required to exchange information (data or signalization information) between different networks. Likewise, it is irrelevant whether the networks are synchronized in time and/or frequency with respect to each other.

In addition, what is assumed is that, within each network, there is a coordinating instance (in the following referred to as "base station") which may transmit to the non-coordinating participants of the network (in the following referred to as "terminal devices" or "terminal points") information about the channel access pattern applied within the network. For example, this information may be transmitted via regularly emitted beacon signals, however, it may also be transferred in irregular intervals or, possibly, in a dedicated manner to individual terminal devices or groups of terminal devises.

In addition, what is assumed is that the entire frequency band available for the transfer is divided into a multitude of individual frequency channels that may each be accessed individually or in subsets (groups of frequency channels).

Without limiting the generality and for a better illustration, the following assumes that there is a fixed, discrete time pattern within each network with which channel accesses may be carried out (cf. FIG. 3). A channel access in the form of the emission of a signal may be carried out by terminal devices as well as by the base station. However, a channel access does not necessarily have to be carried out in a resource provided to this end in the channel access pattern, e.g., if there is no data or other information to be transferred.

Figure 5:
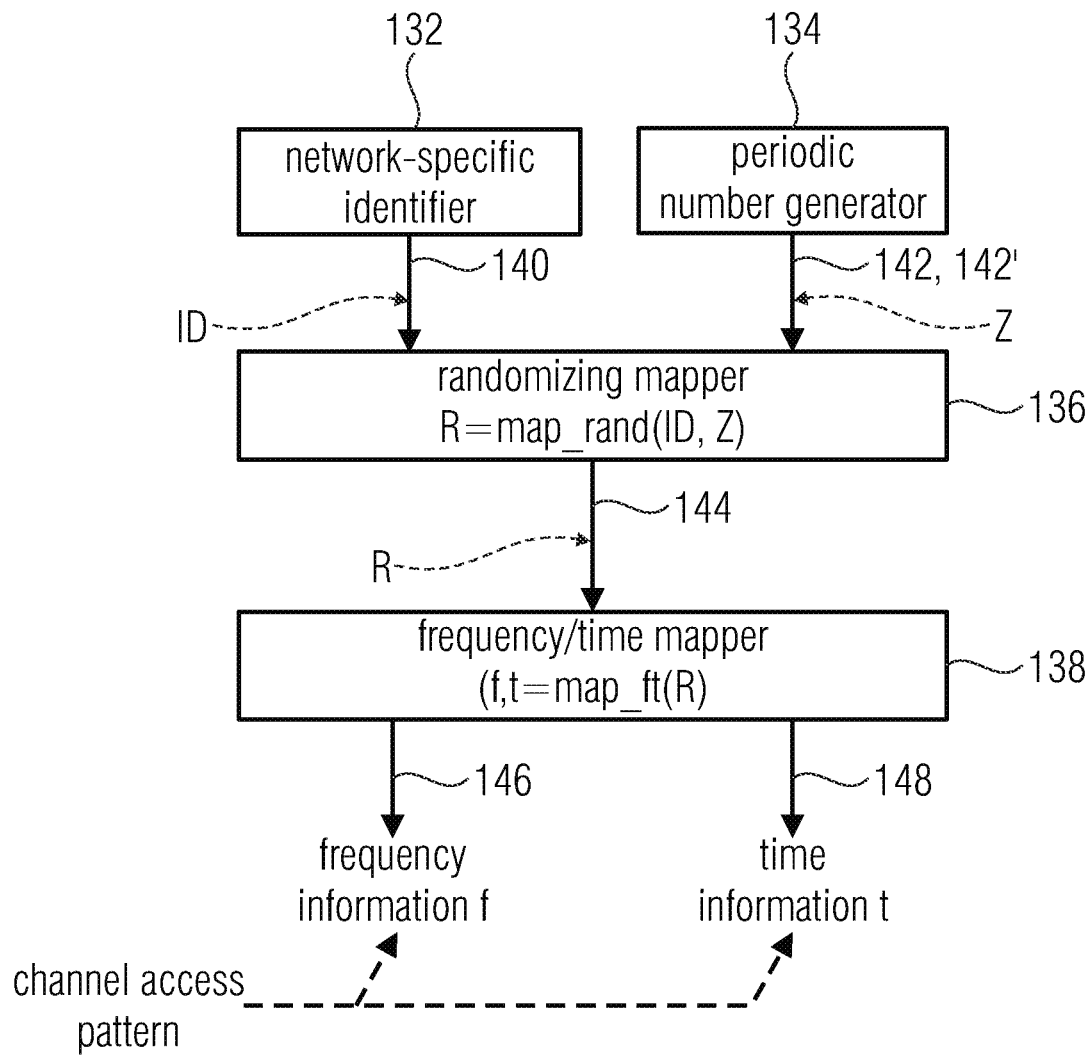
FIG. 5 shows a schematic block circuit diagram of a controller for generating a channel access pattern, according to an embodiment of the present invention.

FIG. 5 shows a schematic block circuit diagram of a controller 130 for generating a channel access pattern, according to an embodiment of the present invention.

As can be seen in FIG. 5, the controller 130 may comprise a memory 132, a periodic number generator 134 for generating a periodic numerical sequence Z, a randomizing mapper 136 and a frequency/time mapper 138.

The memory (e.g. a register) 132 may be configured to store a network-specific identifier ID 140, e.g. a (individual) bit sequence that does not change. The periodic number generator 134 may be configured to provide its state 142 or a number 142' of the periodic numerical sequence derived from its state. The randomizing mapper 136 may be configured to identify a pseudo random number R 144 as a function of the state 142 of the numerical sequence generator 134 or the number 142' of the periodic numerical sequence derived therefrom and the network-specific identifier ID 140. The frequency/time mapper 138 may be configured to identify frequency information f 146 and time information t 148 on the basis of the pseudo random number R 144. For example, the frequency information f 146 and the time information t 148 may describe, or define, a frequency channel and a time slot (or a frequency channel index and a time slot index) and therefore a resource of the channel access pattern.

For example—as is indicated in FIG. 4—the controller 130 may be implemented in the base station 104 and/or in the one or several terminal point(s) 106_1-106_4 so as to calculate the individual (or network-individual) channel access pattern used by the communication system 102.

In other words, FIG. 5 shows the base structure for the generation of channel access patterns according to an embodiment of the present invention.

The generation of the channel access patterns is done iteratively, i.e. the blocks illustrated in FIG. 5 are called up once per generation of a single piece of channel access information. By a call-up of N-times, a channel access pattern with N channel accesses is generated.

The function of the partial blocks is described in detail in the following. The term "number" is used. This is generally discrete information that may be present in different forms (e.g. in decimal form, as a binary sequence, or the like).

Network-Specific Identifier "ID"

The network-specific identifier is a fixed number that is determined by an external instance (e.g. when configuring the network, or the coordinating base station). Ideally, it differs from network to network. For example, it may be an unambiguous, sufficiently long base station ID, unambiguous network ID, or a sufficiently long hash about them, respectively. This variable is fixed and is the only one that does not vary from call-up to call-up in the arrangement shown.

Periodic Number Generator "Z"

The periodic number generator 134 generates a sequence of numbers Z that periodically repeats with the periodicity P. It has an internal state $S_n$ from which the next generated number and the next internal state $S_{n+1}$ can be unambiguously determined. The significant feature is that the entire periodic sequence for each time step may be derived from a single internal state (which is present in an arbitrary time step) already. For example, a simple embodiment is a modulo P counter that periodically delivers the numerical sequence 0,1,2 . . . (P−1). A further embodiment is a deterministic random number generator (pseudo random number generator), e.g. implemented in the form of a feedback shift register (LFSR). A third embodiment is a finite body (Galois field) with P elements.

Randomizing Mapper

The randomizing mapper 136 generates from the two input numbers ID and Z an output number R, i.e. R=map_rand(ID, Z) wherein map_rand represents the mapping function. In this case, the mapping has as random a character as possible, i.e. a mathematically correlated input sequence (consisting of ID, Z) generates an output sequence R that is as uncorrelated in itself as possible.

Embodiments for a randomizing mapping are:
linking the two input numbers
applying a cyclic redundancy check (CRC) on the input qualities ID, Z, which leads to the number R and has a randomizing character,
applying a hash function
applying an encryption, e.g. AES encryption, wherein the associated key is known to all authorized participants, and which therefore also represents a method for embedding a "transport layer security" (TLS).

According to the above, the sequence of the elements of the number R is of a pseudo-random nature. It should be different from network to network so as to avoid overlaps of the channel access patterns.

Frequency/Time Mapper

The frequency/time mapper 138 maps, by means of a mapping, to each input number R a 2-tupal of frequency information (radio frequency f) and time information (access time t), i.e. (f,t)=map_ft(R), wherein "map_ft" represents the mapping function. While, in principle, the sequence of the frequencies may be arbitrary within the specified frequency band, the points in time may be present in a monotonously increasing form from call-up to call-up, since "returns" in time are not admissible.

As an embodiment, what is of particular importance is the case in which the channel access is discretized in time/frequency direction (as described above), i.e. is done in the form of discrete frequency channels and discrete time slots. In this case, the frequency/time mapper allocates to each input number R a 2-tuple of frequency channel index fi and time slot index ti, i.e. (fi,ti)=map_ft(R). The time slots are indexed in a temporally ascending order, since "returns" in time are not admissible. Further discussions as to the occupancy of the time slots can be found in section 3.

The sequence of the 2-tupel (f,t), or (fi, ti), is based on the sequence of the elements of R and defines the channel access pattern.

The exact implementation of the frequency/time mapper, together with the probability function of the number R, determines the access statistic with respect to the channel.

State Signaling and Predictability

The arrangement shown in FIG. 5 generates a channel access pattern that depends both on a temporally invariable network-specific identifier and on a state-dependent (and therefore temporally variable) periodic number generator (periodicity P). By means of the network-specific identifier, it can be ensured that networks with different network-specific identifiers always generate different sequences of R, even if their number generator were to be in the same state. This can ensure that different networks do not generate any identical channel access patterns and therefore, in the worst case, get into a "continuous collision" of the channel accesses.

In order to identify the channel access pattern used in the network, a terminal device needs the network-specific identifier and the respective state of the periodic number generator.

The network-specific identifier is obtained by the terminal device already at the initial log-on at the network. Advantageously, the same is transferred by means of beacon signals regularly emitted by the base station, and is made available to all authorized terminal devices. Alternatively, the network-specific identifier may also be made known to the terminal device in the course of the initial configuration (with delivery), i.e. before the first operation in the network.

The state of the periodic number generator may either be transferred in a regular beacon signal and/or in distinct dedicated state-signaling resources. A number generator with a periodicity P has P internal states so that $\lceil \log_2(P) \rceil$ bits are transferred for the transmission of the respective state. The amount of information (number of bits) transferred per state signaling may therefore be controlled by the selected periodicity of the number generator according to the requirements.

The information transferred for the state signaling may be transferred in the form of several pieces of partial information, wherein the transfer may be carried out with different frequencies. Thus, as an embodiment for the case that the periodic number generator (Z) is a counter, the higher-valued bits (most significant bits (MSBs)) of the counter could be transferred separated from the lower-valued bits (least significant bits (LSBs)), and also with different transfer frequencies. Even if it is not a counter, the entire state information could be transferred in the form of several pieces of partial state information with different transfer frequencies.

Through the periodicity of the number generator, a terminal device that knows the state of the number generator at least at one point in time may determine the entire channel access pattern for any points in time/time slots in the future. This enables the terminal device in an energy-saving idle state to deactivate, e.g., the transmission/reception unit and to predetermine the then valid portion of the channel access pattern from the last previously known state when the transmission/reception unit is subsequently activated. An emission of the state information by the base station may therefore be done in comparatively large temporal intervals.

In summary, the method described herein has the advantage that a comparatively large state space for the (pseudo-random) number R is covered through the combination of a network-specific identifier and a periodic numeric generator. This prevents the channel access patterns of networks to be identical with different network-specified identifiers, which may minimize a systematic collision of the channel accesses of different mutually uncoordinated networks. This proves to be particularly advantageous for the telegram splitting multiple access (TSMA) method.

Advantageous features of the frequency/time mapper are discussed in more detail in the following sections.

Further Embodiment of the Controller

According to FIG. 5 and the above description, a periodic number generator 134 is required. In the following embodiment, it is replaced as follows.

Real radio networks are often operated with a beacon signal that is emitted regularly. In this case, each beacon emission may be provided with a counter that corresponds to a beacon sequence index. Here, this beacon sequence index is referred to as "beacon index".

It is also common practice for the time slots in a time slot-based system to be provided with a time slot index counter (that increases in the time direction) (cf. FIG. 3). Here, this is referred to as "time slot index". The beacon index is reset to zero in certain intervals specified in the system so that it has a periodicity. The same applies to the time slot index (e.g. which restarts at zero after a beacon emission).

Figure 6:
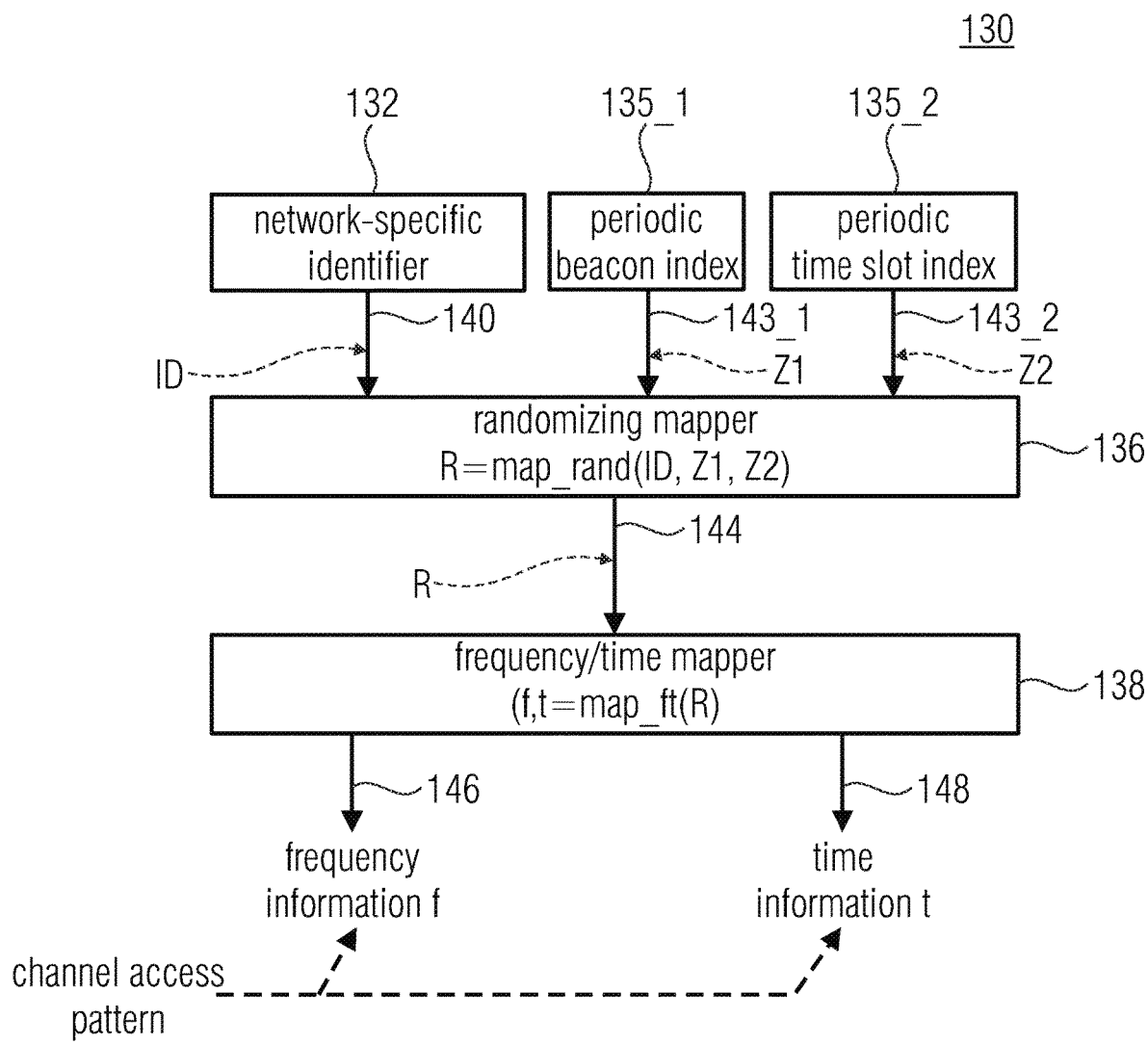
FIG. 6 shows a schematic block circuit diagram of a controller for generating a channel access pattern, according to a further embodiment of the present invention.

FIG. 6 shows a schematic block circuit diagram of a controller 130 for generating a channel access pattern, according to an embodiment of the present invention.

The controller 130 may comprise a memory 132, a first buffer 135_1, a second buffer 135_2, a randomizing mapper 136 and a frequency/time mapper 138.

The memory (e.g. a register) 132 may be configured to store a network-specific identifier ID 140, e.g. a (individual) bit sequence that is invariable. The first buffer (e.g. a register) 135_1 may be configured to store a periodic beacon index Z1 143_1. The second buffer (e.g. a register) 135_2 may be configured to store a periodic time slot index Z2 143_2. The randomizing mapper 136 may be configured to identify a pseudo-random number R 144 as a function of the periodic beacon index Z1 143_1, the periodic time slot index Z2 143_2 and the network-specific identifier ID 140. The frequency/time mapper 138 may be configured to identify frequency information f 146 and time information t 148 on the basis of the pseudo-random number R 144. For example, the frequency information f 146 and the time information t 148 may describe, or define, a frequency channel and a time slot (or a frequency channel index and a time slot index) and therefore a resource of the channel access pattern.

In other words, FIG. 6 shows a modified base structure for generating channel access patterns with a beacon index and a time slot index. FIG. 6 illustrates an embodiment in which, compared to the embodiment shown in FIG. 5, the periodic number generator (output Z) 134 is replaced by the two blocks "periodic beacon index" (output Z1) 135_1 and "periodic time slot index" (output Z2) 135_2. All further blocks are unchanged in function (the randomizing mapper now has three inputs).

The controllers 130 shown in FIGS. 5 and 6 enable the generation of network-individual channel access patterns, comprising at least one of the following characteristics:

- the channel access patterns contain amongst themselves as few overlapping partial sequences as possible,
- there is a large supply of channel access patterns (e.g. in areas with a high network density),
- the channel access patterns are designed such that they have a very high periodicity,
- the channel access patterns lead (if there are corresponding requirements) to an use of the available frequency channels that is uniform on average,
- signaling of the applied pattern is done by the coordinating instance with as little signaling information as possible, and
- terminal devices may already determine the content of the access pattern at any future time when the signaling of the channel access is received once and completely (this enables terminal devices, e.g. for energy saving reasons, to introduce longer reception pauses and to determine the valid channel access pattern on the basis of information received before the reception pause, when being switched on again.

A.2. Control of the Channel Access in the Frequency Domain

To simplify the following illustration, what is assumed is that the frequency range (or the frequency band) is divided into discrete frequency channels and that a transfer is carried out according to the TSMA method.

Mobile radio channels usually comprise signal attenuation that varies across the frequency. If a data packet is transferred in the form of several partial data packets according to the TSMA method and if the underlying mobile radio channel is not known in the transmitter, the error rate of the transfer may be reduced or even minimized on average by transferring the individual partial data packets as distributed across the entire frequency domain as possible (using the frequency diversity).

For this reason, it may be advantageous (in particular if a data packet consists of only a few partial data packets) to ensure that the frequency channels on which the partial data packets are transferred have a certain (minimum) distance relative to each other in the frequency domain.

Since the channel access pattern significantly determines the frequency hopping behavior in TSMA within a network, a suitable method may be used to ensure that there is a minimum distance between two consecutive frequency channels of the channel access pattern.

Thus, in embodiments, the frequency/time mapper 138 (cf. FIG. 5 or 6) may be configured to determine frequency information f and time information t on the basis of the pseudo-random number R, wherein the frequency information f indicates a distance between two consecutive frequency channels.

Thus, the frequency/time mapper 138 in FIG. 5 or 6, which determines absolute frequency channels independently from access to access on the basis of the pseudo-random number R, may alternatively also determine distances between two consecutive frequency channels.

Figure 7:
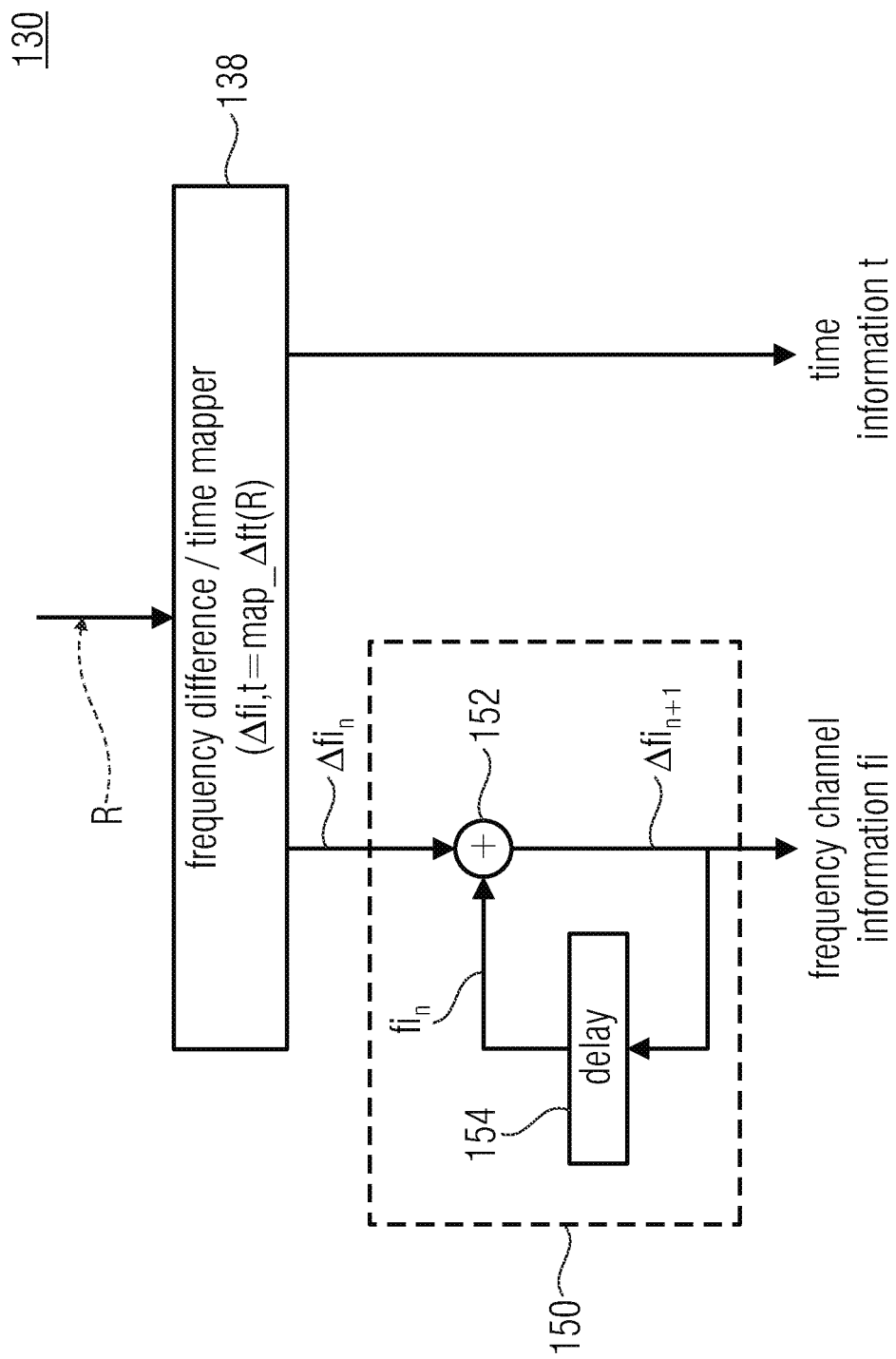
FIG. 7 shows a schematic block circuit diagram of a section of the controller, according to an embodiment of the present invention.

FIG. 7 shows a schematic block circuit diagram of a section of the controller 130, according to an embodiment. As can be seen in FIG. 7, the frequency/time mapper 138 (cf. FIG. 5 or 6) may be configured to determine frequency information and time information on the basis of the pseudo-random number R, wherein the frequency information indicates a distance $\Delta fi_n$ between two consecutive frequency channels.

As can further be seen in FIG. 7, the controller 130 may comprise a mapper 150 configured to map the distance $\Delta fi_n$ between two consecutive frequency channels onto a frequency channel index fi, e.g. by means of a combiner (e.g. adder) 152 and a delay element 154.

In other words, FIG. 7 shows the generation of frequency hops with minimum and/or maximum hop widths. FIG. 7 illustrates that the frequency/time mapper 138 of FIG. 5 or 6 is now replaced by a frequency difference/time mapper 138 that no longer provides absolute frequency channel indices at its immediate output, but frequency channel index differences.

By means of a suitable mapping function $(\Delta fi,t)=\text{map\_}\Delta ft(R)$ in the frequency difference/time mapper, it may be ensured that only frequency channel index hops $\Delta fi_n = fi_{n+1} - fi_n$ (from channel access n to channel access n+1) are carried out, e.g., that are within a desired range, e.g., $\Delta fi_{max} \geq \Delta fi \geq \Delta fi_{min}$ for $\Delta fi > 0$ and $\Delta fi_{max} \geq (-\Delta fi)$ $\Delta fi_{min}$ for $\Delta fi < 0$. There are numerous methods for the implementation of such a limitation, which are not subject of the invention. An exemplary implementation in the form of a corresponding program code for MATLAB (which was used to generate FIG. 8) can be found in the appendix.

Figure 8:
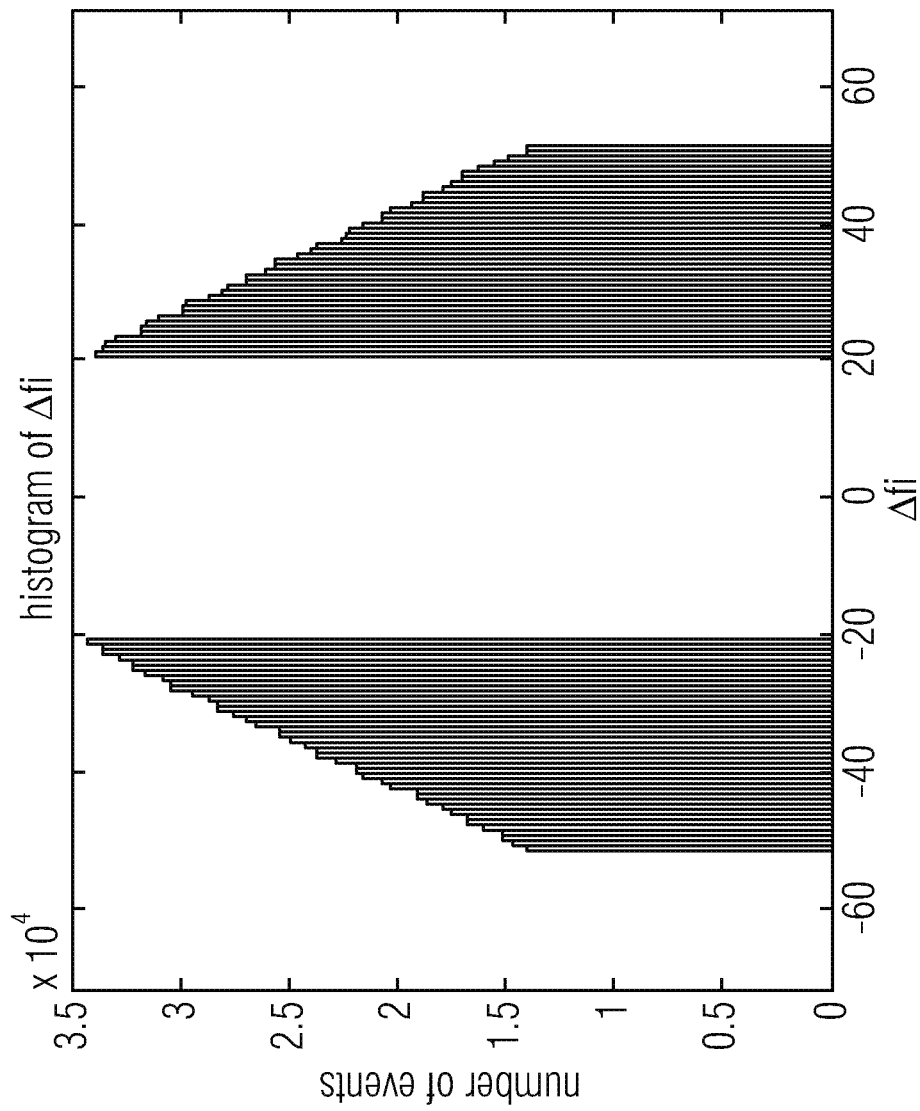
FIG. 8 shows, in a diagram, a Monte Carlo simulation-based histogram about the variable $\Delta f_i$.

FIG. 8 shows, in a diagram, a Monte Carlo simulation-based histogram about the variable $\Delta fi$ (the difference of the frequency channel index $\Delta fi$ between temporally adjacent channel accesses).

72 frequency channels are available in the illustrated example. The parameters associated with the simulation results are $\Delta fi_{min}=21$, $\Delta fi_{max}=51$, i.e. the size of the distance between two accesses that are consecutive in the channel access pattern is between 21 and 51 frequency channels.

By suitable modifications of the exemplary program code, which are easily accessible to the person skilled in the art, other distribution forms than those shown in FIG. 8 can be generated for $\Delta fi$ (e.g. equal distribution in the range from $-\Delta f_{min}$ to $-\Delta fi_{max}$, or $+\Delta fi_{min}$ to $+\Delta fi_{max}$).

A.3. Specification of the Temporal Channel Access Activity

In a highly utilized system, all available time slots may be included in the channel access pattern. In less utilized systems, not every time slot needs to be available for the channel access. This is illustrated in the following illustration.

Figure 9:
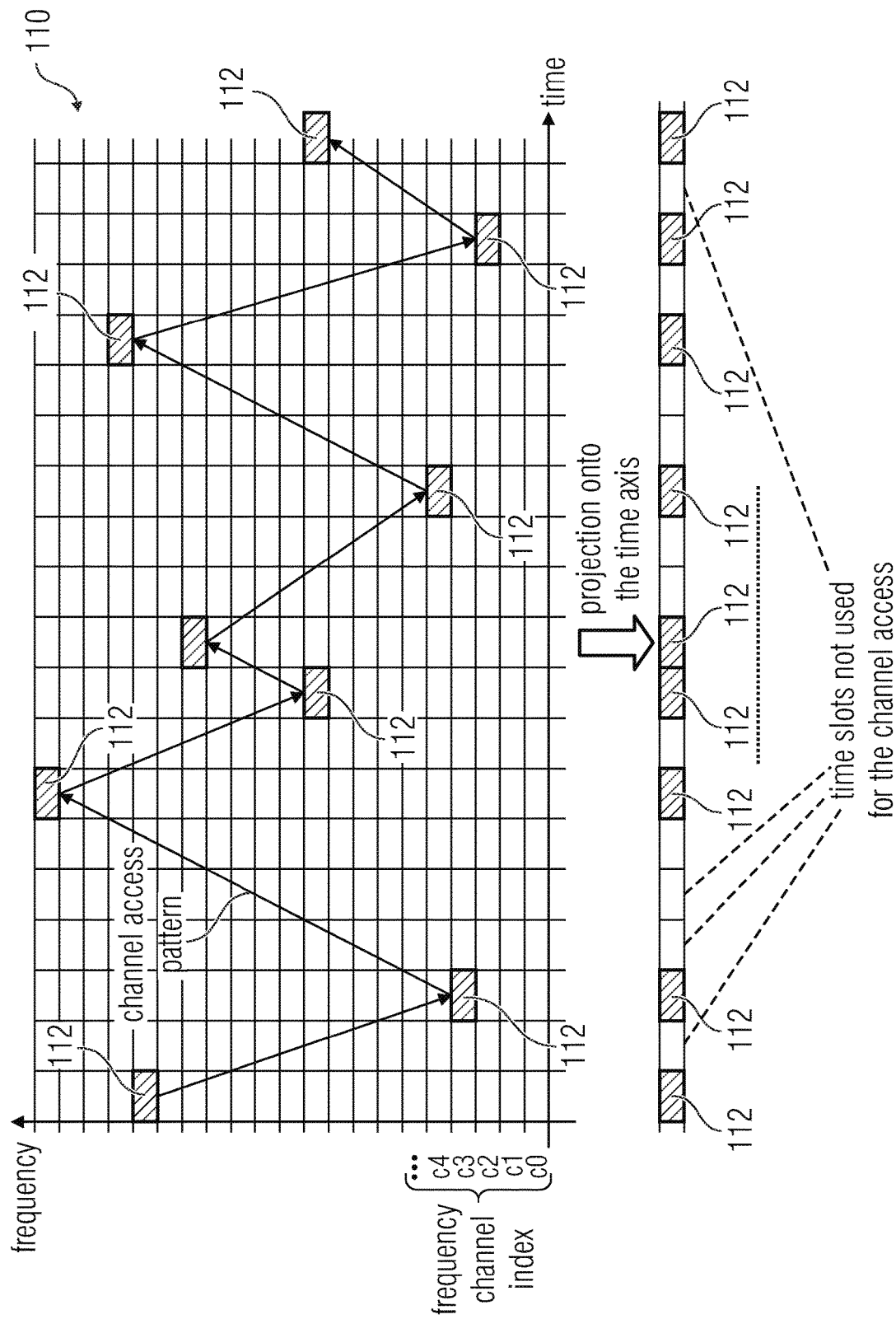
FIG. 9 shows, in a diagram, a frequency hop-based and time hop-based occupancy of the resources of the frequency band defined by a channel access pattern and a projection of the channel access pattern onto a time axis, according to an embodiment of the present invention.

FIG. 9 shows, in a diagram, a frequency hop-based and time hop-based occupancy of the resources 112 of the frequency band defined by a channel access pattern 110 and a projection of the channel access pattern 110 onto a time axis, according to an embodiment of the present invention. Here, the ordinate describes the frequency channel indices and the abscissa describes the time slot indices.

In other words, FIG. 9 exemplarily shows at its top a channel access pattern 110 in the dimensions frequency and time (resource elements 112), and shows at its bottom its projection onto the time dimension. What can be is seen is that not every time slot is part of the channel access pattern 110.

Thus, to generate a pseudo-random channel access pattern 110, the dimension time (in the form of the time slot index) is available in addition to the dimension frequency (in the form of the frequency channel index. Thus, when generating a channel access pattern, a mean activity rate A may be specified. Here, this activity rate is defined as a mean ratio of time slots used for the channel access to maximum available time slots. Thus, the activity rate A is 1 (100%) when using every time slot. However, if only every third time slot is included in the channel access pattern on average, the mean activity rate A=1/3.

Thus, the activity rate determines the (temporal) density of the resources 112 offered in the channel access pattern 110.

In embodiments, the time slots selected for the channel access at a specified activity rate may be determined in a pseudo-random manner from a suitable part of the pseudo-random number R (cf. FIG. 5 or 6).

Embodiment 1

In each step n, an integer number $r_n$ may be derived from the associated pseudo random number $R_n$, which may adopt the values between $r_{min}$ and $r_{max}$, i.e., $r_{min} \leq r_n \leq r_{max}$. After every time slot that is active in the channel access pattern 110, a number of $r_n$ time slots may be skipped, thus, they are not used for the channel access. This process is exemplarily illustrated in FIG. 10.

Figure 10:
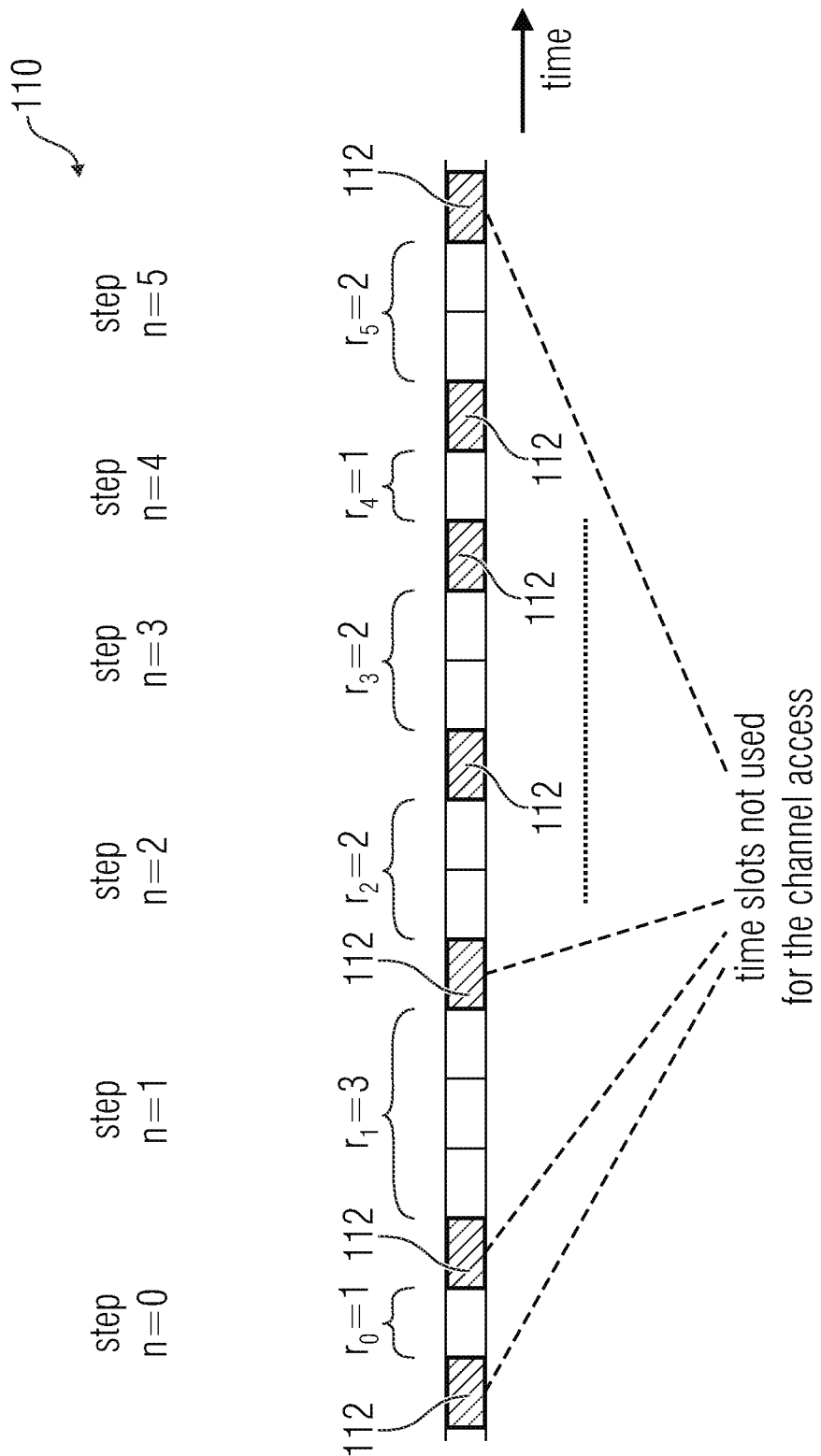
FIG. 10 shows, in a diagram, resource elements of a channel access pattern projected onto a time axis, resulting in unused time slots, according to an embodiment of the present invention.

In detail, FIG. 10 shows, in a diagram, resource elements 112 of a channel access pattern 110 projected onto a time access, resulting in unused time slots, according to an embodiment.

In other words, FIG. 10 shows an exemplary sequence of used and unused time slots, according to an embodiment.

If the number r is derived from the number R such that the elements of r occur with the same frequency between $r_{min}$ and $r_{max}$ (equal distribution), the following activity rate results:

$A=2/(2+r_{min}+r_{max})$.

The method presented in the above embodiment has the advantage that minimum and maximum distances between the time slots active in the channel access pattern 110 may be specified. Specifying minimum distances may be particularly advantageous for battery-powered devices, where transmission pauses of a certain minimum length between two consecutive emissions (recovery phase) increase the battery life.

A comparable approach, what can be specified is that a minimum number of active time slots directly follow each other.

Embodiment 2

In an implementation according to embodiment 1, what may occur are longer regions having locally significantly higher or lower activity rates than desired. This effect is avoided in the following embodiment.

Figure 11:
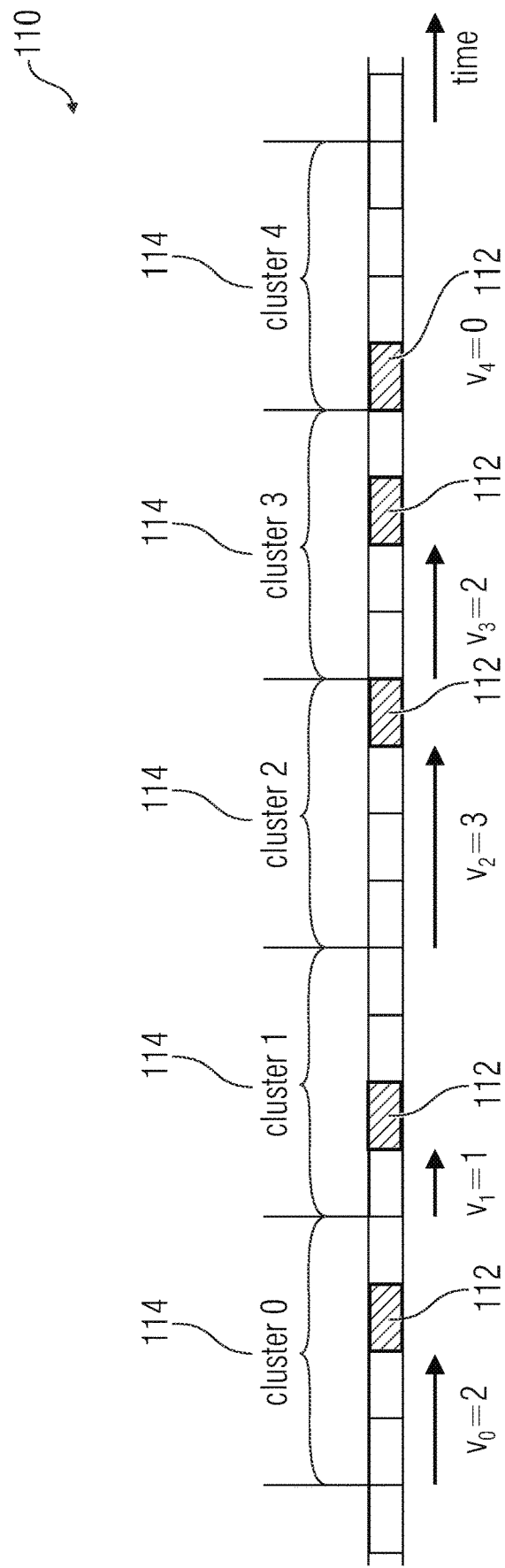
FIG. 11 shows, in a diagram, resource elements of a channel access pattern projected onto a time axis, with an activity rate $A=1/4$, according to an embodiment of the present invention.

Here, groups of consecutive time slots in which one active time slot of the channel access pattern each is placed are periodically specified. In FIG. 11, this is exemplarily illustrated for an activity rate of 1/4 (25%).

In detail, FIG. 11 shows, in a diagram, resource elements 112 of a channel access pattern 110 projected onto a time access, with an activity rate A=1/4, according to an embodiment.

In other words, FIG. 11 shows an exemplary sequence of used and unused time slots, according to an embodiment.

As can be seen in FIG. 11, the time slots may be grouped into clusters 114 (having the length of 4 in the example of FIG. 11). Exactly one time slot of the channel access pattern 110 is placed into each cluster 114. The position of the time slots included in the channel access pattern 110 within the cluster 114 may be determined by a displacement v, that may be derived from the pseudo random number $R_n$ and may adopt integer numbers between 0 and (cluster length -1).

If a minimum distance between two consecutive time slots of the channel access pattern 110 is to be ensured, non-occupiable regions may be introduced between the clusters 114. They may consist of one or several time slots, as is illustrated in FIG. 12.

Figure 12:
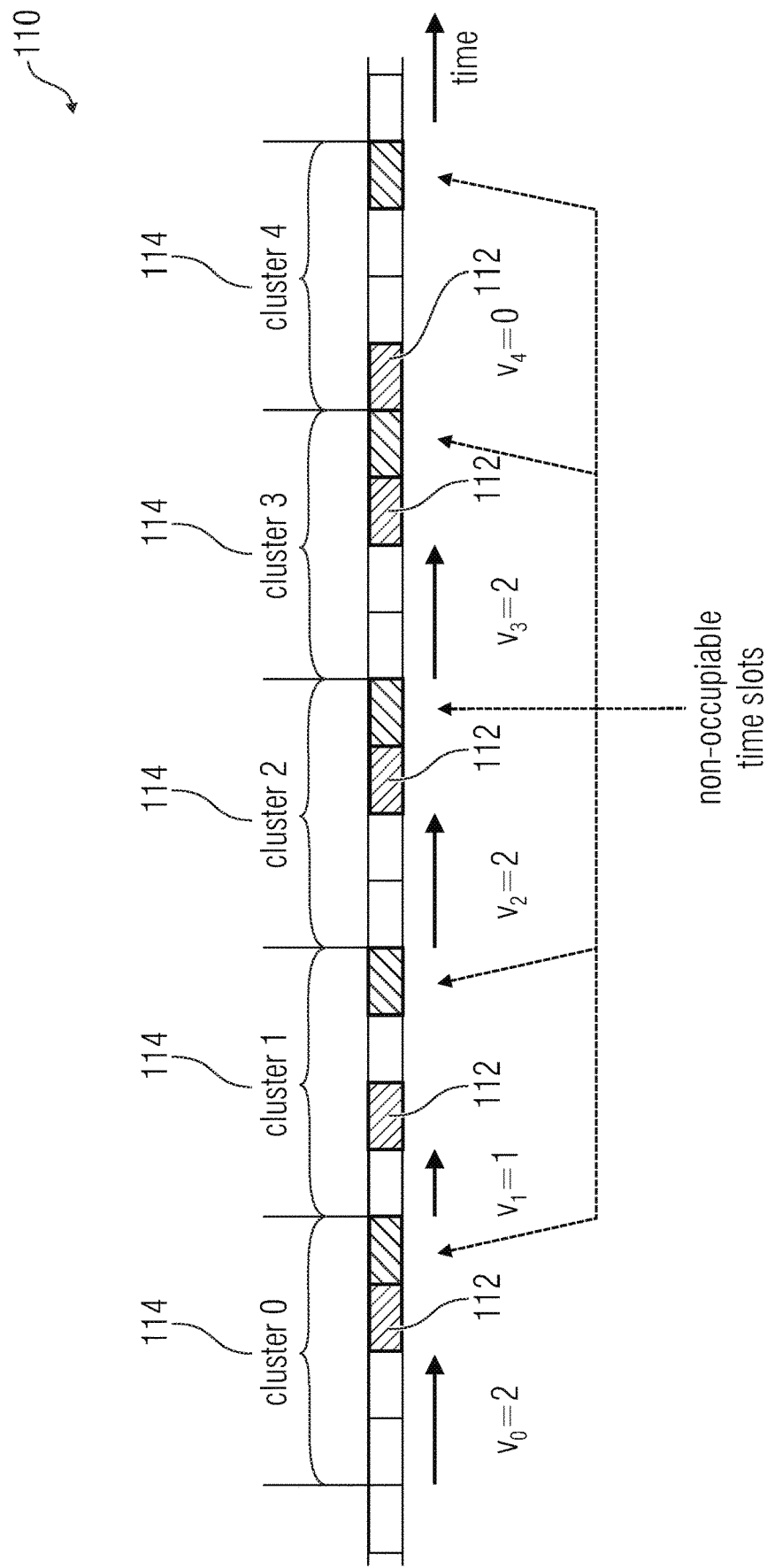
FIG. 12 shows, in a diagram, resource elements of a channel access pattern projected onto a time axis, with an activity rate $A=1/4$ and a specified minimum distance between consecutive time slots of the channel access pattern, according to the embodiment of the present invention.

In detail, FIG. 12 shows, in a diagram, resource elements 112 projected onto a time access of a channel access pattern 110, with an activity rate A=1/4 and a specified minimum distance between consecutive time slots of the channel access pattern 110, according to an embodiment.

In other words, FIG. 12 shows an exemplary sequence of used and unused time slots with non-occupiable time slots, according to an embodiment.

As can be seen in FIG. 12, due to the non-occupiable time slots, the admissible range of the displacement variable v, is decreased to the value range of 0 to (cluster length—1—length of the non-occupiable region).

Depending on the selected activity rate, the clusters 114 may have to comprise different lengths in order to achieve the desired activity rate. In this case, the value range of v, varies according to the respective cluster length. For example, in order to set an activity rate of 40%, clusters of the length of two and the length of three may alternate.

A.4. Channel Access Pattern with Regions of Different Activity Rates

Data packets that are to reach the receiver as quickly as possible (short latency time) require channel accesses that follow each other as closely as possible during transfer, i.e. a comparatively high activity rate in the channel access pattern.

On the other hand, for data packets where a transmission reliability (e.g. high robustness against external disturbance) is of primary importance, a distribution of the emission over a longer period of time can be advantageous, i.e. a comparatively low activity rate in the channel access pattern can be favorable. The same applies to devices where a temporally equalized energy extraction from the battery (temporally stretched transmission activity) is desired.

As illustrated above, the activity rate, i.e. the frequency of the channel access, may be specified by suitable measures. In order to satisfy the different requirements in a network, if any, a channel access pattern may be designed such that it comprises regions with different activity rates. This is exemplarily illustrated in FIG. 13. Depending on the individual requirement, terminal devices may then transmit in the region suitable for them, for example.

Figure 13:
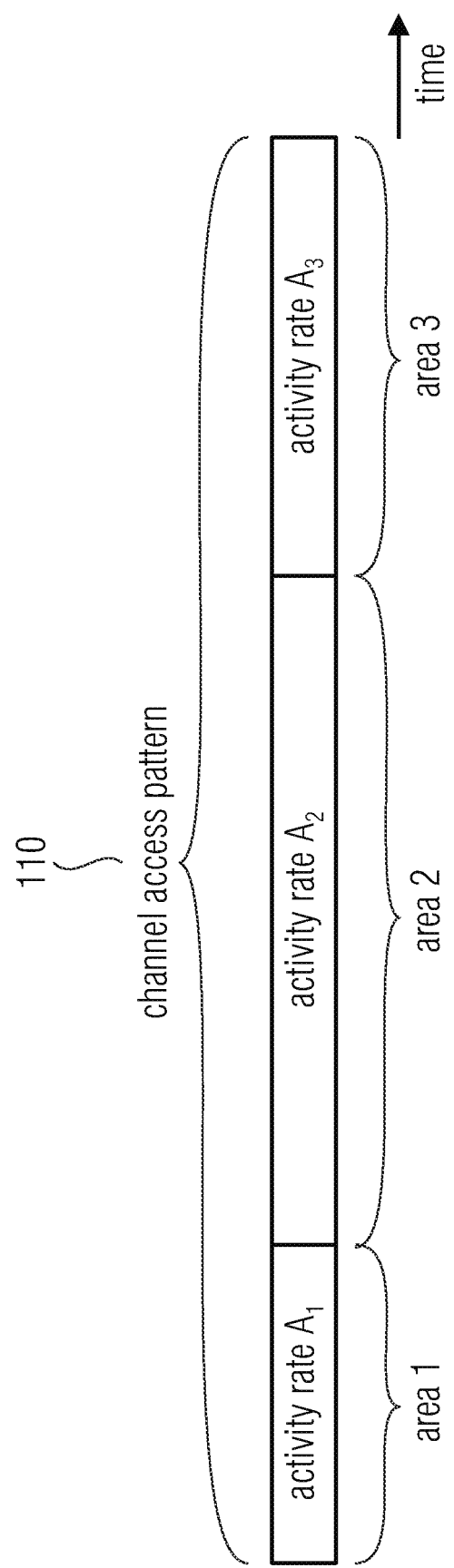
FIG. 13 shows a temporal distribution of a channel access pattern 110 into regions of different activity rates A1, A2, and A3, according to an embodiment of the present invention.

In detail, FIG. 13 shows a temporal distribution of a channel access pattern 110 into regions of different activity rates $A_1$, $A_2$, and $A_3$, according to an embodiment.

In other words, FIG. 13 shows an example of a channel access pattern with three regions of different activity rates within the channel access pattern 110.

A.5. Demand-Dependent (Dynamic) Adaption of the Activity Rate of the Channel Access Pattern In networks (or communication systems) 102, different utilization situations may exist at different times. As explained above, the actively usable resource supply for this network may be determined by the design of the channel access pattern 110 (i.e. its activity rate or mean temporal density).

Providing a large resource supply (high activity rate) at a low actual utilization may be disadvantageous especially for battery-powered devices. An example for this is a battery-operated base station (e.g. of a PAN network, possibly in the so-called repeater operation) which operates the receiver during all active resources of the channel access pattern and therefore uses energy.

Thus, it can be useful to adapt the mean activity rate dynamically, i.e. the temporal density of the resources offered by the channel access pattern 110, with respect to the existing utilization conditions. If the activity rate of the channel access pattern 110 is changed, this is accordingly signaled to the participants in the network, to which end the beacon signal (or also dedicated signaling resources) may be used, for example.

If a terminal device 106 is in an extended idle state (energy-saving mode), it may not receive the emitted signaling information of the base station 104 about a possibly changed channel access pattern during the idle state. In such a scenario, it may be useful for a channel access pattern 110 to provide a minimum supply of (basic) resources that is available at any time and without special signaling, and an additional supply of resources that may be added depending on the utilization and that is subject to appropriate signaling.

Figure 14:
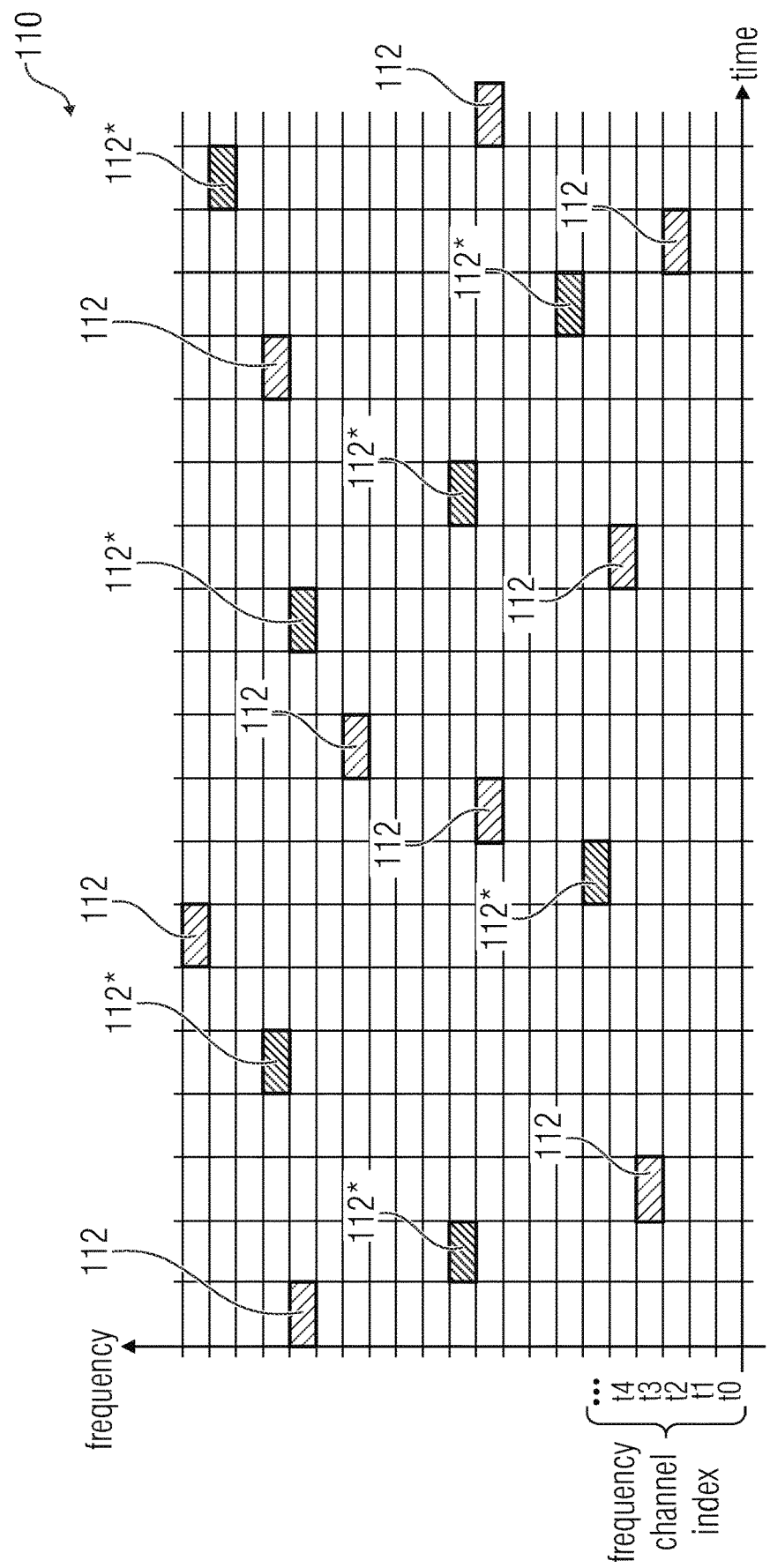
FIG. 14 shows, in a diagram, a frequency hop-based and time hop-based occupancy of the resources of the frequency band defined by a channel access pattern, wherein the channel access pattern additionally comprises resources activatable on demand, according to an embodiment of the present invention.

In the above sense, e.g., resources additionally added to the channel access pattern may be arranged temporally after the basic resources, or may be arranged interleaved with them in the time/frequency grid, as is shown in FIG. 14.

In detail, FIG. 14 shows, in a diagram, a frequency hop-based and time hop-based occupancy of the resources 112 of the frequency band defined by a channel access pattern 110, wherein the channel access pattern 110 additionally comprises resources 112*activatable on demand, according to an embodiment of the present invention. Here, the ordinate describes the frequency channel indices and the abscissa describes the time slot indices.

In other words, FIG. 14 shows an example for interleaved basic and additional resources.

A.6. Adaptive Frequency Domain Occupancy

In certain unlicensed frequency bands, users may possibly decide themselves without regulatory restrictions which frequency ranges they use within the frequency band. This may lead to the fact that certain areas of the available frequency band are occupied more heavily by external users than others and are therefore exposed to stronger disturbances.

If a base station 104 determines such a medium- or long term asymmetric utilization of the frequency band (e.g. through signal-to-interference power estimations per frequency channel based on received signals), the above-average occupied range of the frequency band may be avoided for the use by the own network by not including the associated frequency channels into the channel access pattern. This is to be considered in the frequency/time mapper (cf. FIG. 5 or 6) and is appropriately signaled to all network participants.

For example, the group of the excluded frequency channels may be described by corresponding start and end frequency channel indices or by a start frequency channel index and a following channel quantity.

Figure 15:
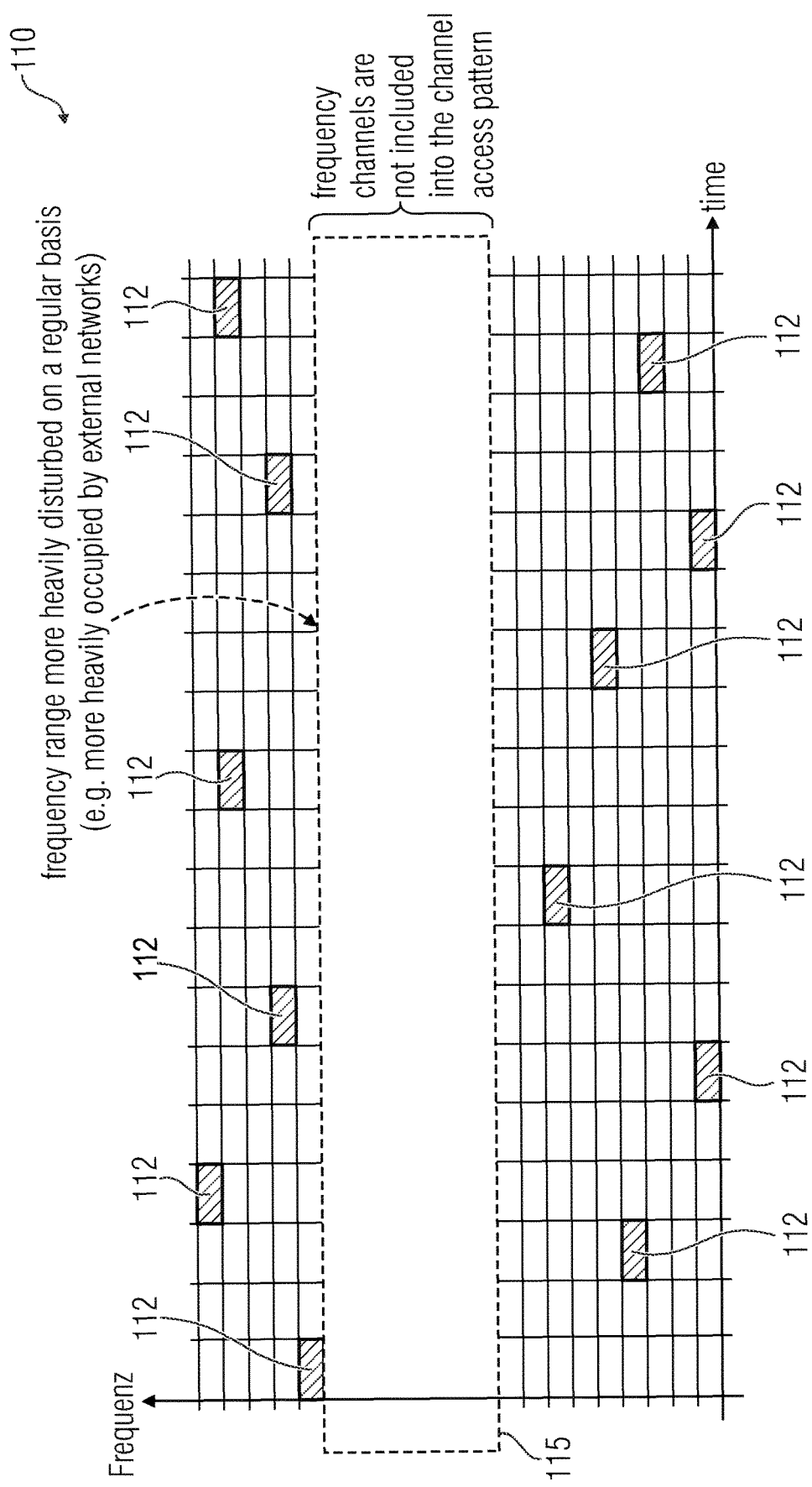
FIG. 15 shows, in a diagram, a frequency hop-based and time hop-based occupancy of the resources of the frequency band defined by a channel access pattern, wherein a frequency range of the frequency band that is regularly disturbed more heavily is not occupied by the channel access pattern, according to an embodiment of the present invention.

FIG. 15 shows, in a diagram, a frequency hop-based and time hop-based occupancy of the resources 112 of the frequency band defined by a channel access pattern 110, wherein a frequency domain 115 of the frequency band that is regularly disturbed more heavily is not occupied by the channel access pattern 110, according to an embodiment of the present invention. Here, the ordinate describes the frequency channel indices and the abscissa describes the time slot indices.

As can be seen in FIG. 15, a frequency domain 115 that is regularly disturbed more heavily (e.g. heavily occupied by external networks) may be considered when generating the channel access pattern 110. Thus, frequency channels of this frequency domain 115 are not included into the channel access pattern 110.

In other words, FIG. 15 shows an example of the exclusion of heavily disturbed frequency channels from the channel access pattern.

With avoiding disturbance-prone frequency domains for the data transfer in the own network, there is a certain utilization balancing across the frequency band by other networks not experiencing any additional disturbances in the already heavily utilized frequency domains.

A.7. Bundling Resource Elements in the Frequency Domain (Frequency Channel Bundling)

Depending on the hardware and software used, it is possible for a base station 104 to receive on several frequency channels simultaneously (frequency channel bundling). In this case, it is advantageous, especially with more heavily utilized systems, to accordingly increase the number of the resource elements offered within the network in the frequency dimension and to include several frequency channels within a time slot into the channel access pattern, as is shown in FIG. 16.

Figure 16:
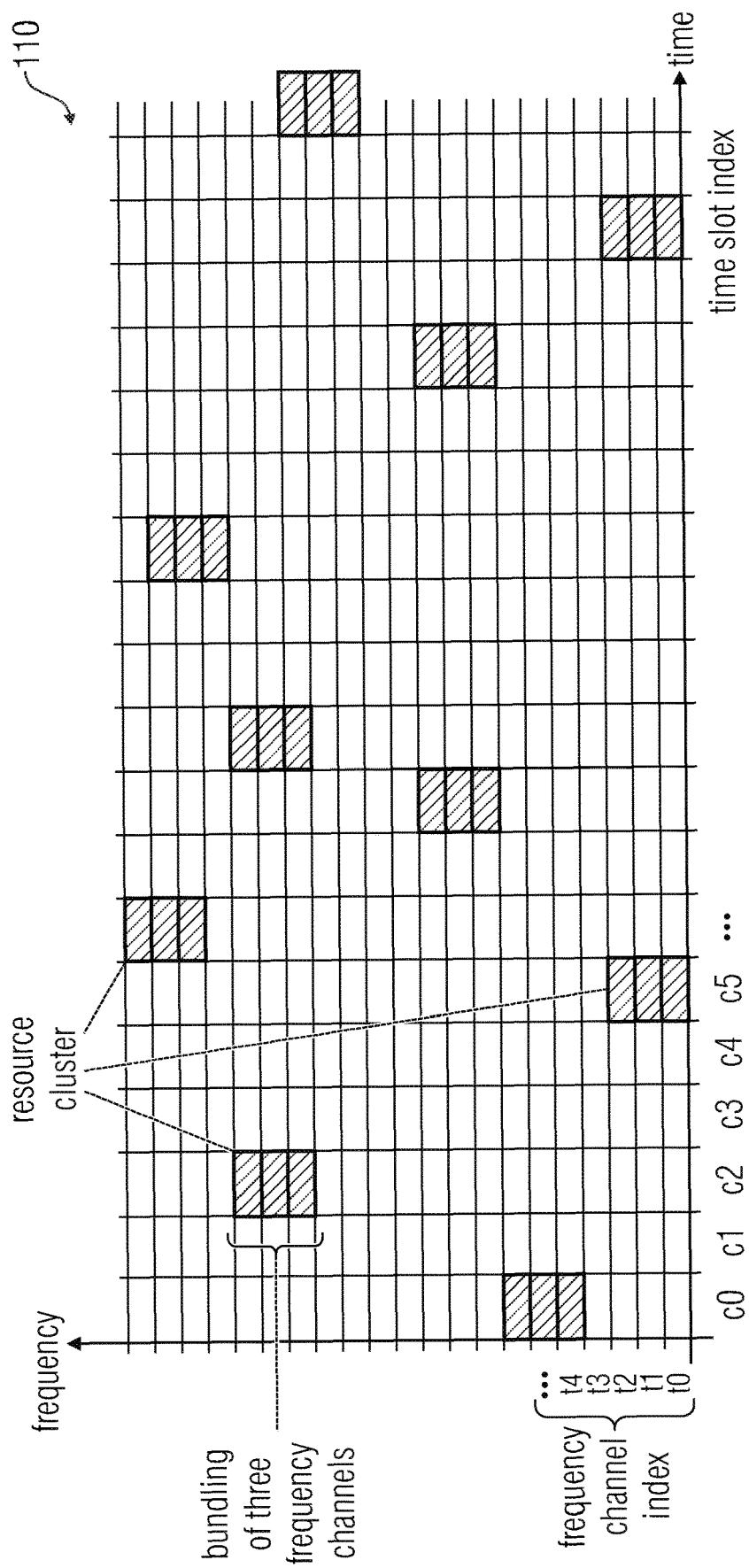
FIG. 16 shows, in a diagram, a frequency hop-based and time hop-based occupancy of the resources of the frequency band defined by a channel access pattern, wherein resources in the frequency domain or range are bundled, according to an embodiment of the present invention.

In detail, FIG. 16 shows, in a diagram, a frequency hop-based and time hop-based occupancy of the resources 112 of the frequency band defined by a channel access pattern 110, wherein resources 112 are bundled in the frequency domain, according to an embodiment. Here, the ordinate describes the frequency channel indices and the abscissa describes the time slot indices.

In other words, FIG. 16 shows an exemplary illustration of the channel access pattern 110 with the bundling of three adjacent frequency channels into resource clusters, respectively. In this case, FIG. 16 exemplarily illustrates the bundling of three frequency channels, respectively. Each group of resource elements of a time slot may be referred to as a "resource cluster". The channel access pattern 110 may be extended by the information about the number of the frequency channels constituting a resource cluster.

In a further embodiment, the frequency channels grouped into resource clusters do not necessarily have to be immediately adjacent.

The following shows how one or several participants of a communication system 102 are able to access, by using a relative channel access pattern, a selection of the resources cleared for the communication system 102 by the network-specific channel access pattern 110.

B. Channel Access Via Relative Channel Access Patterns

Figure 17:
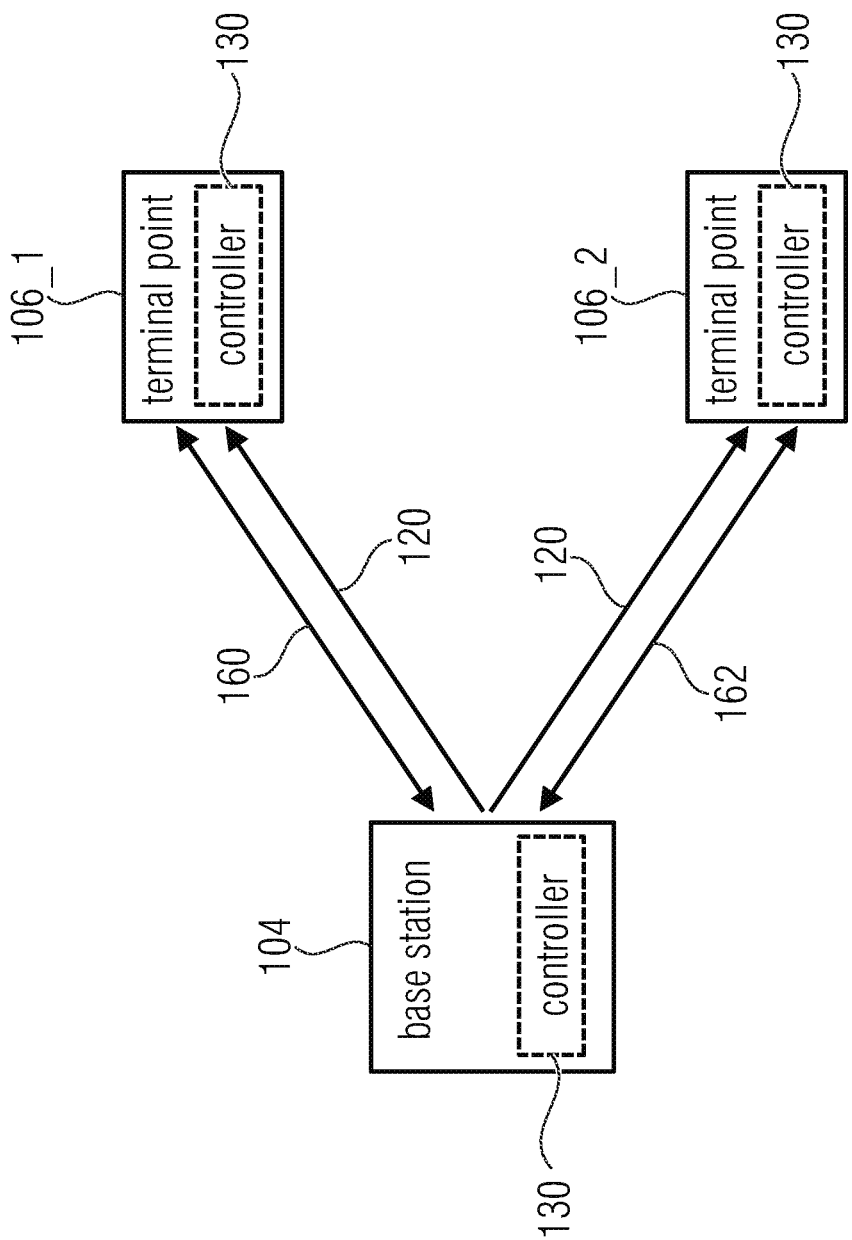
FIG. 17 shows a schematic block circuit diagram of a communication system with one base station and two terminal points, according to an embodiment of the present invention.

FIG. 17 shows a schematic block circuit diagram of a communication system 102 with one base station 104 and two terminal points 106_1-106_2, according to an embodiment of the present invention.

The communication system 102 shown in FIG. 17 comprises one base station 104 and two terminal points 106_1-106_2. However, the present invention is not limited to such embodiments, rather, the communication system 102 may comprise one or several terminal points 106_1-106_n, wherein n is a natural number larger than or equal to one. For example, the communication system may comprise 1, 10, 100, 1,000, 10,000, or even 100,000 terminal points.

As already explained in detail above (cf. FIG. 4, for example), the participants (=base station 104 and terminal points 106_1-106_2) of the communication system use for the mutual communication a frequency band (e.g. a license-free and/or permission-free frequency band, e.g. the ISM bands) also used for communication by a plurality of communication systems. In this case, the communication system 102 operates uncoordinatedly with respect to the other communication systems that use the same frequency band.

As also explained in detail above, the base station 104 is configured to transmit a signal 120, wherein the signal 120 comprises information about a network-specific channel access pattern 110, wherein the network-specific channel access pattern 110 indicates a frequency hop-based and/or time hop-based occupancy of resources of the frequency band, usable for the communication of the communication 102, while the terminal points 106_1-106_2 are configured to receive the signal 120, and to determine the network-specific channel access pattern 110 on the basis of the information about the network-specific channel access pattern (cf. FIGS. 5 and 6, for example).

For the mutual communication, i.e. for the mutual transfer of data, the participants (e.g. the base station 104 and terminal point 106_1) of the communication system 102 may use a relative channel access pattern that indicates which ones of the resources cleared or usable by the network-specific channel access pattern 110 for the communication of the communication system 102 are actually to be used for the transfer of the data.

In detail, in embodiments, the base station 104 may be configured to transfer (e.g. to transmit to the terminal point 106_1 and/or to receive from the terminal point 106_1) data 160 (e.g. a signal with the data 160) by using a relative channel access pattern, wherein the relative channel access pattern indicates, from the usable frequency hop-based and/or time hop-based occupancy of resources of the network-specific channel access pattern 110, an occupancy of resources that is to be used for the transfer.

In embodiments, the terminal point 106_1 may be configured to transfer (e.g. to receive from the base station and/or to transmit to the base station 104) data 160 (e.g. a signal with the data 160) by using the relative channel access pattern, wherein the relative channel access pattern indicates, from the usable frequency hop-based and/or time hop-based occupancy of resources of the network-specific channel access pattern, an occupancy of resources that is to be used for the transfer.

In embodiments, what may be used for the mutual communication between other participants (e.g. the base station 104 and the terminal point 106_2) of the communication system 102 is another relative channel access pattern that indicates which ones of the resources cleared or usable by the network-specific channel access pattern 110 for the communication of the communication system 102 are actually to be used for the transfer of the data, wherein the relative channel access pattern (e.g. of the terminal point 106_1) and the other relative channel access pattern (e.g. of the terminal point 106_2) are different.

For example, in embodiments, the base station 104 may further be configured to transfer (e.g. to transmit to the other terminal point 106_2 and/or to receive from the other terminal point 106_2) data 162 (e.g. a signal with the data 162) by using another relative channel access pattern, wherein the other relative channel access pattern indicates, from the usable frequency hop-based and/or time hop-based occupancy of resources of the network-specific channel access pattern, an occupancy of resources that is to be used for the transfer, wherein the relative channel access pattern and the other relative channel access pattern are different.

The other terminal point 106_2 may be configured to transfer (e.g. to receive from the base station 104 and/or to transmit to the base station 104) data 162 (e.g. a signal with the data 162) by using the other relative channel access pattern, wherein the other relative channel access pattern indicates, from the usable frequency hop-based and/or time hop-based occupancy of resources of the network-specific channel access pattern, an occupancy of resources that is to be used for the transfer wherein the relative channel access pattern and the other relative channel access pattern are different.

Embodiments of the application and generation of relative channel access patterns are described in the following. Here, the relative channel access pattern may be determined by the participants (e.g. the base station 104 and at least one of the terminal points 106_1-106_2), e.g. by the controller 130 that is implemented in the participants.

The following embodiments refer to the embodiments described in section A, which, in the case of a coexistence of several mutually uncoordinated radio networks (e.g. LPWAN, PAN) in a mutual reception range, design the access to a mutually used frequency band such that the network-wide reciprocal disturbances of the participants, or their disadvantageous effects on the transmission reliability, are reduced or even minimized.

The following description assumes a communication arrangement of mutually uncoordinated radio networks for the data transfer, said networks accessing a mutually used frequency band. Some embodiment require the so-called telegram splitting multiple access (TSMA) method to be used in the data transfer, as described in [1], for example. In this case, a data packet protected by means of channel coding is split into several partial data packets that are transferred in several different time and/or frequency resources.

Furthermore, some embodiments require within each network there is a coordinating instance (in the following referred to as "base station", in the context of the IEEE standard [2] referred to as "PAN coordinator") that may transfer information about the channel access pattern used within the network to the non-coordinating participants of the network (in the following referred to as "terminal devices" or "terminal points"). The above-described channel access patterns (cf. section A) define a supply of radio resources (resource elements) fundamentally available for transfer for a certain period of time within a network. Thus, they define the base station-specified supply of resources (valid for the considered period of time) that the terminal devices can access.

In the case of channel access methods, a fundamental distinction is made between a "contention-free access" and a "contention-based access". In the contention-free access, the coordinating instance (base station) assigns unambiguously specified radio resources to a terminal device for the exclusive use. In the contention-based access—which embodiments refer to—the terminal device has available a supply of radio resources from which the terminal device serves itself on demand and on its own initiative, i.e. without individual resource allocation. What is characteristic here is that other terminal devices may also use the same supply so that there may be contentions in the access to the mutually used radio resources. The aim is to reduce or even avoid these contentions as far as possible.

Thus, embodiments deal with techniques that make the distribution of the available resources (determined by the base station) as effective as possible so that the disturbances between the participants within the network are reduced or even minimized.

Embodiments of the present invention relate to a hierarchical division of the channel access with the use of the TSMA method:

The specification of a supply of available radio resources by the base station in the form of the network-specific channel access pattern (cf. section A). Here, the channel access patterns have the task to arrange the access of several mutually uncoordinated networks to a mutually used frequency band such that the participants of different networks impair each other as little as possible (goal: mutual separation of the networks).

The selection and use of radio resources from the above-mentioned network-specific channel access pattern ("supply") by terminal devices in the form of a relative channel access pattern. The relative channel access pattern is hierarchically located below the network-specific channel access pattern and cannot use resources that are outside of the network-specific channel access pattern. Therefore, indexing of the resources may be advantageously carried out relative to the network-specific channel access pattern. It is the task of the different relative channel access patterns to provide, in the context of a contention-based access, to several participants within a network (possibly in the same period of time) access to the mutual resource supply, wherein the participants within the network are to mutually impair each other as little as possible (goal: separation of the participants within a network).

According to embodiments, there is a supply of relative channel access patterns that is known to the base station and to the terminal devices of the network and from which the terminal device uses, e.g., one for each transfer. The selection of a relative channel access pattern from the available supply may be done according to different criteria and is described in more detail below.

B.1. Channel Access Via Hierarchically Organized Channel Access Patterns

As explained above, embodiments of the present invention relate to the hierarchical structure of the channel access pattern of network participants of two components:

a network-specific channel access pattern determining the supply of radio resources in the respective network at the given point in time (cf. section A), and a relative channel access pattern. This determines which of the available resources are actually occupied/used during a data transfer.

Thus, the actively used relative channel access pattern of a network participant consists of a subset of the network-specific channel access pattern.

Applying the described embodiment is particularly advantageous in the data transfer according to the TSMA method, where a data packet is transferred divided onto a plurality of partial data packets. For the purpose of illustration and without limiting the generality, the following description assumes that the frequency band is divided into a number of discrete frequency channels and that a temporal discretization of the accesses within a network in the form of time slots is also carried out.

Figure 18:
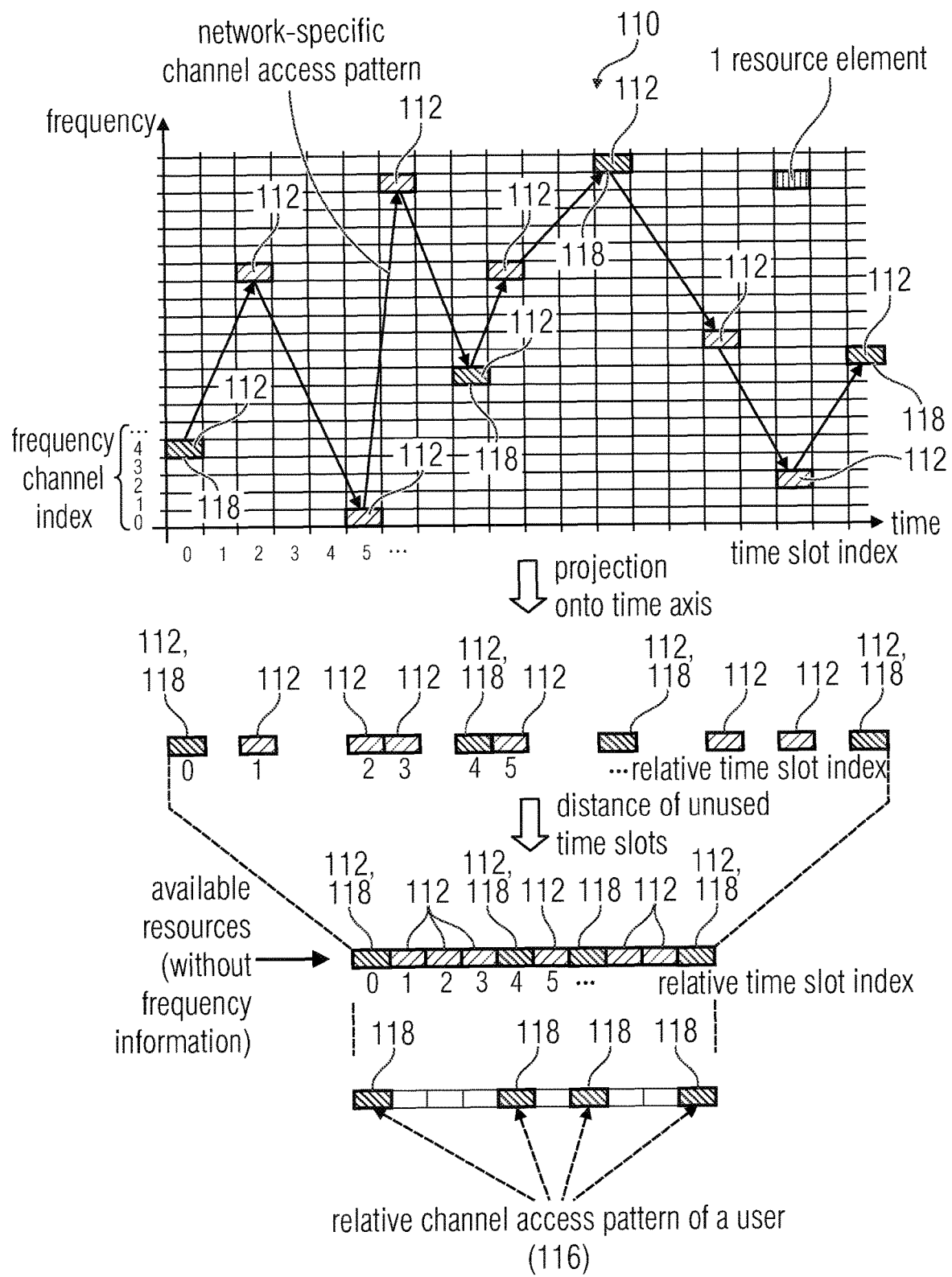
FIG. 18 shows, in a diagram, a frequency hop-based and time hop-based usable occupancy of resources of the frequency band, indicated by a network-specific channel access pattern, an occupancy of resources that is to be used for the transfer and is indicated by a relative channel access pattern from the usable occupancy of resources of the network-specific channel access pattern, and projections of the channel access patterns onto time axes before and after the removal of unused resources (e.g. time slots), according to an embodiment.

FIG. 18 shows, in a diagram, a frequency hop-based and/or time hop-based usable occupancy of resources 112 of the frequency band, indicated by a network-specific channel access pattern 110, an occupancy of resources 118 that is to be used for the transfer and is indicated by a relative channel access pattern 116 from the usable occupancy of resources 112 of the network-specific channel access pattern 110, and projections of the channel access patterns 110, 116 onto time axes before and after the removal of unused resources (e.g. time slots), according to an embodiment. Here, the ordinate describes the frequency channel indices and the abscissa describes the time slot indices.

As can be seen in FIG. 18, the network-specific channel access pattern 110 defines the distribution of the resources 112 of the frequency band (e.g. each defined by a time slot and a frequency channel, or a time slot index and a frequency channel index) that may be used by the communication system 102 and therefore by the participants (base station 104 and terminal points 106_1-106_2) of the communication system 102 for the mutual communication, while the relative channel access pattern 116 indicates the resources 118 from the usable resources 112 that may actually be used for the mutual communication by a subset of the participants (e.g. a limited group of participants, e.g. of two participants, such as the base station 104 and the terminal point 106) of the communication system 102.

In other words, FIG. 18 shows a schematic exemplary illustration of the network-specific and relative channel access pattern (hierarchical structure of the channel access). FIG. 18 exemplarily shows at its top the division of the radio resources into a multitude of resource elements in a discrete time/frequency grid. Here, a resource element is described by a frequency channel index and a time slot index. FIG. 18 illustrates at its top a network-specific channel access pattern 110 highlighted by the resource elements 112 symbolically connected through arrows. This network-specific channel access pattern 110 represents the supply of resource elements 122 that is made available by a network (or communication system) 102. In this example, signal emission is possible in a time slot only on one frequency channel.

If the two-dimensional illustration is projected onto the time axis and if all time slots that are not occupied in the network-specific channel access pattern 110 are removed, what results according to the above illustration are the "available resources" 112. Temporal indexing may be advantageously done by a relative time slot index that is relative to the network-specific channel access pattern.

FIG. 18 exemplarily illustrates at its bottom a relative channel access pattern 116 that determines a subset from the available resources (possibly all of them). The channel access pattern that effectively results in the selected example (i.e. the hierarchical combination of a network-specific and a relative channel access pattern) is indicated in all regions of FIG. 18 by means of resource elements 118. Here, the relative channel access pattern with its relative time slot index may be calculated back to the original discrete time grid by means of the average activity rate A defined in section A. This average activity rate is defined as the average ratio of time slots used for the channel access to the total maximum available time slots. When using each time slot, the activity rate A is therefore 1 (100%). If, on the other hand, as is shown at the top of FIG. 18, only every second time slot is included in the channel access pattern on average (i.e. 10 of 20), the average activity rate $A=1/2$.

B.2. Bundling of Resource Elements in the Frequency Domain (Frequency Channel Bundling)

Depending on the hardware and software used, it is possible for a base station 102 to receive simultaneously on several frequency channels (frequency channel bundling). In this case, it is advantageous especially in more heavily utilized systems, to increase the number of the resource elements offered within the network in the frequency dimension accordingly and to include several frequency channels within a time slot into the network-specific channel access pattern 110. This is illustrated in FIG. 19.

Figure 19:
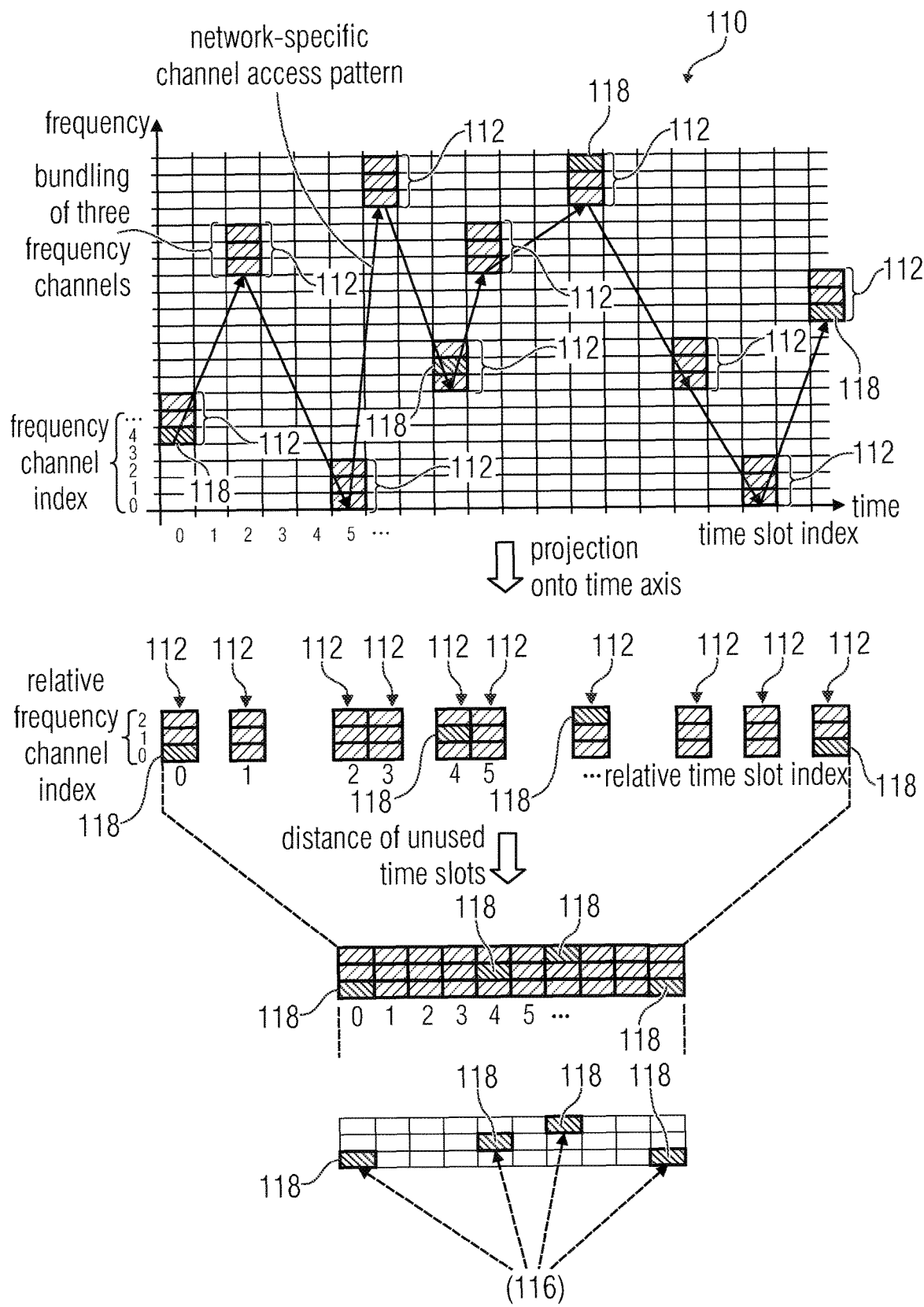
FIG. 19 shows, in a diagram, a frequency hop-based and time hop-based usable occupancy of frequency domain-bundled resources of the frequency band, indicated by a network-specific channel access pattern, an occupancy of resources that is to be used for the transfer and is indicated by a relative channel access pattern from the usable occupancy of resources of the network-specific channel access pattern, and projections of the channel access pattern onto time axes before and after the removal of unused resources (e.g. time slots), according to an embodiment.

In detail, FIG. 19 shows, in a diagram, a frequency hop-based and/or time hop-based usable occupancy of frequency domain-bundled resources 112 of the frequency band, indicated by a network-specific channel access pattern 110, an occupancy of resources 118 that is to be used for the transfer and is indicated by a relative channel access pattern 116 from the usable occupancy of resources 112 of the network-specific channel access pattern 110, and projections of the channel access patterns 110, 116 onto time axes before and after the removal of unused resources (e.g. time slots). Here, the ordinate describes the frequency channel indices and the abscissa describes the time slot indices.

As can be seen in FIG. 19, the network-specific channel access pattern 110 indicates in the frequency direction (e.g. per time slot or time slot index) a bundling of resources 112, i.e. a plurality of adjacent resources 112 (e.g. frequency channels or frequency channel indices), of the frequency band, wherein the relative channel access pattern 116 in the frequency direction indicates at most a subset (e.g. up to one resource, i.e. one or no resource) of the plurality of adjacent resources 112 of the network-specific channel access pattern 110.

In other words, FIG. 19 shows a schematic exemplary illustration of the network-specific channel access pattern 110 and the relative channel access pattern 116 in the case of gap-less frequency channel bundling.

FIG. 19 exemplarily shows a bundling of three respectively connected frequency channels per occupied time slot. Accordingly, with the relative channel access pattern 116, it is not only the time dimension but also the occupancy of the (in the example: three) frequency channels that is provided as a degree of freedom.

Figure 20:
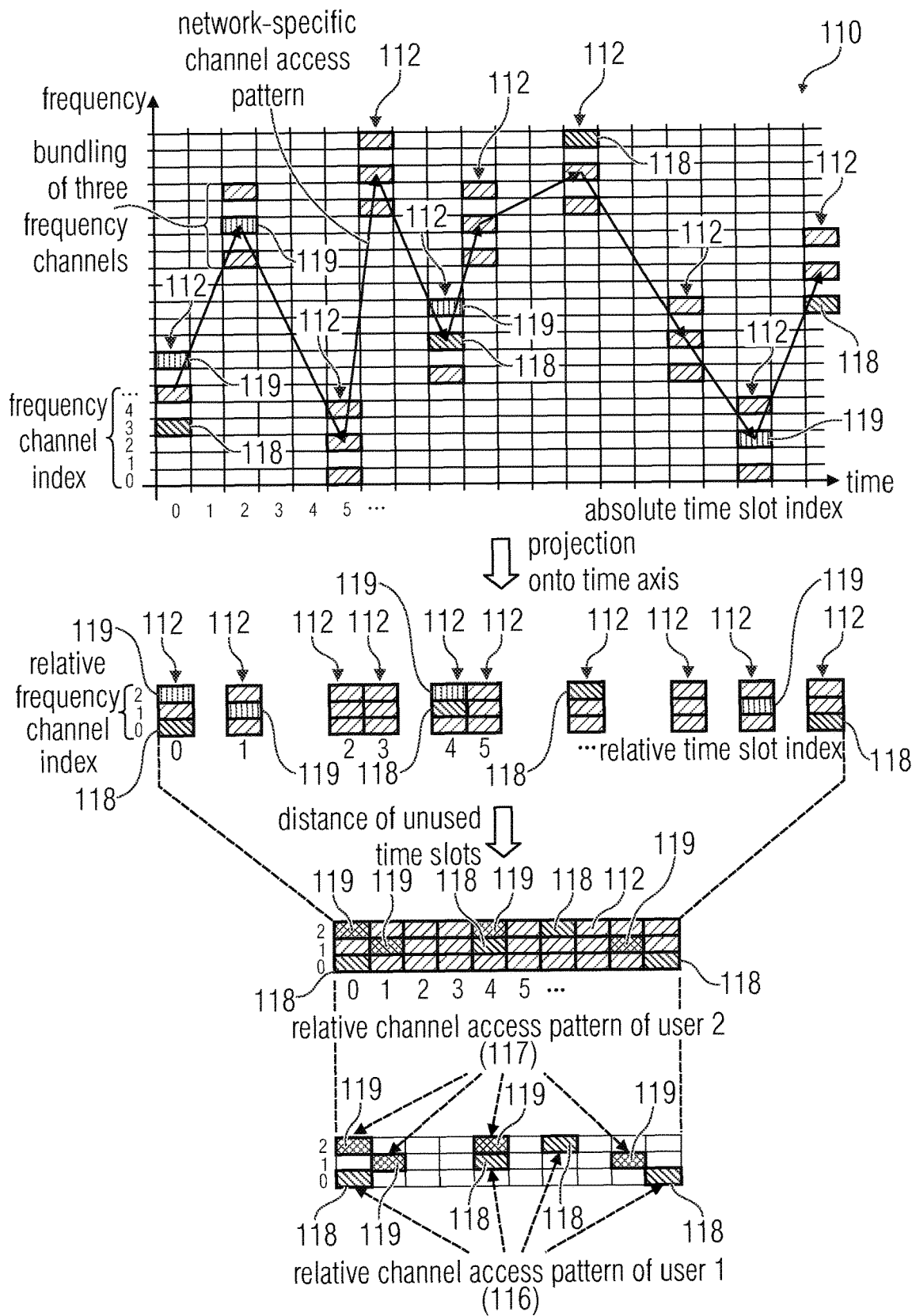
FIG. 20 shows, in a diagram, a frequency hop-based and time hop-based usable occupancy of frequency domain-bundled resources of the frequency band, indicated by a network-specific channel access pattern, an occupancy of resources that is to be used for the transfer and is indicated by a relative channel access pattern from the usable occupancy of resources of the network-specific channel access pattern, an occupancy of resources that is to be used for the transfer and is indicated by another relative channel access pattern from the usable occupancy of resources of the network-specific channel access pattern, and projections of the channel access patterns onto time axes before and after the removal of unused resources (e.g. time slots), according to an embodiment.

Correspondingly, it is also possible to proceed as described above if the several frequency channels available within a time slot are not available as a (gap-less) connected area, but are distributed in any other way across the available frequency channels, as is shown in FIG. 20.

FIG. 20 shows, in a diagram, a frequency hop-based and/or time hop-based usable occupancy of resources 112 of the frequency band that are spaced apart in the frequency domain, indicated by a network-specific channel access pattern 110, an occupancy of resources 118 that is to be used for the transfer and is indicated by a relative channel access pattern 116 from the usable occupancy of resources 112 of the network-specific channel access pattern 110, and an occupancy of resources 119 that is to be used for the transfer and is indicated by another relative channel access pattern 117 from the usable occupancy of resources 112 of the network-specific channel access pattern 110, and projections of the channel access patterns 110, 116, 117 onto time axes before and after the removal of unused time slots, or frequency channels, according to an embodiment. Here, the ordinance describes the frequency channel indices and the abscissa describes the time slot indices.

As can be seen in FIG. 20, the network-specific channel access pattern 110 indicates in the frequency direction (e.g. per time slot or time slot index) a bundling of resources 112, i.e. a plurality of spaced apart resources 112 (e.g. frequency channels or frequency channel indices) of the frequency band, wherein the relative channel access pattern 116 indicates in the frequency direction at most a subset (e.g. up to one resource, i.e. one or no resource) of the plurality of spaced apart resources 112 of the network-specific channel access pattern 110, and wherein the other relative channel access pattern 117 indicates in the frequency direction at most a subset (e.g. up to one resource, i.e. one or no resource) of the plurality of spaced apart resources 112 of the network-specific channel access pattern 110, wherein the relative channel access pattern 116 and the other relative channel access pattern 117 are different.

In other words, FIG. 20 shows a schematic exemplary illustration of the network-specific channel access pattern 110 and the relative channel access pattern 116 with a frequency channel bundling having gaps.

The advantage of this frequency channel bundling is that, as based on the relative channel access pattern 117 of a second participant (e.g. user) additionally shown in FIG. 20, there is significantly less adjacent channel disturbance (the channel separation of two directly adjacent channels is always problematic due to the limited filtering effect, in particular if the one channel is received with significantly stronger reception power than the adjacent channel) than in FIG. 19.

The advantage of the bundling described in FIGS. 19 and 20 is to allow more terminal devices within the network and within a given period of time to access the radio resources (greater utilization). Alternatively, for a given utilization, channel bundling may reduce the probability for channel access collisions since a given access traffic is distributed to more potential resource elements (reduced reciprocal disturbances of the participants within the network). In contrast to the use of more time slots, the advantage of frequency channel bundling consists in a greater energy efficiency since the receiver is being switched on for fewer time slots for the same amount of resource elements.

If a terminal device has the capability to transmit simultaneously on multiple frequency channels, this can be provided for in the relative channel access pattern. This is illustrated in the following illustration, which is limited to the relative channel access pattern only (corresponding to bottoms of FIGS. 19 and 20).

Figure 21:
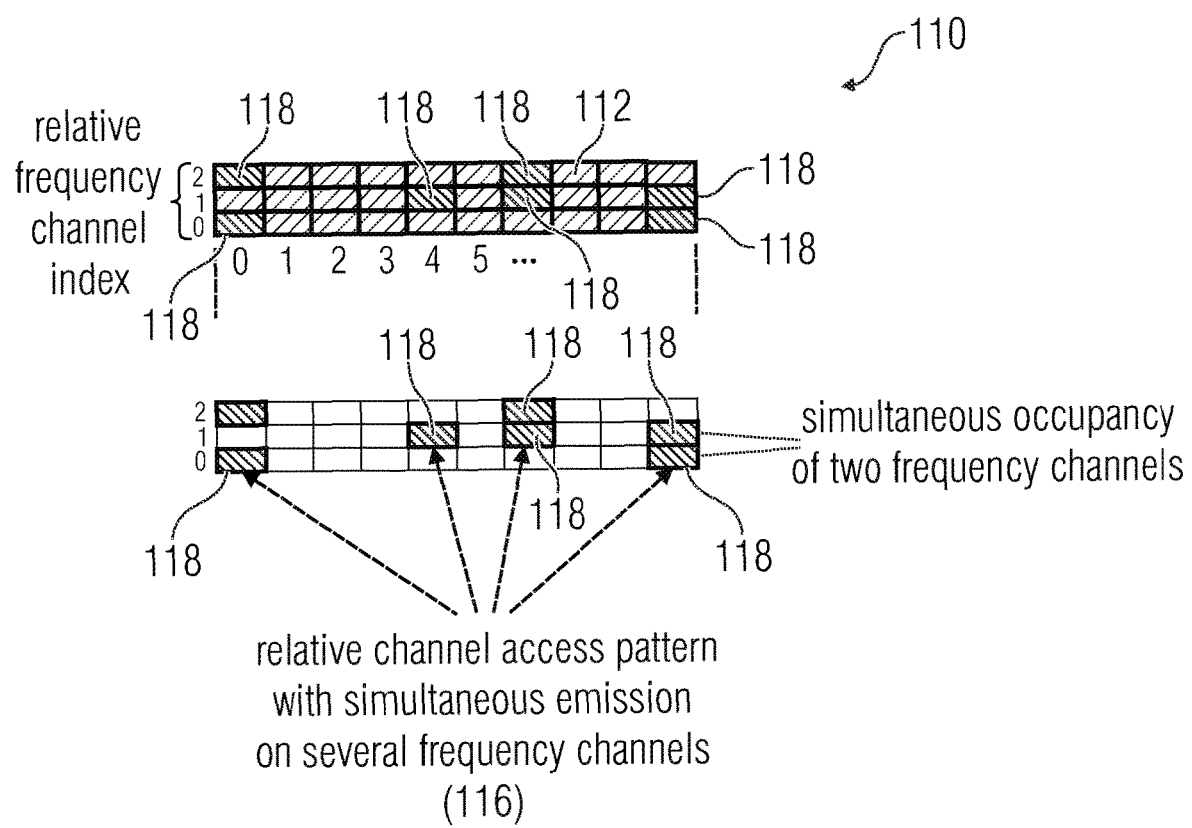
FIG. 21 shows, in a diagram, a projection of a network-specific channel access pattern and a relative channel access pattern onto the time axis after the removal of unused resources (e.g. frequency channels and time slots), wherein the relative channel access pattern occupies in the frequency direction for at least a part of the time hops several of the resources available in the frequency direction, according to an embodiment.

FIG. 21 shows, in a diagram, a projection of a network-specific channel access pattern 110 and a relative channel access pattern 116 onto the time axis after the removal of unused frequency channels and time slots, wherein the relative channel access pattern 116 occupies in the frequency direction for at least a part of the time hops several of the resources 112 available in the frequency direction. Here, the ordinate describes the relative frequency channel indices, and the abscissa describes the relative time slot indices.

In other words, FIG. 21 shows in a diagram a relative channel access pattern 116 in the case of frequency channel bundling with simultaneous transfer (e.g. emission) on several frequency channels.

B.3. Occupancy of the Resources with Channel Accesses in Different Symbol Rates

The above discussions exemplarily assumed that the signal is generated on each frequency channel with an identical symbol rate. However, as described above, if a range of several immediately adjacent frequency channels should be available, this range, which is referred to in the following as "resource cluster" may be divided into several partial resources. Different symbol rates and/or a different number of symbols may be allocated to these partial resources, as is illustrated in FIG. 22.

Figure 22:
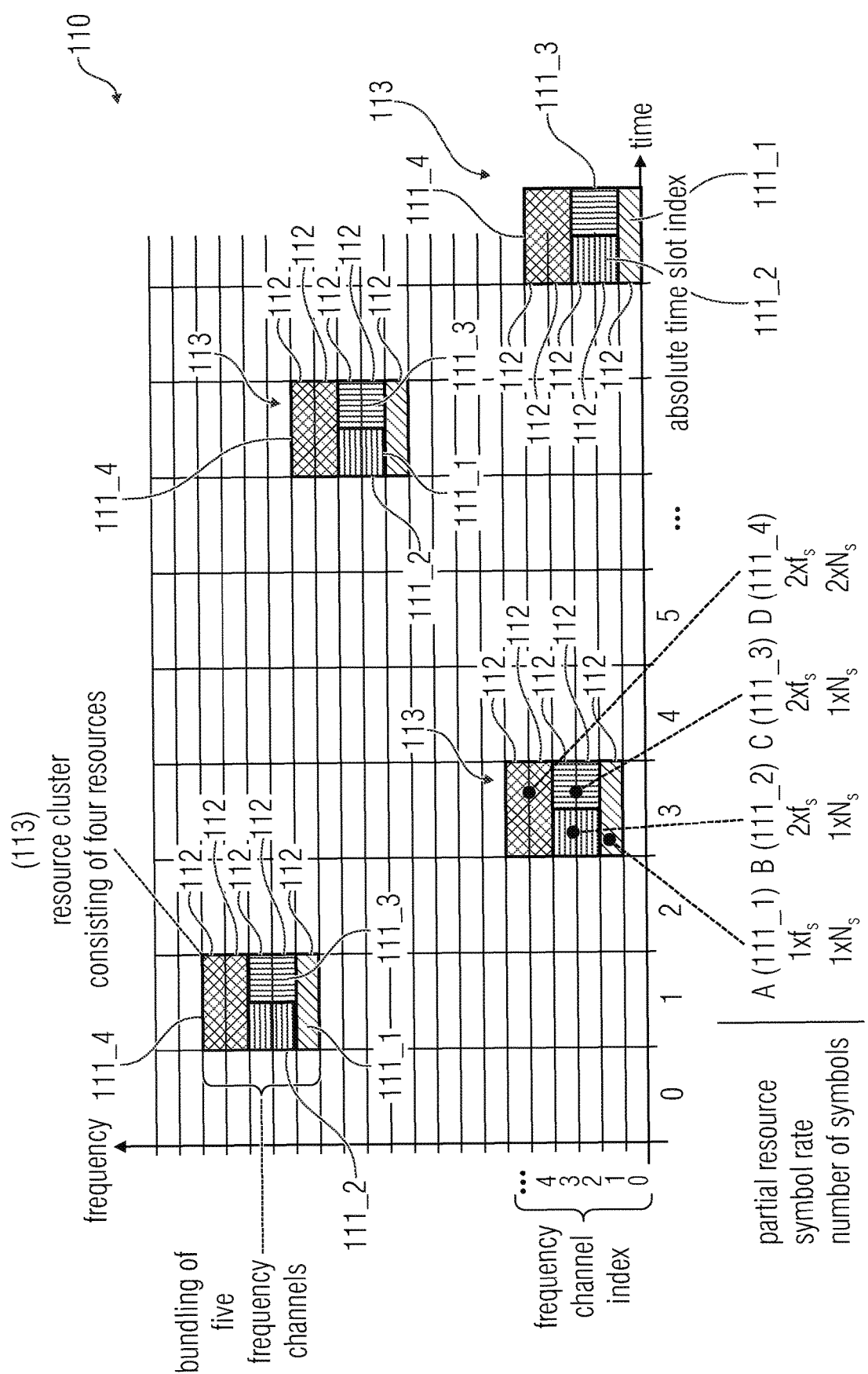
FIG. 22 shows, in a diagram, a frequency hop-based and time hop-based usable occupancy of resources of the frequency band that are bundled into blocks (or clusters) in the frequency domain, indicated by a network-specific channel access pattern, wherein different symbol rates and/or different numbers of symbols are allocated to different parts of the blocks of connected resources, according to an embodiment.

FIG. 22 shows, in a diagram, a frequency hop-based and time hop-based usable occupancy of resources 112 of the frequency band that are bundled into blocks (or clusters) 113 in the frequency domain, indicated by a network-specific channel access pattern 110, wherein different symbol rates and/or different numbers of symbols are allocated to different parts 111_1-111_4 of the block 113 of connected resources 112, according to an embodiment.

Here, the ordinate describes the frequency channel indices and the abscissa describes the time slot indices.

In other words, FIG. 22 shows a formation of resource clusters 113 with partial resources 111_1-111_4 of different symbol rates and symbol numbers per time slot (example).

FIG. 22 exemplarily shows a section of a channel access pattern with a sequence of resource clusters 113 that are constituted by the bundling of five frequency channels each. As an example, each resource cluster 113 is divided into four independent partial resources "A" (111_1), "B" (111_2), "C" (111_3), "D" (111_4) in which different multiples of the symbol rate fs and the number of the symbols Ns are used. With twice the symbol rate and a given number of symbols, two consecutive accesses may be carried out by two different participants in one time slot, e.g. due to the shortened symbol duration. This is the case in FIG. 22 for the temporally consecutive partial resources "B" (111_2) and "C" (111_3).

The advantage of this approach is that, within the network-specific channel access pattern 110, resources may be occupied on demand with different symbol rates and therefore transfer bandwidths.

It is clearly obvious to the person skilled in the art that the division of resources clusters 113 formed by frequency channel bundling into individual partial resources may be carried out in many ways. The symbol rates used do not necessarily have to be integer multiples of a base symbol rate (as is the case in the selected example). The same applies to the number of the symbols in the partial resources.

B.4. Criteria for Generating Relative Channel Access Patterns

Different transfer scenarios may result in different requirements for the relative channel access pattern 116.

Data packets that are to reach the receiver as quickly as possible (short latency time) require channel accesses that follow each other as closely as possible, i.e. a comparably high activity rate A in the network-specific channel access pattern, as described in section A. On the other hand, for data packets where a transmission reliability (e.g. high robustness against external disturbance) is of primary importance, a distribution of the emission over a longer period of time can be advantageous, i.e. a comparatively low activity rate in the network-specific channel access pattern can be favorable. The same applies to devices where a temporally equalized energy extraction from the battery (temporally stretched transmission activity) is desired.

Thus, it is advantageous to design the set of available relative channel access patterns such that demand-oriented channel access patterns with desired characteristics are available for different scenarios.

The decisive design parameters for a set of K relative channel access patterns are the following:
- in the frequency direction, the number of the F specific frequency channels within a time slot,
- in the time direction, the number of the Z available time slots with a specified time duration $T_{RE}$, wherein only one resource element enters into Z per time index element,
- the mean activity rate A specified from section A, with the help of which an absolute time slot length Z/A results from the relative time slot length. From this, with a given time duration $T_{RE}$ of a resource element, the total frame duration $T_{Frame}=T_{RE}*(Z/A)$ may be indicated in seconds,
- the number of the D partial data packets into which a data packet is split, and the error correction code used for the data packet, which may be a block or convolutional code with a specified code rate R, for example. Typically, the number of the partial data packets is significantly smaller than the number of the resource elements available in the time direction, i.e. D«Z.

Figure 23:
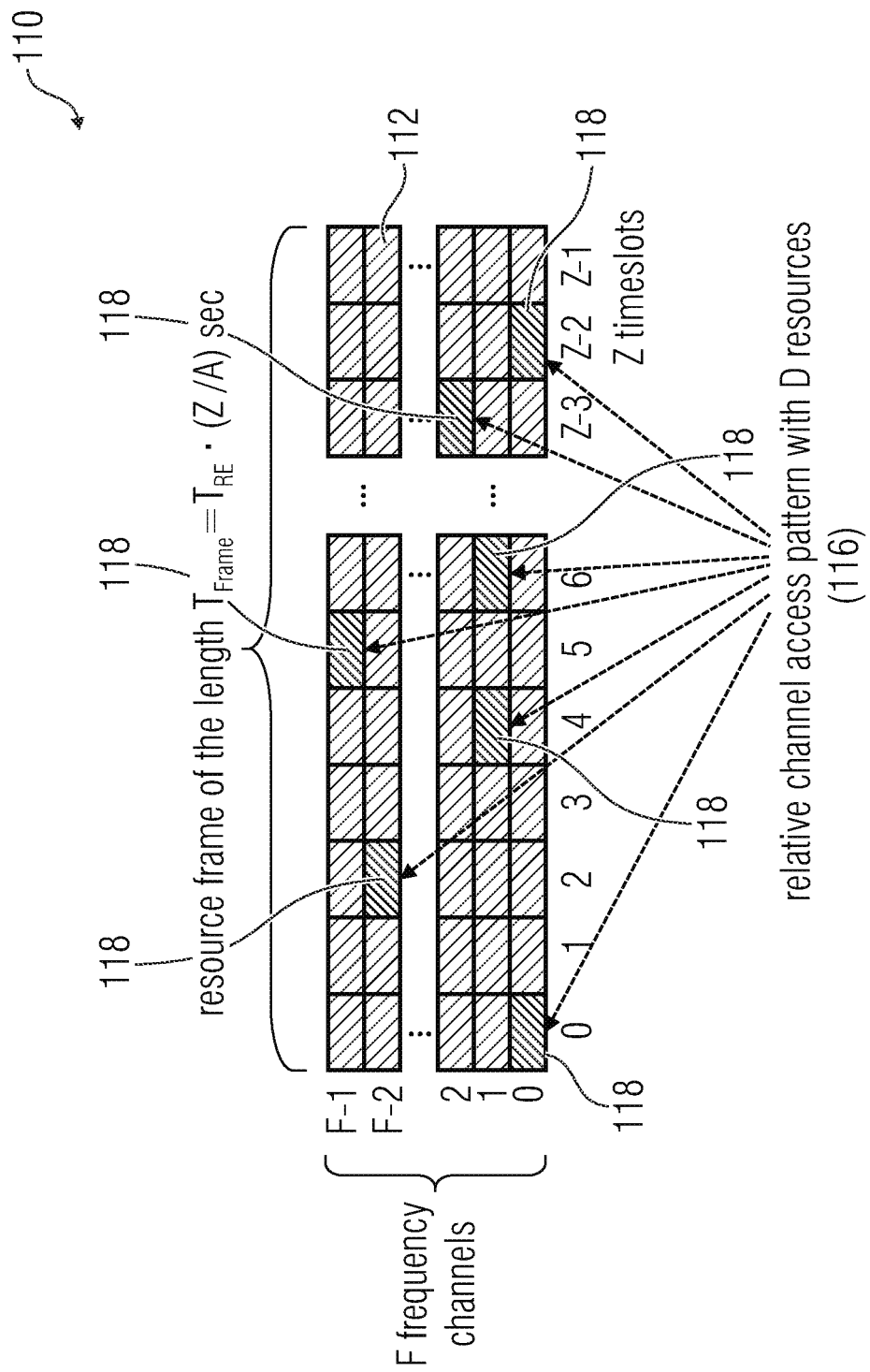
FIG. 23 shows, in a diagram, a projection of a network-specific channel access pattern and a relative channel access pattern with D resources onto the time axis after the removal of unused resources (frequency channels and time slots), according to an embodiment.

FIG. 23 shows, in a diagram, a projection of a network-specific channel access pattern 110 and a relative channel access pattern 116 with D resources 112 onto the time axis after the removal of unused resources (frequency channels and time slots), according to an embodiment. Here, the ordinate describes the relative frequency channel indices, and the abscissa describes the relative time slot indices.

In this case, FIG. 23 shows an illustration of a resource frame with F×Z resources and an absolute total length of $T_{RE}*(Z/A)$ seconds.

In a first design step, the number of the available resources elements has to be determined on the basis of the total frame duration $T_{Frame}$ and the network-specific activity rate A of section A and the time duration $T_{RE}$ for a resource element.

Specifying the total frame duration $T_{Frame}=T_{RE}*(Z/A)$ depends on the application case. For an application with the requirement of a short latency time, e.g. a wireless light switch, doorbell or door opener, $T_{Frame}$ should not be larger than 500 ms. For latency-uncritical applications where robustness against external disturbers is most important, the time duration of a resource frame can easily reach values of 5 to 10 seconds.

The network-specific activity rate A from section A is also influenced by the application case. For latency-critical applications, the activity rate should be relatively high, i.e. between A=0.33 and 1. For a value of 0.33, only every third time slot is included into the network-specific channel access pattern 110 on average, whereas the 2 other time slots are not used in this network. For latency-uncritical application cases, in particular for battery-operated terminal devices, the values for the activity rate may drop to A=0.1.

Finally, the time duration $T_{RE}$ of a partial data packet, or resource element, is to be specified. A symbol rate fs of about 2500 sym/s and a number of 30 to 80 symbols per partial data packet, for example, result in values of 12 to 32 ms for $T_{RE}$.

The number Z of the resources available in the time direction may be determined from the application-specific requirements for $T_{Frame}$, $T_{RE}$ and A. Together with the F specified frequency channels, what results are the overall available resources per resource frame. As is illustrated in the table shown in FIG. 24, these values may significantly differ depending on the application case.

In detail, FIG. 24 shows in a table a resource calculation for different exemplary application cases.

While, on the basis of the first design step, the number of the F×Z resource elements available in the resource frame has been identified, in the second design step, the number M of the different channel access patterns is to be identified on the basis of the length D of each channel access pattern and the available F×Z resource elements.

Depending on the F×Z available resource elements, there are $$M_{max}=(Z!\cdot F^D)/((Z-D)!\cdot D!) \qquad (1)$$

different channel access patterns of the length D that differ in at least one resource element. Equation (1) assumes that one pattern per time slot index is allowed to use only one resource element from all F frequency channels, cf. FIG. 20. According to Equation (1), what results for the first example of the table shown in FIG. 24 and D=4 is $M_{max}=70$, and what results for the last case with an assumed D=24 is $M_{max}=8\times$ $10^{46}$. If a simultaneous emission of several partial data packets on several frequency channels would be allowed, as is shown in FIG. 21, $M_{max}$ would increase massively.

Advantageously, the number D of the partial packets should be selected to be as large as possible, since the robustness against disturbances for other participants, regardless of whether they originate from the own or from foreign networks, is the largest in this case. Usually, in an IOT-based TSM transfer, a data packet is divided into 10 to 30 partial data packets. If a transfer time corresponding to this number of partial data packets is not available, e.g. as is the case in some latency-critical applications, the value of D may also be smaller.

In general, the larger the number M of the available channel access patterns is selected, the lower the probability of a full collision. A full collision is said to occur if two terminal devices randomly select the same channel access pattern for their transfer. For example, if M=128 different patterns are available, the probability of a full collision is 0.78125% (1/128), if one assumes that each terminal device randomly selects its channel access pattern from the M available patterns. For M=1024, this collision probability is reduced to 0.0977%. In the case of a full collision, it may be assumed that, depending on the reception level ratio, at least the data packet content of the terminal device received more weakly cannot be faultlessly decoded, for similar, or equal, reception levels, the data packets of both users may lost. The advantage of the telegram splitting method described in [1] is that, through the different channels access patterns, only a few partial data packets collide, however, which can be reconstructed by the error correction code used.

Figure 25:
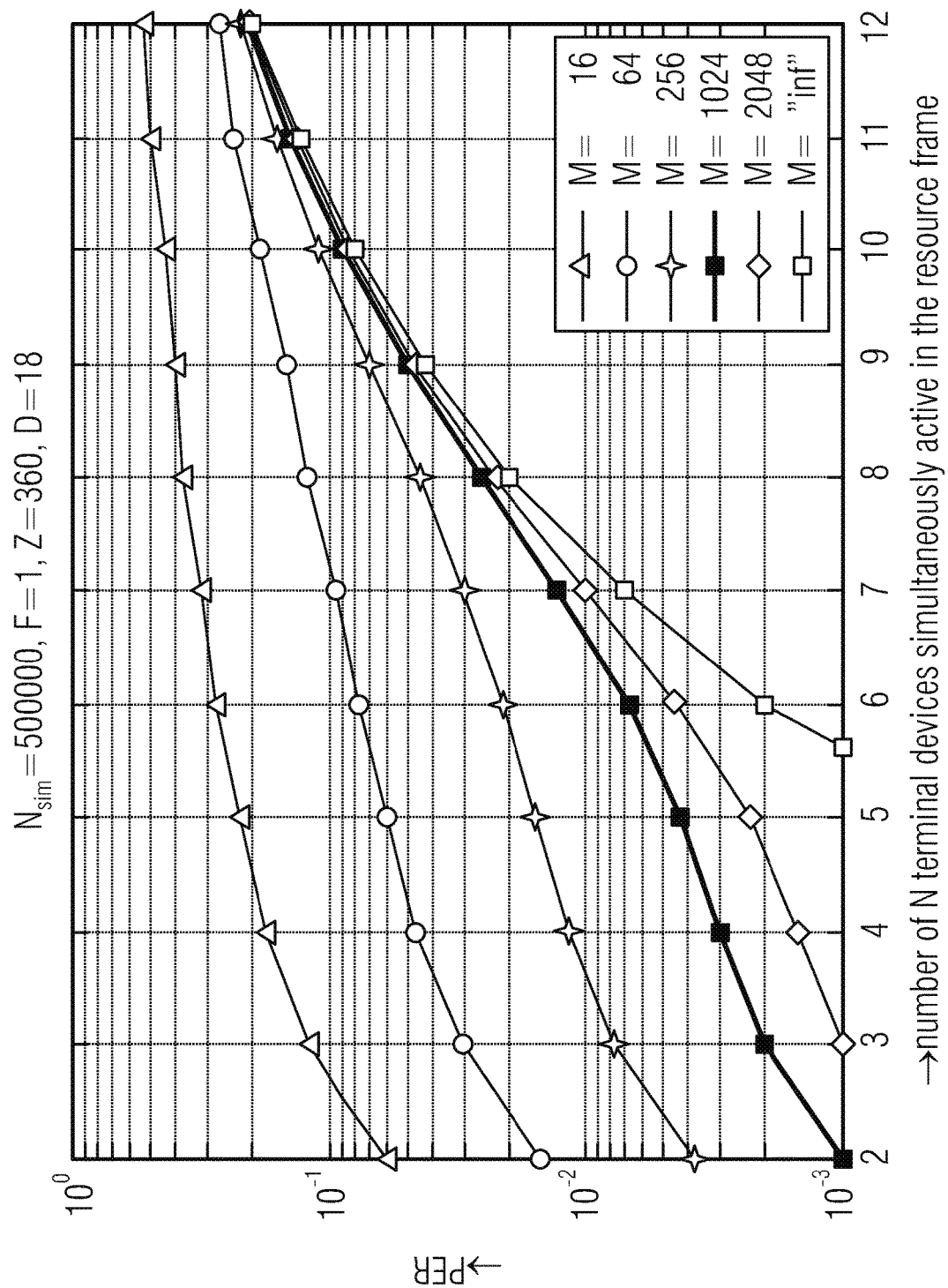
FIG. 25 shows, in a diagram, simulation results of the packet error rate for different channel access pattern lengths M as a function of the number of simultaneously active terminal devices in the case of 360 available resource elements.

FIG. 25 shows, in a diagram, simulation results of the packet error array for different channel access pattern lengths M as a function of the number of simultaneously active terminal devices for 360 resource elements. In this case, the ordinate describes the packet error array PER and the abscissa describes the number N of terminal devices simultaneously active in the resource frame (e.g. terminal points).

In detail, the simulation results of FIG. 25 show the course of the packet error rate PER for different lengths M of channel access patterns across the number N of the terminal devices simultaneously active in the resource frame, wherein a convolutional code with a rate of R=1/3 has been used as an error protection. In addition, F=1 and Z=360 were assumed and the channel access pattern lengths resulted to D=18.

With N=2 terminal devices, the different probabilities for a full collision may be detected as a function of M. The larger the specified M, the lower the failure probabilities of the PER curves of the different channel access pattern lengths. With M=1024, 1024 different channel access patterns are randomly selected from the $M_{max}$ possible ones, and the N terminal devices (e.g. terminal points) always randomly select their (relative) channel access pattern used for the 500,000 transfer attempts. With M="inf", new channel access patterns are selected per throw of the dice for each individual terminal device (e.g. end point) for each transmission attempt. In this case, the probability of a full collision with N=2 is 0%, since, according to Equation (1), almost an infinite number of channel access patterns is possible. If the number N of simultaneously active end devices increases, the collision probability of the individual partial data packets increases and the packet error rate increases. For N=10 terminal devices, the packet error rate for all curves from M=256 to M="inf" is approximately 10%.

As can be seen in FIG. 25, the selection of M="inf" provides the best performance. However, on the side of the base station, detecting the different channel access patterns is almost impossible for M="inf". Thus, M has to be reduced to a realistic level. For $M_{max}$>104, a specification of M=1024 should be useful. This selection is also influenced by the performance power available on the receiver side. What can be seen is that, with the selection of M=1024, the performance loss is not very large compared to the version with M="inf".

Figure 26:
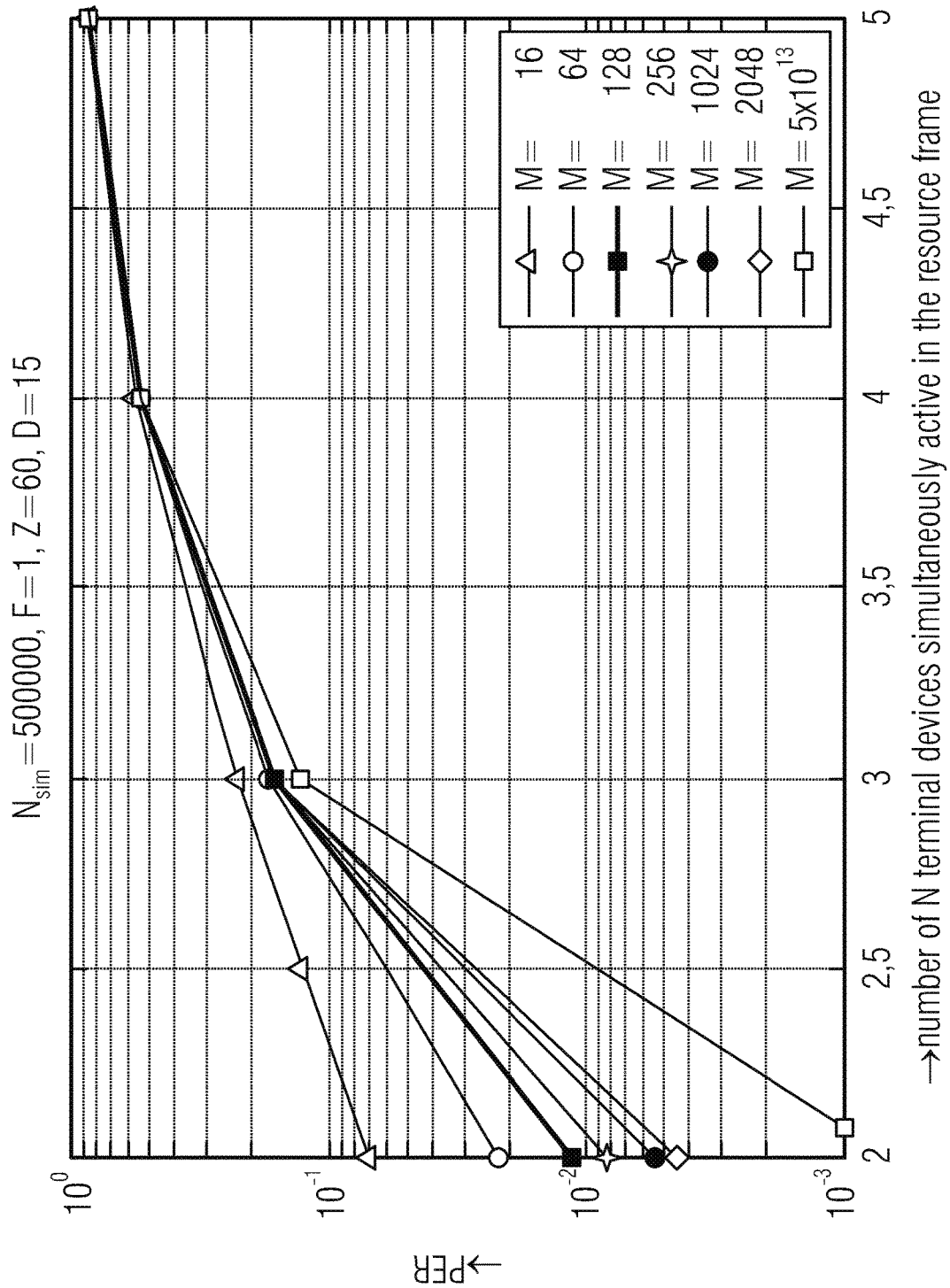
FIG. 26 shows, in a diagram, simulation results of the packet error rate for different channel access pattern lengths M as a function of the number of simultaneously active terminal devices in the case of 60 available resource elements.

At lower values of $M_{max}$, the lengths of the channel access patterns may decrease without having to accept significant performance losses in the PER. This is illustrated in FIG. 26 for Z=60 and D=15. The performance curves for the lengths M=128 to M=2048 only differ slightly at N=2.

FIG. 26 shows, in a diagram, simulation results of the packet error array for different channel access pattern lengths M as a function of the number of simultaneously active terminal devices in the case of 60 resource elements. Here, the ordinate describes the packet error rate PER and the abscissa describes the number of the N terminal devices simultaneously active in the resource frame (e.g. terminal points).

In summary, the determination of the number M of different channel access patterns depends on $M_{max}$ and is therefore a function of F, Z and D. For example, M=1024 seems to be useful for $M_{max}$>$10^{14}$. If the value of $M_{max}$ falls below the threshold of $10^{14}$, M may be decreased accordingly, wherein simulations are used to verify to what extent the PER performance still meets the requirements. For very large values of $M_{max}$, M may well assume values even larger than 1024. This may be determined by appropriate simulations.

In the second design step, the number M of the different channel access pattern and their length D has been specified. Ideally, the individual channel access patterns are determined by means of a random generator, which is why there is as little connection or similarity as possible between the M individual patterns. On the receiver side, this usually means a very large detection effort. In order to reduce this detection effort, the third design step tries to give the channel access patterns structural properties such as clustering or repeated patterns so as to significantly reduce the computational complexity on the receiver side. The PER performance, as for example shown in FIGS. 25 and 26, should not deteriorate as a result, if possible.

Figure 27:
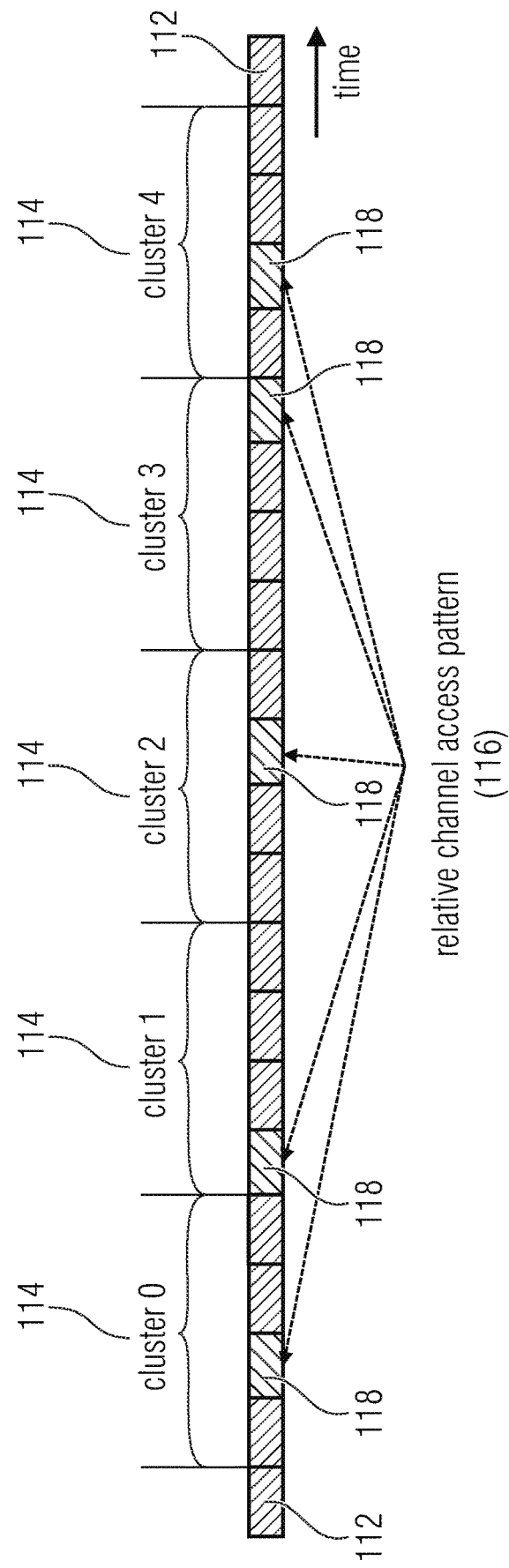
FIG. 27 shows, in a diagram, resources of a channel access pattern projected onto a time axis, wherein resources of the channel access pattern are grouped into clusters of the same lengths L (e.g. L=4), wherein the relative channel access pattern indicates an occupancy of one resource per cluster, according to an embodiment.

One possibility is to divide the resource frames into clusters 114 of the same length L, as is shown in FIG. 27.

In detail, FIG. 27 shows, in a diagram, resources 112 of a channel access pattern 110 projected onto a time access, wherein the resources 112 of the channel access pattern 110 are grouped into clusters 114 of the same length L (e.g. L=4), wherein the relative channel access pattern indicates an occupancy of one resource 118 per cluster 114, according to an embodiment. In other words, FIG. 27 shows a channel access pattern with one element per cluster of the length L=4 each.

A cluster variation would be to divide the length Z of the resource frame by the number D of partial data packets. This results in a maximum cluster length of L=floor(R/D). In the example of FIG. 25, what would result is a cluster length of L=20 (360/18) resource elements.

The cluster length may also be selected to be smaller than L=floor(R/D), and the remaining resources elements could be used to subsequently shift the basic pattern generated from the smaller cluster by one time index step each, i.e. by one resource element, so as to generate further patterns that all have the same basic shape.

In the example of FIG. 26, e.g. L=10 may be specified. Then, a single channel access pattern is selected via throw of the dice from the L×D (=180) resource elements, which may then be further used R–L×D times, i.e. 180 times, shifted by one time index each step. What is obtained by this are 181 different channel access patterns that all have the same basic pattern. For example, the channel access pattern length M=1024 from FIG. 25 may be generated with only 7 different basic patterns, wherein each of these basic patterns is shifted on average 145 on the time axis. In this case, the performance gets only insignificantly worse.

Overall, the above approach reduces the receiver-side detection effort significantly. However, it is important to check again and again that the performance does not suffer compared to the performance obtained with purely random sequences.

C. Sync Beacon

Subsequently, it is assumed that there are a coordinating instance (subsequently referred to as "base station") and non-coordinating participants (subsequently referred to as "terminal devices" or "terminal points") within each network.

Figure 28:
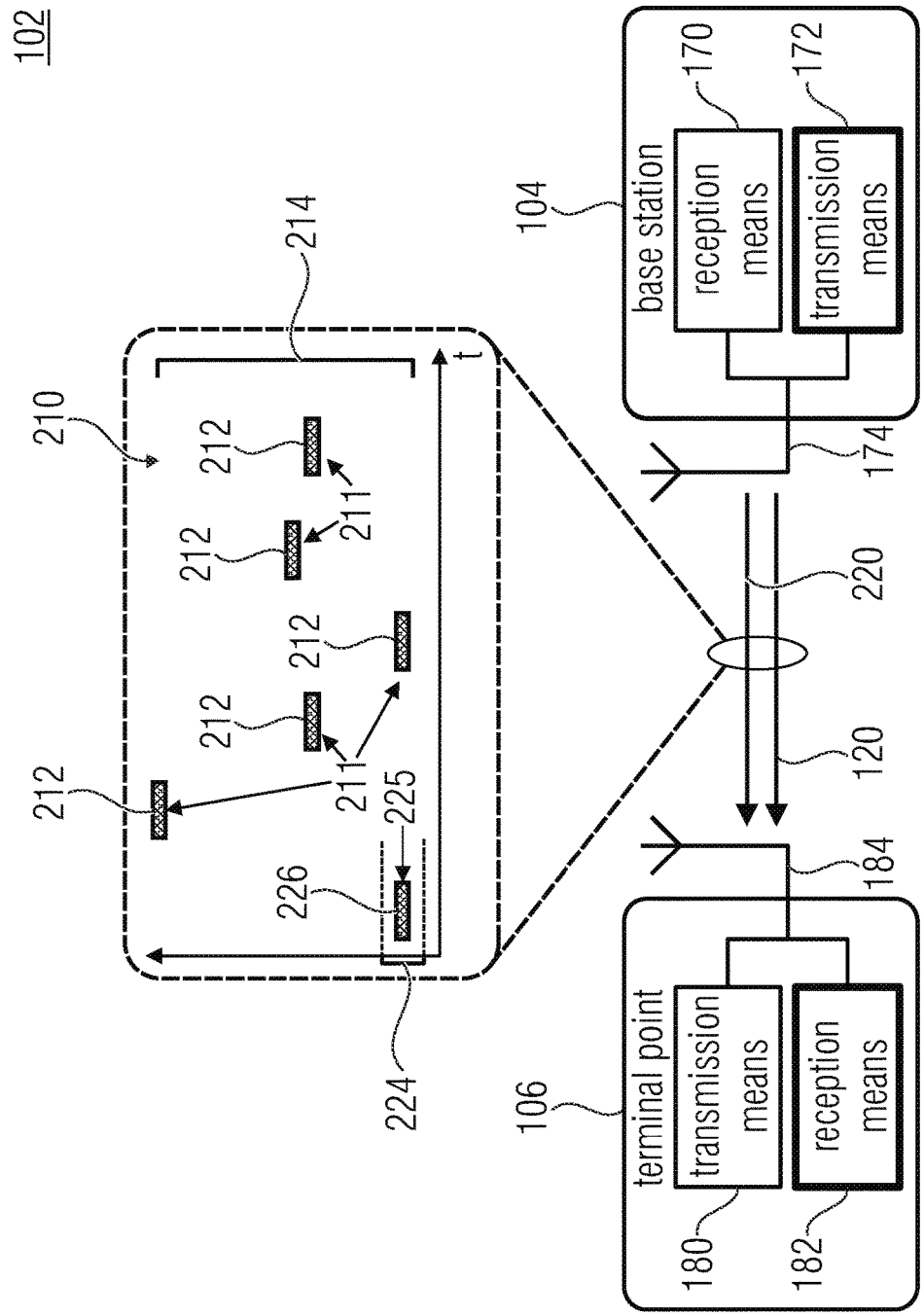
FIG. 28 shows a schematic block circuit diagram of a communication system having a base station and a terminal point, in accordance with an embodiment of the present invention.

FIG. 28 shows a schematic block circuit diagram of a communication system 102 comprising a base station 104 and a terminal point 106, in accordance with an embodiment of the present invention.

As is exemplarily shown in FIG. 28, the base station 104 can comprise transmission means (or a transmitter or transmission module) 172 configured to transmit signals, like the control signal 120, for example. The transmission means 172 can be connected to an antenna 174 of the base station 104. The base station 104 can additionally comprise reception means (or a receiver or reception module) 170 configured to receive signals, like the activation signal 122 and the data signal 124, for example. The reception means 170 can be connected to the antenna 174 or another (separate) antenna of the base station 104. The base station 104 can comprise combined transmission/reception means (a transceiver).

The terminal point 106 can comprise reception means (or a receiver or reception module) 182 configured to receive signals, like the control signal 120, for example. The reception means 182 can be connected to an antenna 184 of the terminal point 106. Additionally, the terminal point 106 can comprise transmission means (or a transmitter or transmission module) 180 configured to transmit signals, like the activation signal 122 and the data signal 124, for example. The transmission means 180 can be connected to the antenna 184 or another (separate) antenna of the terminal point 106. The terminal point 106 can also comprise combined transmission/reception means (a transceiver).

As has been discussed in sections A and B, the communication system 102 is configured to communicate wirelessly in a frequency band which is used for communication by a plurality of mutually uncoordinated communication systems.

For coordinating the participants of the communication system 102, a signal or beacon signal 120, also referred to as control signal, is emitted, the control signal 120 comprising information on a network-specific channel access pattern 110, wherein the network-specific channel access pattern 110 indicates a frequency hop and/or time hop-based occupancy of resources 112 of the frequency band, usable for communication of the communication system 120.

This control signal 120 is transferred distributed in correspondence with a frequency hop and time hop-based occupancy of resources 211 of the frequency band, indicated by a control signal hopping pattern 210. The frequency range 214 of the frequency band via which the control signal 120 is transferred distributed in correspondence to the control signal hopping pattern 210, thus is considerably greater (for example by the factor 5, 10, 15, 20, 30, 40 or 50) than a receive bandwidth of a receiver 182 of the terminal point 106. Exemplarily, the control signal 120 can comprise a plurality of partial control data packets 212, wherein the plurality of partial control data packets 212 is transferred distributed in the resources 211 defined by the control signal hopping pattern 210.

In embodiments of the present invention, a reference signal 220 (or synchronization signal) in a predetermined frequency range 224 (like one or more frequency channels) of the frequency band is transmitted by the base station 104, the reference signal 220 comprising information on the control signal 120.

As is indicated in FIG. 28, the reference signal 220 can be transferred in at least one resource 225 (for example defined by frequency channel and time slot) of the predetermined frequency range 224.

The predetermined frequency range 224 here is known to the terminal point 106. This means that the terminal point 106 can be configured to place, in a register phase, a receive frequency of the receiver 182 to the predetermined frequency range 224 to receive the reference signal 220.

In embodiments, the predetermined frequency range 224 can be adjusted to a receive bandwidth of the receiver 182 of the terminal point 106.

Exemplarily, the predetermined frequency range 224 can comprise a frequency channel or several adjacent frequency channels, like two to six (or three to four) adjacent frequency channels. Typically, the receiver 182 of the terminal point 106 comprises a receive bandwidth of a few 100 kHz (like 100 kHz, 200 kHz or 300 kHz, for example), wherein the frequency channels into which the frequency band is divided for access by the communication system can comprise a bandwidth of roughly 50 kHz (like between 30 kHz and 70 kHz, for example).

After receiving the reference signal 220, the terminal point 106 can determine/extract the information on the control signal 120 from the received reference signal to receive the control signal 120 based on the information on the control signal 120.

The information on the control signal 120 can exemplarily comprise information on the control signal hopping pattern 210, like the control signal hopping pattern 210 itself, or information from which the control signal hopping pattern 210 can be derived, like a control signal hopping pattern index which unambiguously identifies the control signal hopping pattern 210 from a set of control signal hopping patterns which different control signal hopping pattern indices are associated to.

Additionally, the information on the control signal 120 can comprise information on a time and frequency position of the control signal 120 relative to the reference signal 220.

Based on this information, the terminal point 106 can subsequently receive the control signal 120, for example by switching the receive frequency of the receiver 182 of the terminal point to the respective resources of the frequency band, indicated by the control signal hopping pattern 210

(for example defined by time slots and frequency channels which the frequency band is divided into).

Thus, embodiments of the present invention allow participants (like the terminal point 106) which are not able to receive a broad-band transfer in full bandwidth and process same in real time, to nevertheless initially synchronizes in the communication network 102 and subsequently register there.

Detailed embodiments of the detection process of the control signal 120, subsequently referred to as beacon, where the unambiguous information on the channel access pattern 110 used are located will be described below.

C.1 Emitting Sync (Partial) Data Packets Before the Beacon

The signals used in typical networks with bandwidths of several MHz usually cannot be received and/or processed in full bandwidth simultaneously by participants which use very cheap hardware and/or are battery-operated.

Typically, the radio chips installed on such participants can make available a bandwidth of a few 100 kHz. The computing power of such participants is also designed such that timely processing of these bandwidths should be possible.

In embodiments, a reference signal 220 comprising a reference data packet 226 in a predetermined frequency range 224 is emitted before the control signal 120, the reference data packet 226 comprising information on the control signal 210. In embodiments, the information on the control signal 120 can be information on a time and frequency position of the control signal 120 relative to the reference signal 220. In embodiments, the information on the control signal 120 can be information on the control signal hopping pattern 210.

Further embodiments will be discussed below.

In order for these devices to nevertheless be able to synchronize to such a network and subsequently receive the beacon (or the control signal 120), in accordance with embodiments, the used information for the (relative) channel access pattern (or control signal hopping pattern 210), and the frequency and time position of the beacon (of the control signal 120) are transferred within a bandwidth of roughly 100 kHz.

After extracting the required data, the participant can determine the temporal position(s) and the frequency channel/the frequency channels of the beacon (or of the control signal 120) and correspondingly receive the (partial) packets (or partial control data packets 212) of the beacon (or the control signal 120) by switching the carrier frequency.

In order to achieve this, a so-called sync (partial) data packet (or reference signal 220 having a reference data packet 226) can be emitted on a fixed defined frequency in a temporally defined distance before the beacon (or the control signal 120). This sync (partial) data packet (or reference data packet 226) can be used by new participants to determine the beginning of the beacon (of the control signal 120).

If the beacon (or the control signal 120) is emitted by means of a channel access pattern (or control signal hopping pattern 210), in this sync (partial) data packet (or reference data packet 120), information must be contained using which the channel access pattern (or control signal hopping pattern 210) and the time and frequency position of the beacon (or the control signal 120) can be derived.

Figure 29:
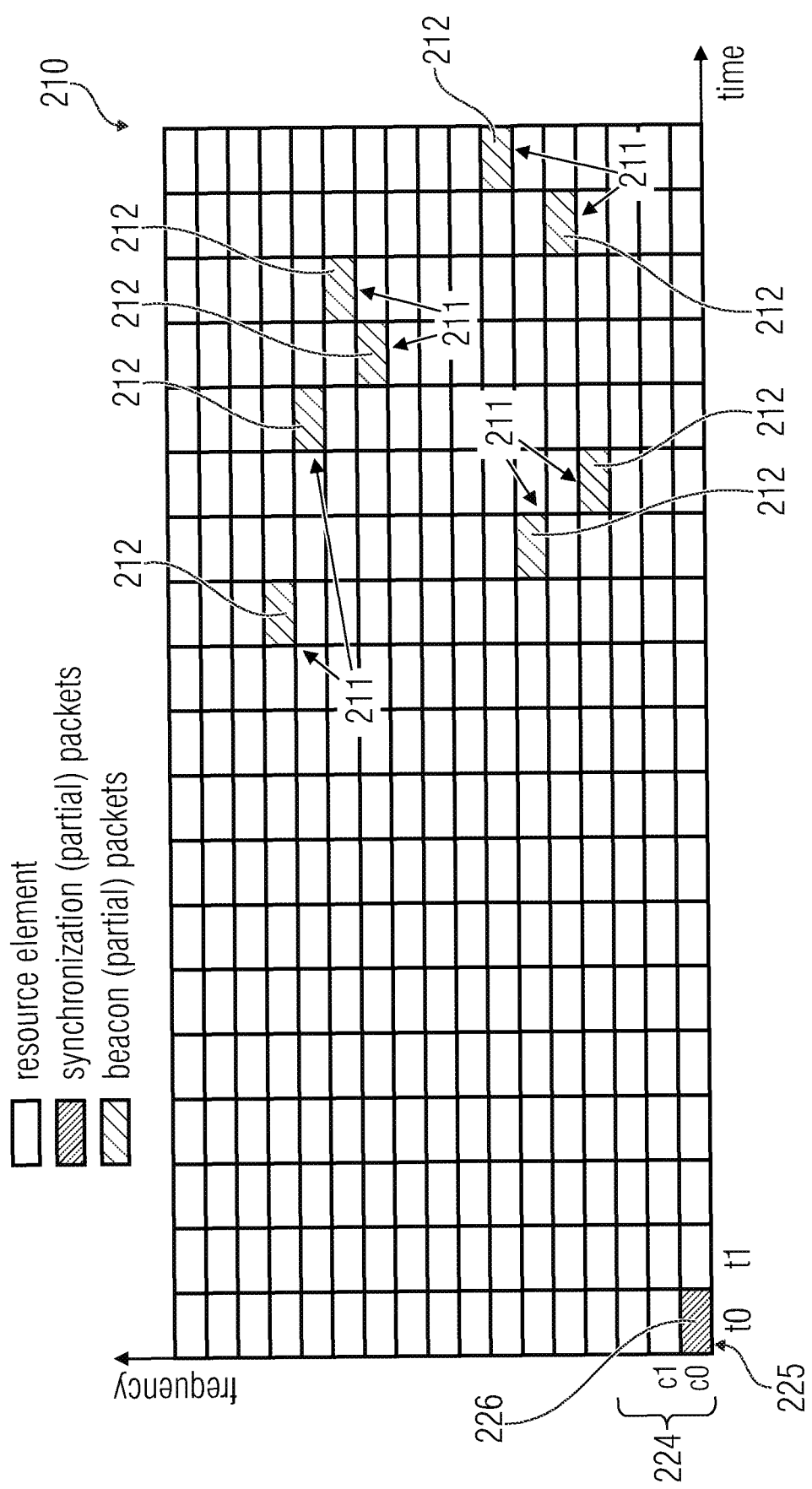
FIG. 29 shows, in a diagram, an occupancy of resources of the frequency band when transferring the reference signal having a reference data packet, and an occupancy of resources of the frequency band, indicated by the control signal hopping pattern, when transferring the control signal having the plurality of partial control data packets, in accordance with an embodiment of the present invention.

Such an emission of a sync (partial) data packet (or reference data packet 226) before the actual emission is shown in FIG. 29.

In detail, FIG. 29 shows an occupancy of resources 225 of the frequency band when transferring the reference signal 220 having a reference data packet 226, and an occupancy of resources 211 of the frequency band, indicated by the control signal hopping pattern 210 when transferring the control signal 120 having the plurality of partial control data packets 212, in accordance with an embodiment of the present invention in a diagram. Thus, the ordinate describes the frequency in frequency channels and the abscissa describes the time in time slots. In other words, FIG. 29 shows an emission of a sync (partial) data packet (or reference data packet 226) before the actual emission before the beacon (or the control signal having the plurality of partial control data packets 212).

In FIG. 29, the sync (partial) data packet (or reference data packet 226) contains information on the channel access pattern (or control signal hopping pattern 210) used in the beacon (or the control signal 120). The distance between the sync (partial) data packet (or reference data signal 220 having the reference data packet 226) and the beacon (or control signal 120) is defined fixedly.

With the next emission of a beacon (or the control signal 120), the channel access pattern (or control signal hopping pattern 210) can be a different one. This means that the channel access pattern (or control signal hopping pattern 210) is temporally variable. The emission of the sync (partial) data packet (or reference data packet 226) always has to take place on the same frequency channel (or within the same frequency range (=predetermined frequency range 224)) which is previously known to the receiver in order for simple receivers to be able to receive the same at low a bandwidth.

In embodiments, before emitting the beacon (or the control signal 120), a sync (partial) data packet (or reference data packet 226) can be emitted in a time-referenced manner, which contains the required information on the channel access pattern (or control signal hopping pattern 210) used in the beacon (or the control signal 210).

C.2 Splitting Sync (Partial) Data Packets into Several Partial Data Packets

In embodiments, the reference data packet 226 (like synchronization data packet) which comprises the information on the control signal 120 can be split onto a plurality of partial reference data packets 227 so that each of the partial reference data packets 227 comprises only a part of the reference data packet 226.

In embodiments, the reference signal 220 having the plurality of partial reference data packets 227 can be transferred in correspondence with a reference hopping pattern 228, the reference hopping pattern 228 indicating a frequency hop and/or time hop-based occupancy of resources of the predetermined frequency range 224.

In embodiments, the plurality of partial reference data packets 227 can be channel-encoded so that only a subset of the plurality of partial reference data packets 227 is required for successfully decoding the reference data packet 226.

In embodiments, the predetermined frequency range 224 can be broader than the receive bandwidth of the receiver 182 of the terminal point 106, wherein at least as many of the plurality of partial reference data packets 227 are transferred per partial bandwidth of the predetermined frequency range 224, which corresponds to the receive bandwidth of the receiver 182 of the terminal point 106, in correspondence with the reference hopping pattern 228 as are required for successfully decoding the reference data packet 226.

Further embodiments will be described below.

In sub-section C.1, a sync (partial) data packet (or reference signal 220 having a reference data packet 226) has been introduced, which is emitted in a time-referenced manner to a subsequent beacon (or subsequent control signal 120). This beacon also contains the information on how the channel access pattern of the beacon is set up.

When compared to the beacon (or control signal 120) which typically is divided into several partial data packets, the sync (partial) data packet (or reference data packet 226) in accordance with the previous explanations only is a single resource element (or a single data packet transferred in a resource 225 (like defined by frequency channel and time slot)).

If there is a disturbance during this transfer, new participants usually can no longer extract the data from this sync (partial) data packet (reference data packet 226).

The typical bandwidth of a frequency channel in FIG. 29 is below 50 kHz. The low-cost participants, however, can typically real-time process up to 100 kHz and more.

This means that the participants are able to receive and search in parallel at least two frequency channels.

It is sensible to also split the sync (partial) data packet (or reference data packet 226) by means of telegram splitting. Due to the very restricted quantity of useful data in the sync (partial) data packet (or reference data packet 226), typically not more than five partial data packets (or partial reference data packets) are required.

When using encoding which allows at least one partial data packet (or partial reference data packet) to be lost, the hopping pattern (or reference signal hopping pattern) for the split sync data packet (or reference data packet 226) can be selected such that greater a bandwidth is occupied than can be received by the low-cost participant. However, it is important for the low-cost receiver to always be able to receive at least a minimum number of required resource elements, irrespective of the crystal offset.

Figure 30:
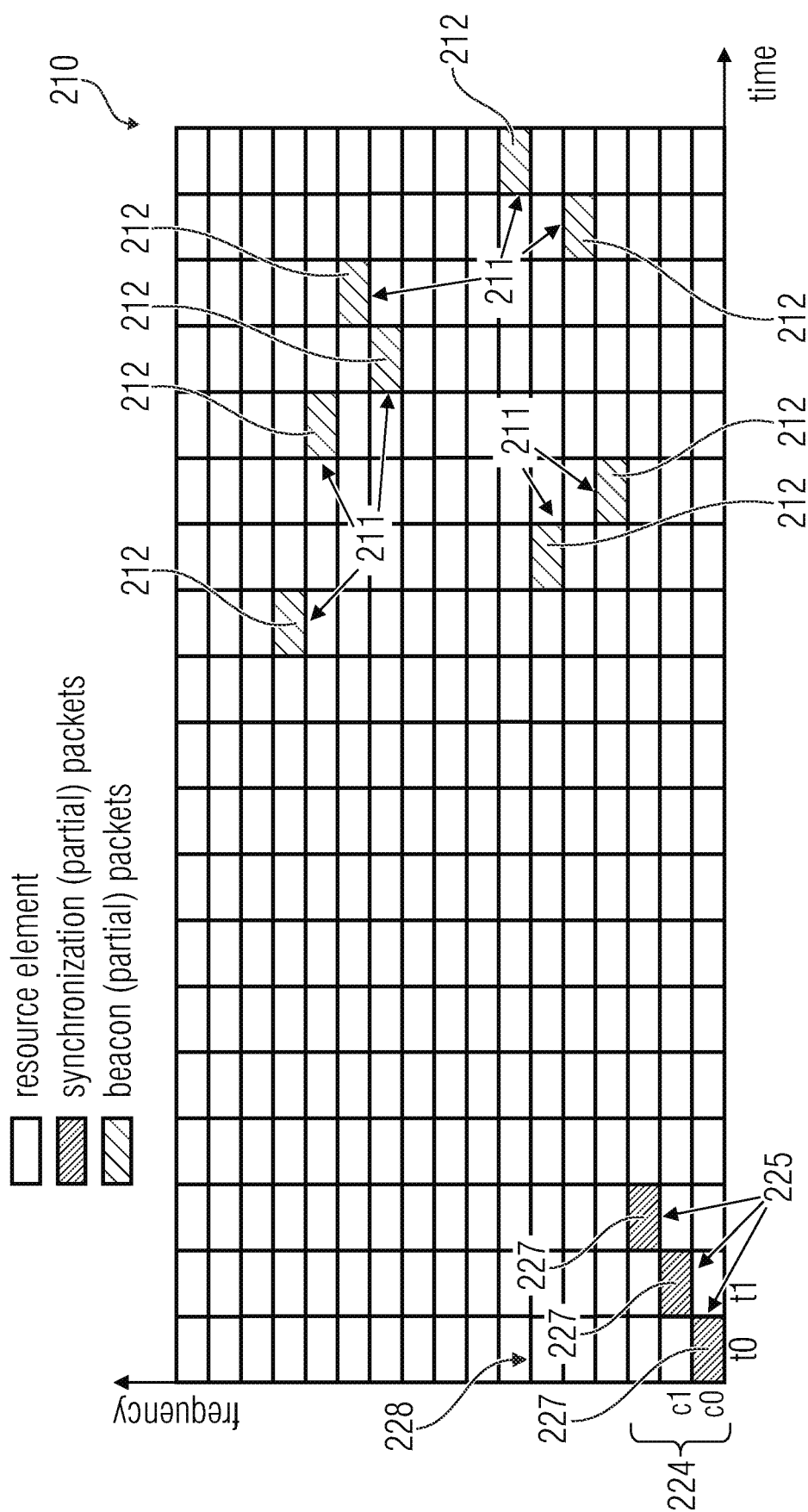
FIG. 30 shows, in a diagram, an occupancy of resources of the predetermined frequency range of the frequency band, defined by a reference signal hopping pattern, when transferring the reference signal having a plurality of partial reference data packets, and an occupancy of resources of the frequency band, indicated by a control signal hopping pattern, when transferring the control signal having the plurality of partial control data packets, in accordance with an embodiment of the present invention.

FIG. 30 shows an occupancy of resources 225 of the predetermined frequency range 224 of the frequency band, defined by a reference signal hopping pattern 228, when transferring the reference signal 220 having a plurality of partial reference data packets 227, and an occupancy of resources 211 of the frequency band, indicated by a control signal hopping pattern 210, when transferring the control signal 120 having the plurality of partial control data packets 212, in accordance with an embodiment of the present invention in a diagram. Thus, the ordinate describes the frequency in frequency channels and the abscissa describes the time in time slots.

In other words, FIG. 30 shows a division of the sync data packet (or reference data packet 226) into three sub-packets (or partial reference data packets 227), wherein these are transferred on different frequencies.

In FIG. 30, the sync data packet (or reference data packet 226) was transferred divided into three partial data packets (or partial reference data packets 227) and on the frequency channels c0 to c2. A pause in transfer could be introduced between the partial data packets (or partial reference data packet 227) and the arrangement of the partial data packets (or partial reference data packets 227) relative to the frequencies could be selected differently. However, it is important for this structure to be maintained for all the further beacons (or emissions of the control signal 220) and to be known before to the participant.

In embodiments, the emission of the sync data packet (or reference data packet 226) can be divided into partial data packets (or partial reference data packets 227), wherein these are placed such that a low-cost participant is able to receive at least a part of these partial data packets (or partial reference data packets 227). This means that at least the minimum number of partial data packets (or partial reference data packets 227) required for an error-free reception has to be within the bandwidth of the low-cost receiver.

C.3 Variation of Frequencies of the Sync (Partial) Data Packets

In embodiments, the reference signal 220 can be emitted repeatedly (like periodically, for example), wherein the reference signal 220 can be emitted alternatingly in at least two predetermined partial frequency ranges of the predetermined frequency range 224.

In embodiments, the at least two predetermined partial frequency ranges can be spaced apart from one another in frequency to such an extent that inadvertent synchronization to the respective other predetermined partial frequency range, caused by a frequency offset, is not possible.

In embodiments, the frequency channels of the at least two predetermined partial frequency ranges can be spaced apart from one another in frequency to such an extent that, even with a frequency offset, adjacent frequency channels do not overlap.

In embodiments, an occupancy of resources of the respective predetermined partial frequency ranges, indicated by the reference hopping pattern, does not have repetitive identical distances between the resources in time and/or frequency.

Further embodiments will be described below.

In the embodiments described in sections C.1 and C.2, the sync (partial) data packet(s) is/are always transferred on the same frequency/on the same (adjacent) frequencies to allow low-cost participants to synchronize in the network.

Emitting the beacon (or the control signal 120), however, takes place in a greater frequency range. This means that the resistance to disturbance of the beacon (or the control signal 120) is greater when compared to the sync (partial) data packet(s) (or the reference data packet 125/the partial reference data packets 127). Additionally, in static scenarios, the few frequency channels of the sync (partial) data packets (or partial reference data packets 127) may be positioned precisely in a fading hole and, therefore, never be received by a participant.

In embodiments, the emission of the sync (partial) data packets (or partial reference data packets 127) can change the frequency position periodically before each beacon. This scheme is shown in FIG. 31.

Figure 31:
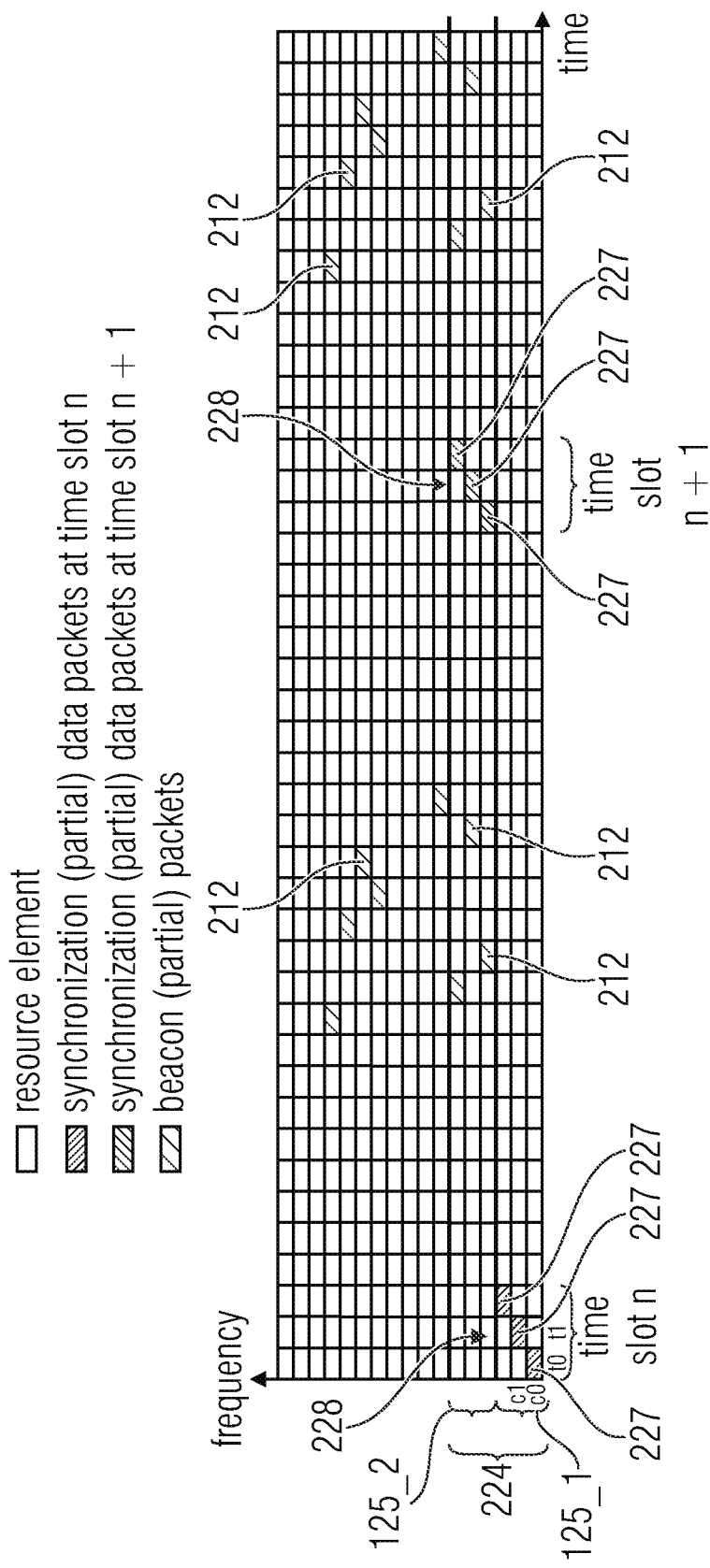
FIG. 31 shows, in a diagram, an occupancy of resources of the frequency band, defined by a frequency signal hopping pattern, when repeatedly emitting the reference signal having the plurality of partial reference data packets in different partial frequency regions of the predetermined frequency range, and an occupancy of resources of the frequency band, indicated by a control signal hopping pattern, when repeatedly (periodically) transferring the control signal having the plurality of partial control data packets, in accordance with an embodiment of the present invention.

In detail, FIG. 31 shows an occupancy of resources of the frequency band, defined by a reference signal hopping pattern 228, when repeatedly emitting the reference signal 220 having the plurality of partial reference data packets 227 in different partial frequency ranges 125_1, 125_2 of the predetermined frequency range 124, and an occupancy of resources of the frequency band, defined by a control signal hopping pattern 210, when repeatedly (periodically) transferring the control signal 120 having the plurality of partial control data packets 212, in accordance with an embodiment of the present invention in a diagram. Thus, the ordinate describes the frequency in frequency channels and the abscissa describes the time in time slots.

In other words, FIG. 31 shows a variation of the frequency channels of sync (partial) data packets (or partial reference data packets 227). In FIG. 31, the frequency channels t0 to t2 are occupied in the time slot n (or in a first group of time slots (t0, t1, t2), and the channels c3 to c5 are occupied in the time slot n+1 (or in a second group of time slots). Correspondingly, the frequency channels c6 to c8 can be occupied in the time slot n+2 (or in a third group of time slots). Time slot here means the time between two beacons, that is one time slot comprises the reference signal (sync beacon), the control signal (data beacon) and the subsequent data transfer regions.

Thus, a participant (like terminal point 106, for example) which does not detect any sync (partial) data packets (or partial reference data packets 227) in the channels c0 to c2 can exemplarily change channel and look for sync (partial) data packets (or partial reference data packets 227) there. If again it cannot detect anything there, it could change channel again, and so on.

This additionally allows nodes (or terminal points 106) which exhibit a local permanent disturbance on certain partial channels or are located in a fading hole, to nevertheless synchronize in the network.

For illustration purposes, in the embodiment shown in FIG. 31, an increasing order of the frequency channels is chosen for subsequent time slots (or groups of time slots). However, this is not necessary so that a different succession of frequency channels (like time slot n: c0, c1, c2, time slot n+1: c10, c11, c12, time slot n+2: c5, c6, c7 etc.) can be determined in other embodiments.

In embodiments, the frequency channels, which are used for emitting the sync (partial) data packets (or partial reference data packets 227), are temporally variable. There is a temporal periodicity with which the entire pattern of the succession of channels is repeated.

In order to maximize transfer security, it is possible to derive the sync ((partial) data packets (or partial reference data packets 227) of the different time slots (or groups of time slots) from the same synchronization information in order to thus be able to use any combination of the sync (partial) data packets (partial reference data packets 227) for reconstructing the data. If this is the case, the receiver (like base station 104) cannot determine unambiguously, with equal clustering over the time slots (or groups of time slots), which frequency offset is present since it is not able to determine whether the packets belong to emission n or n+1 when the frequency offset is greater than the distance between the clusters.

In embodiments, the clusters are spaced apart from one another in frequency at least to such an extent that inadvertent synchronization, caused by frequency offset, to the cluster shifted in frequency range, is not possible.

This entails exactly knowing, within a cluster, which of the sub-packets (or partial reference data packets 227) were received. If, in the case of a three cluster c0+c1+c2, one of the two outer sync (partial) data packets (or partial reference data packets 227) is disturbed, that is c0 or c2, the node (or terminal point 102) can synchronize successfully and, thanks to error protection, also decode, but does not know whether c0+c1 or c1+c2 were received.

If the frequency channels cX and cX+1 are sufficiently separate from each other so that, despite a frequency offset, it can be determined unambiguously which cX the sync (partial) data packet (or partial reference data packet 227) was emitted on, there is no longer ambiguity.

In embodiments, the frequency channels within a cluster are spaced apart from one another in frequency at least to such an extent that adjacent channels, even with a frequency offset, do not overlap.

Another solution approach is designing the clusters such that the frequency hopping pattern (or reference hopping pattern 228) within the cluster is unambiguous. That is, for example, no steps, like shown in the picture, but the sequence c0+c2+c1, which, with a successful detection of at least two sync (partial) data packets (or partial reference data packets 227) determine unambiguously which sync (partial) data packets (or partial reference data packets 227) were received.

In embodiments, the clusters of the sync (partial) data packets (or partial reference data packets 227) are selected such that there are no repetitive identical distances of the sync (partial) data packets (or partial reference data packets 227) within the cluster in time and frequency.

C.4 Dynamic Control of the Number of Sync (Partial) Data Packets Used

In embodiments, the reference signal 220 can be transferred in predetermined distances (like periodically), wherein a distance between at least two successive emissions of the reference signal 220 is adjusted dynamically to a number of new terminal points to be registered, or wherein the reference signal 220 is, for example, transmitted additionally responsive to an external result (like between two planned emissions of the reference signal 220).

In embodiments, a number of partial reference data packets 227, which the reference signal is provided with, can be adjusted dynamically to the number of new terminal points to be registered.

In embodiments, additionally a number of different frequency channels of the predetermined frequency range 224, which the plurality of partial reference data packets 227 is distributed to, can be adjusted dynamically to the number of new terminal points to be registered.

Further embodiments will be described below.

Frequently, there are times in a network when many new participants (like terminal points) want to register in the network (like communication system 102), for example (for example when first starting it), but there are also times when there are hardly/no new participants for the network.

Thus, at some points, it is superfluous to emit the sync (partial) data packets (partial reference data packets 127) since there is a high probability of no new participant (like terminal point 106) wanting to register. At a different time, many participants want to register, but they have to wait for a very long time until they find sync (partial) data packets (or partial reference data packets 227) on the frequency channels selected by the respective participants.

Thus, it is sensible to implement the number of emitted sync (partial) data packets (or partial reference data packets) dynamically. It is also possible to simultaneously emit several sync (partial) data packets (or partial reference data packets 227) and thus to simultaneously transfer the information several times on different frequencies. In FIG. 31, for example, emission at times n and n+1 could take place together at the time n and no emission take place at the time n+1.

In embodiments, the number of emitted sync (partial) data packets (or partial reference data packets 127) is implemented dynamically. Thus, it is possible not to emit sync (partial) data packets (or partial reference data packets 127) at some times, whereas, at other times, several clusters can be emitted simultaneously or all the frequency channels provided for emitting the sync (partial) data packets (or partial reference data packets 127) can be occupied.

Frequently, new participants (like terminal points 106) are applied by an electrician during installation. This means that the electrician applies new devices, which then automatically connect to the network.

However, the electrician knows when he or she has applied these participants, and can communicate it to the base station 104 (for example by pressing a button at the base or a web interface). If the base (or base station 104) is told that new participants (like terminal points 106) want to register, it can, as has been described before, dynamically emit several sync (partial) data packets (or partial reference data packets 127) to accelerate the synchronization/register process.

In embodiments, the base station, when being told so, emits more sync (partial) data packets (or partial reference data packets 127) than usual.

C.5 Interleaved Clusters when Multiply Emitting the Sync (Partial) Data Packets Before a Beacon In embodiments, the reference signal 220 can be emitted repeatedly, the reference signal 220 being provided with a plurality of partial reference data packets 227, wherein the plurality of partial reference data packets of at least two, for example successive, emissions of the reference signal 220 are temporally interleaved in correspondence with respective reference signal hopping patterns 228.

In embodiments, the respective reference signal hopping patterns 228 are versions of one another mutually shifted in time and frequency.

In embodiments, a temporal distance between the plurality of partial reference data packets 227 of the respective reference signal 220 can correspond to the number of repetitions.

Further embodiments will be described below.

If, as described in C.4, the sync partial data packets (or partial reference data packets 227) are emitted repeatedly, the at least two emissions can be temporally interleaved. This is shown in FIG. 32 for a double emission with a division into three partial packets (or partial reference data packets 227).

Figure 32:
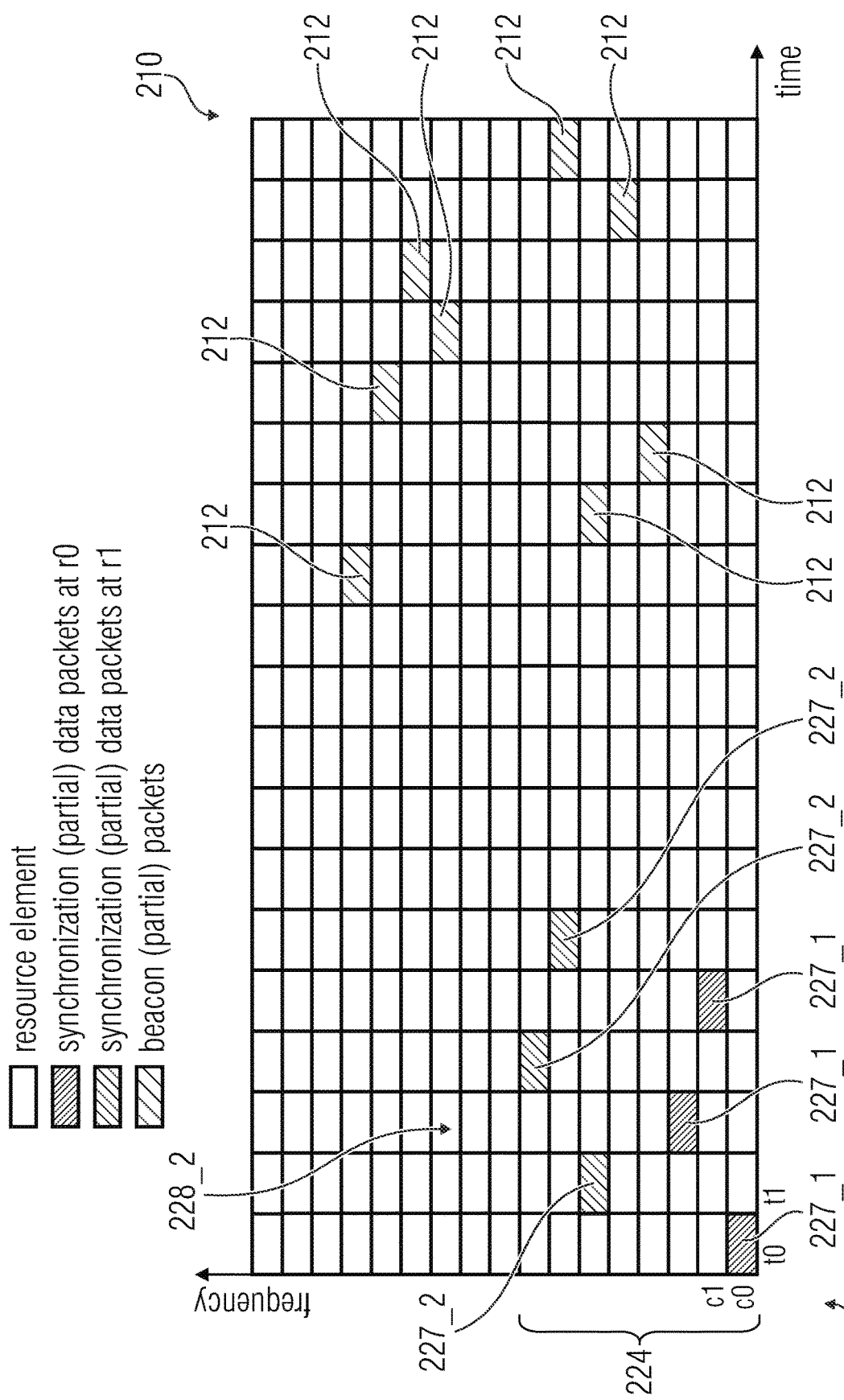
FIG. 32 shows, in a diagram, occupancies of resources of the predetermined frequency range of the frequency band, indicated by reference signal hopping patterns, when repeatedly emitting the reference signal so that the plurality of partial reference data packets of the multiple emission of the reference signal are mutually temporally interleaved, and an occupancy of resources of the frequency band, defined by a control signal hopping pattern, when transferring the control signal having the plurality of partial control data packets, in accordance with an embodiment of the present invention.

In detail, FIG. 32 shows occupancies of resources of the predetermined frequency range 224 of the frequency band, indicated by reference signal hopping patterns 228_1, 228_2, in a multiple emission of the reference signal 220 in a diagram so that the plurality of partial reference data packets 227_1, 227_2 of the multiple emission of the reference signal 220 are mutually interleaved in time, and an occupancy of resources of the frequency band, defined by a control signal hopping pattern 210, when transferring the control signal having the plurality of partial control data packets, in accordance with an embodiment of the present invention. Thus, the ordinate describes the frequency in frequency channels and the abscissa describes the time in time slots. In other words, FIG. 32 shows a temporal interleaving of two emissions of sync partial data packets (or partial reference data packets 227_1, 227_2).

An advantage of this temporal interleaving is the resistance to disturbance since there is greater a temporal distance between adjacent frequency channels. With regard to the characteristics of synchronization of a new participant (like terminal point 106, for example), nothing changes, except for a higher latency when receiving the sync partial data packets (or partial reference data packets 227). This is not much of a problem since the participant, after receiving the sync partial data packets (or partial reference data packets 227), nevertheless has to wait until it can receive the beacon (or the control signal 120 having the control signal data packets 212).

Since the distance between the last sync partial data packet (or partial reference data packet 227) and the beginning of the beacon (or the control signal 120 having the control signal data packets 212) varies from cluster to cluster, this distance (that is the temporal beginning of the beacon) either has to be known before to the participant or be signaled suitably.

In embodiments, the repetitions are interleaved with a repeated emission of the sync partial data packets (or partial reference data packets 127) before a beacon.

With multiple repetitions, all the emissions can be mutually interleaved, but there has to be a pause, which corresponds to the number of repetitions, between the partial data packets (or partial reference data packets 227) of a transfer.

In the embodiment shown in FIG. 32, a single repetition is applied, which means that one time slot has to be left free between the partial data packets (or partial reference data packets) of the first emission r0. With a double repetition, it would be two slots, and so on.

The emission r1 begins with the same pattern (corresponding to a cluster) at the time slot t1. Selecting the distances to be equidistant ensures that there is no temporal overlapping between the repetitions.

When using two repetitions, the second repetition would begin in time slot t2.

In embodiments, a basic cluster is used, which is used for all the repeated emissions.

In embodiments, the temporal distances between the partial data packets (or partial reference data packets 227) within the cluster correspond to the number of repetitions.

C.6 Using Known Data as a Virtual Preamble

In embodiments, the reference signal 220 can be provided with a plurality of partial reference data packets 227, wherein at least two of the plurality of partial reference data packets 227 comprise synchronization sequences which are known to the terminal points, wherein the at least two of the plurality of partial reference data packets 227 comprise data (like an ID of the communication system, for example) known to the terminal point 106, as will be discussed below referring to FIG. 33.

Figure 33:
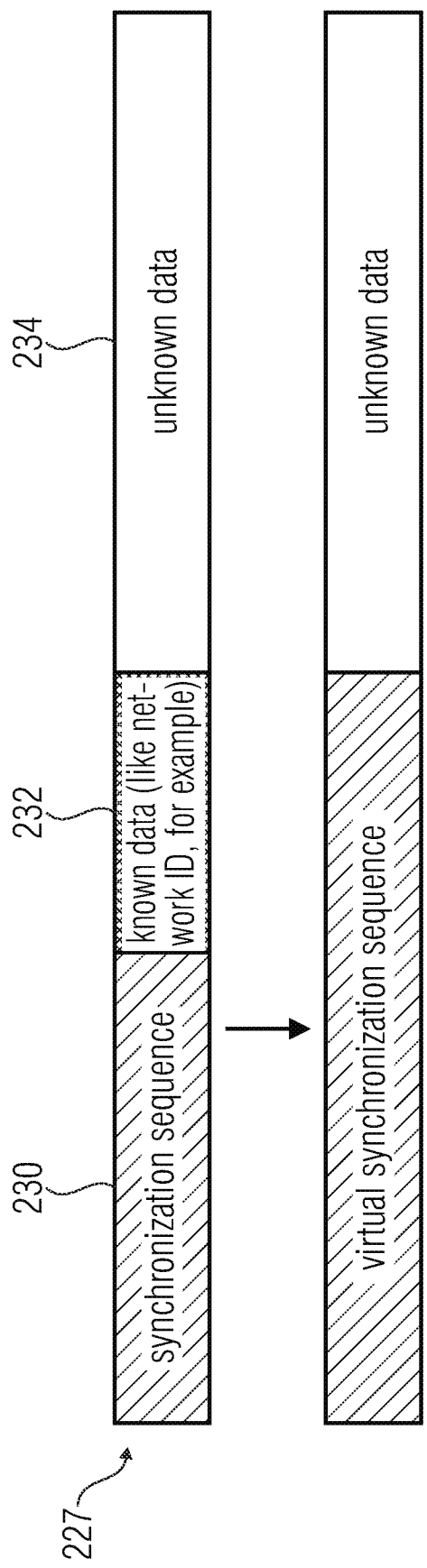
FIG. 33 shows a schematic view of one of the plurality of partial reference data packets, in accordance with an embodiment of the present invention.

FIG. 33 shows a schematic view of one of the plurality of partial reference data packets 227, in accordance with an embodiment of the present invention. As is shown in FIG. 33, the partial reference data packet 227 can comprise a synchronization sequence 230, known data 232, like an identification of the communication system 102, for example, and unknown data 234. Thus, as is shown in FIG. 33, the synchronization sequence 230 and the known data 232 can form a virtual synchronization sequence.

Figure 34:
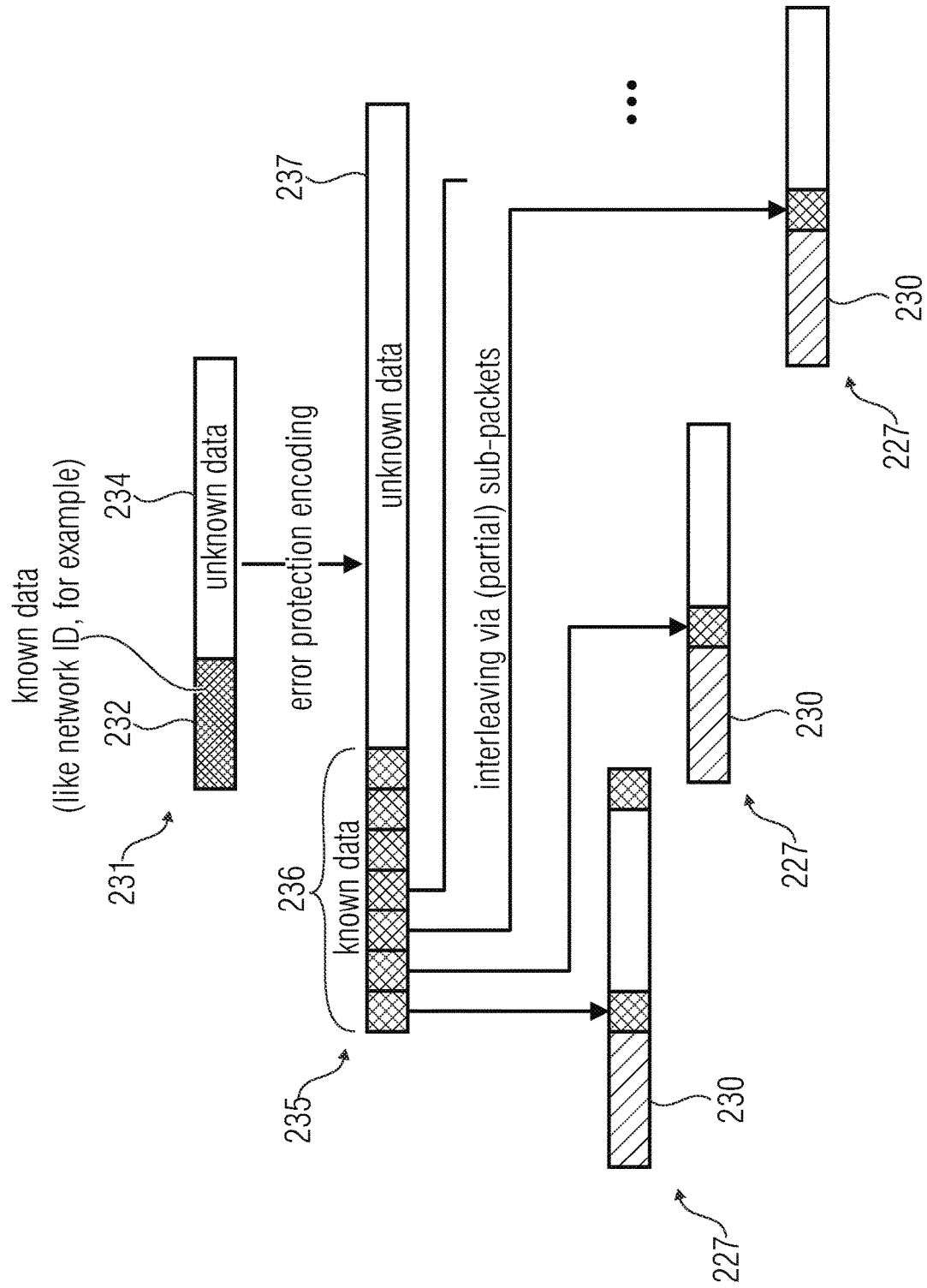
FIG. 34 shows a schematic view of coding and splitting the data of a reference data packet onto a plurality of partial reference data packets, in accordance with an embodiment of the present invention.

FIG. 34 shows a schematic view of encoding and splitting the data 231 (=known data and unknown data) of a reference data packet onto a plurality of partial reference data packets 227, in accordance with an embodiment of the present invention. As can be seen in FIG. 34, the data 231 comprising known data 232 and unknown data 234, can be encoded or provided with an error protection code to obtain encoded data 235 comprising encoded known data 236 and encoded unknown data 237. The encoded known data 236 here can be split interleaved onto the partial reference data packets 227 so that the respective parts of the encoded known data 236 are, in the respective partial reference data packets 227, arranged directly adjacent to the respective synchronization sequences 230.

Figure 35:
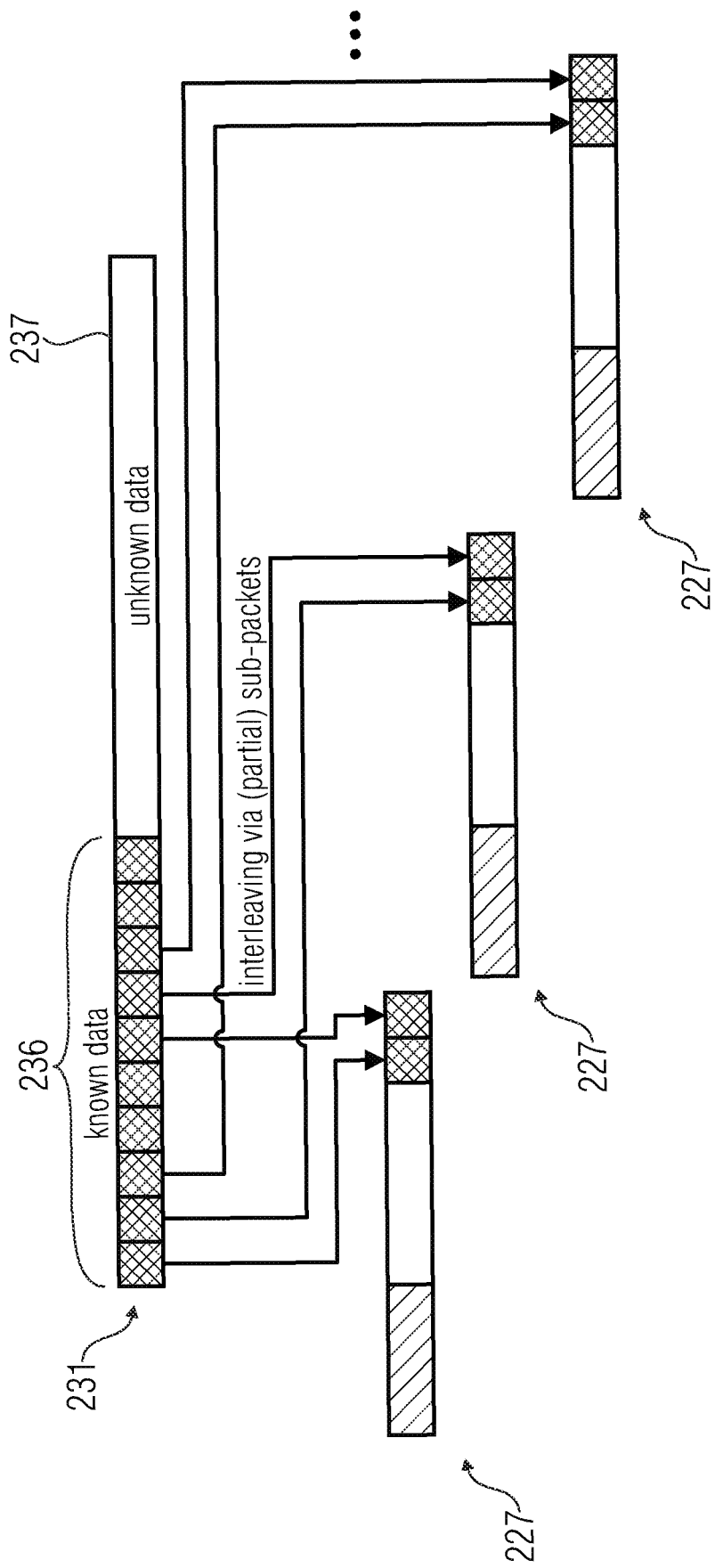
FIG. 35 shows a schematic view of splitting encoded data onto a plurality of partial reference data packets, in accordance with an embodiment of the present invention.

FIG. 35 shows a schematic view of splitting encoded data 235 comprising known encoded data 236 and unknown encoded data 237 onto the plurality of partial reference data packets 227, in accordance with an embodiment of the present invention. Like in FIG. 35, the encoded known data 236 are divided interleaved to the partial reference data packets 227. In contrast to FIG. 35, the respective parts of the encoded known data 236, in the respective partial reference data packets 227, are arranged at a predetermined distance to the respective synchronization sequences 230.

Further embodiments will be described below.

A participant (like terminal point 106, for example) not yet connected to a network frequently knows before which network (or communication system 102) it wants to connect to.

An unambiguous identification of a network usually takes place using the network ID or comparable information which, however, is known before to the participant.

Typically, a participant is within reach of several networks and has to select the correct network (or communication system 102) it wants to connect to, due to the network ID.

In order for the participant not to always have to receive the beacon (or the control signal 120) of a network (or communication system 102), it is sensible to introduce the network ID into the sync (partial) data packets (or reference signal having the partial reference data packets 227) already before.

If the channel access pattern is calculated pursuant to section A, this is entailed since the network ID enters into calculating the channel access pattern.

The known network ID is thus transferred in the sync partial data packets (or partial reference data packets 227) and is known to the new participant to be registered (like terminal point 160) before synchronization. When transferring the network ID in the sync (partial) data packets (or partial reference data packets 227), the network ID can thus be assumed to be known data (similar to a synchronization sequence).

If, apart from the synchronization sequence 230, there are further known data 232, these can also be used for synchronization. The precision of the estimation can be improved considerably by the further data ("extended virtual synchronization sequence").

In embodiments, known data 232 (like network ID) are used for improving the synchronization.

If the network ID is introduced into the sync partial data packets (or partial reference data packets 227) directly before or after the fixed synchronization sequence 230, it can be combined, together with the preamble (or synchronization sequence 230), to form a longer "virtual preamble". This means that an improved synchronization can be performed.

In embodiments, in the sync partial data packets (or partial reference data packets 227), the known data 232 are arranged directly before or after the synchronization sequence 230 so that the result, together with the synchronization sequence 230, is an extended continuous virtual synchronization sequence.

When using telegram spitting, encoding the useful data and interleaving across the partial data packets are usually performed.

If the network ID is still to be used for synchronization, interleaving has to be performed such that the encoded symbols are still introduced directly before or after the synchronization sequence 230.

FIG. 34 shows a synchronization sequence 230, implemented as a preamble and thus positioned at the beginning of the (partial) sub-packets (or partial reference data packets 227). Alternative embodiments can also use a mid-amble or post-amble instead of the preamble.

Encoding the known data (like network ID) (without the following unknown data) can be performed in the participant before synchronization. After applying the interleaver, the previously known symbols can be extracted for synchronization and be combined with the known synchronization sequence.

If a flexible decoder which allows synchronizing to more than one continuous synchronization sequence per partial packet is used for receiving, it can be of advantage not to place the known data in the front, but to place them in the center or at the end of the partial packet, since in this case frequency and phase estimation are facilitated when the signal changes over time by disturbances or tolerances (for example with mobility of the terminal nodes), as is shown in FIG. 35.

It is to be kept in mind here that sufficient known data have to be present so that the known data occupy at least two successive symbols in the partial packets (or reference data packets 227), since otherwise (depending on the type of modulation and inter-symbol interference) the known data are not well suitable for supporting synchronization, due to the unknown previous or following data.

In embodiments, the known data in the partial data packets (or partial reference data packets) are not placed directly before or after the synchronization sequence 230, but distributed in the packet (or partial reference data packet 227) so that they occupy at least two successive symbols with a distance to the synchronization sequence of the partial data packet (or partial reference data packet 227).

C.7 Different Code Rates

In embodiments, the reference signal 220 can be provided with a plurality of partial reference data packets 227, wherein a number of partial reference data packets 227 is adjusted to an error protection code used for the control signal 120.

In embodiments, the reference signal 220 and the control signal 120 can be provided with the same error protection code or with error protection codes of comparable performance.

In embodiments, the plurality of partial reference data packets 227 can be symbol-identical.

Further embodiments will be described below.

In order to ensure the highest transfer security possible, it is of advantage to provide the transferred data with an error protection code. Depending on requirements of the system, more sync (partial) data packets (or partial reference data packets 227) may have to be used in order for the threshold where the packet (or partial reference data packet 227) can be synchronized, is at least below the threshold of being decodable.

If, for example, a very low-rate error protection is used in the beacon, this packet is decodable, for example, up to an SNR of 0 dB. If only a very small number of sync (partial) data packets (or partial reference data packets 227) are emitted, the sync (partial) data packets (or partial reference data packets 227) may only be synchronized successfully up to an SNR of 3 dB. In this case, the increased error protection would be wasted energy in emission since, with no synchronization of the sync (partial) data packets (or partial reference data packets 227), the beacon (or the partial control data packets 212 of the control signal 120) cannot be received since its position and frequency hopping pattern (or control signal hopping pattern 210) are not known.

Correspondingly, adjusting the number of sync (partial) data packets (or partial reference data packets 227) to the error protection code of the beacon (or of the control signal 120) to be used is entailed.

In embodiments, the number of sync (partial) data packets (or partial reference data packets 227) is adjusted to the used error protection in the beacon (or in the partial control signal data packets 212 of the control signal 120).

Since the information in the sync data packet (or partial reference data packet 227) has to be decodable at the same threshold as is the beacon, it is sensible to provide the sync data packet with an equal-value error protection code as the beacon.

In embodiments, the beacon and sync data packet can use the same error protection code.

In embodiments, the beacon and sync data packet can use error protection codes of comparable performance.

If the sync data packet is very short, it may be sensible to use a simple repetition code instead of a conventional error protection code (like convolution code, for example), and to pack the full information into each individual sync (partial) data packet (or partial reference data packet 227).

In embodiments, all the sync (partial) data packets (or partial reference data packets) can be symbol-identical.

D. Further Embodiments

Figure 36:
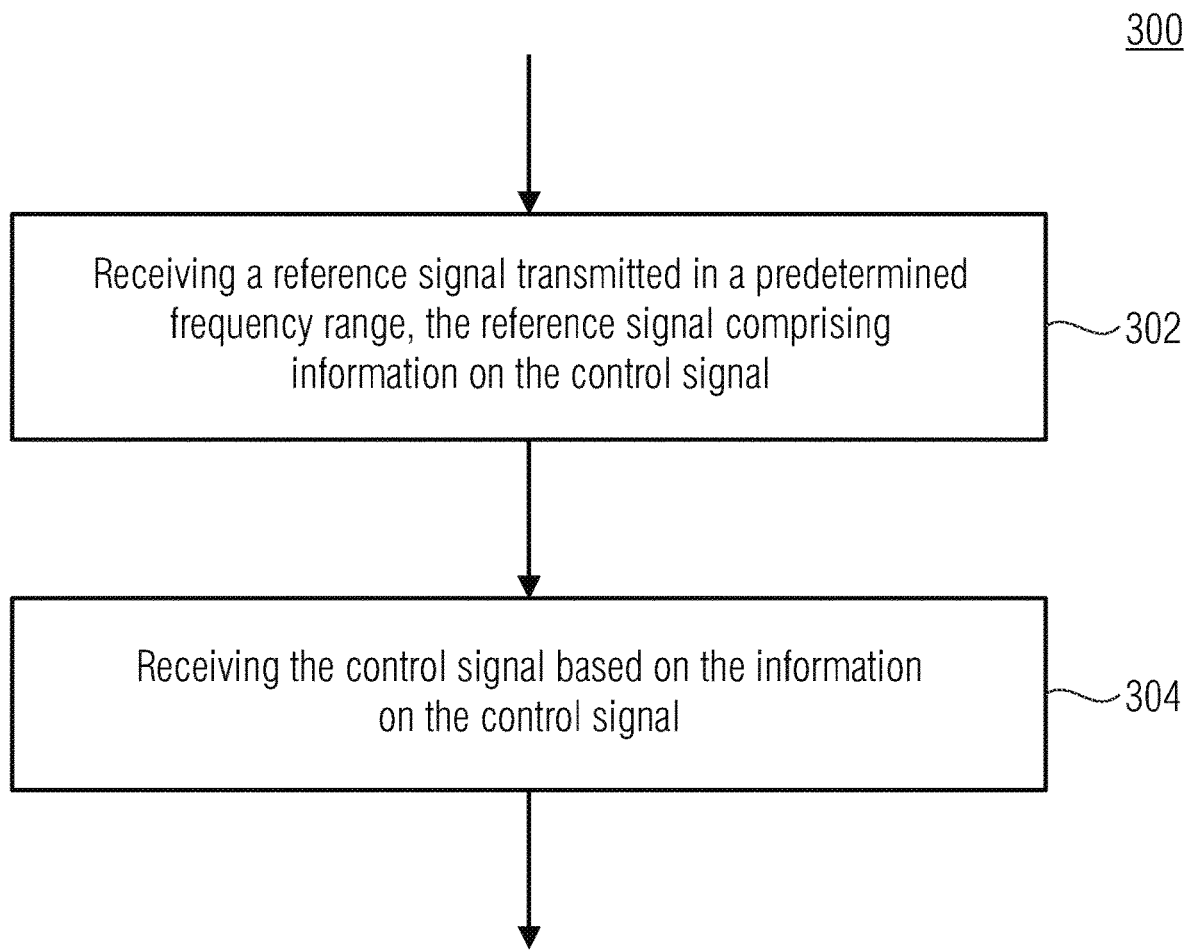
FIG. 36 shows a flowchart of a method for operating a terminal point of a communication system, in accordance with an embodiment of the present invention.

FIG. 36 shows a flowchart of a method 300 for operating a terminal point of a communication system, in accordance with an embodiment of the present invention. The communication system communicates in a frequency band which is used for communication by a plurality of communication systems [wherein the communication systems are mutually uncoordinated, for example], wherein a control signal is emitted in the communication system [like a base station of the communication system] for coordinating the participants of the communication system, wherein the control signal is transferred distributed in correspondence with a frequency hop-based [and time hop-based, for example] occupancy of resources of the frequency band, indicated by a control signal hopping pattern, wherein the terminal point comprises a receiver, wherein a receive bandwidth of the receiver is smaller at least by the factor 5 than a bandwidth of the frequency hop-based [and time hop-based, for example] occupancy of resources of the frequency band, indicated by the control signal hopping pattern. The method 300 comprises a step 302 of receiving a reference signal [like synchronization signal] which is transmitted in a predetermined frequency range [like one or more frequency channels] of the frequency band (like by the base station of the communication system], wherein the reference signal comprises information on the control signal. Additionally, the method 300 comprises a step 304 of receiving the control signal based on the information on the control signal.

Figure 37:
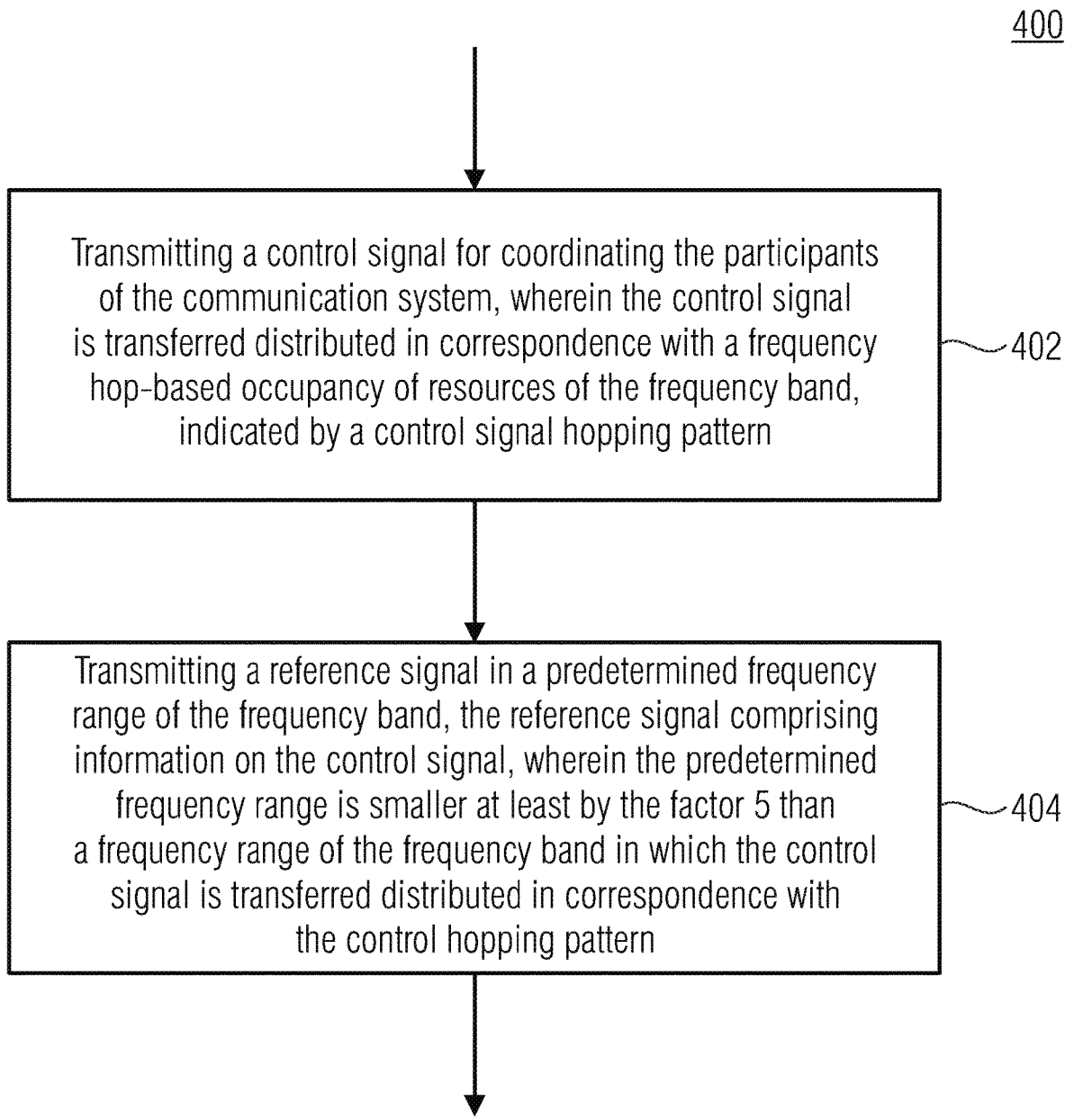
FIG. 37 shows a flowchart of a method for operating a base station of a communication system, in accordance with an embodiment of the present invention.

FIG. 37 shows a flowchart of a method 400 for operating a base station of a communication system, in accordance with an embodiment of the present invention. The communication system communicates in a frequency band, which is used for communication by a plurality of communication systems [wherein the communication systems are mutually uncoordinated, for example]. The method 400 comprises a step 402 of transmitting a control signal for coordinating the participants of the communication system, wherein the control signal is transferred distributed in correspondence with a frequency hop-based [and time hop-based, for example] occupancy of resources of the frequency band, indicated by a control signal hopping pattern. Additionally, the method 400 comprises a step 404 of transmitting a reference signal [like synchronization signal] in a predetermined frequency range [like one or more frequency channels] of the frequency band, wherein the reference signal comprises information on the control signal, wherein the predetermined frequency range is smaller [like narrower] by at least the factor 5 than a frequency range of the frequency band in which the control signal is transferred distributed in correspondence with the control hopping pattern.

Embodiments are applied in systems for radio transmission of data from terminal devices to a base station and from one/more base stations to terminal devices. Exemplarily, a system can be a personal area network (PAN) or a low-power wide-area network (LPWAN), wherein the terminal devices can, for example, be battery-operated sensors (sensor nodes).

Embodiments aim at cases of application in which a message (data packet) is transferred in several partial data packets by means of the so-called telegram splitting method (or telegram splitting multiple access, TSMA). It is of particular advantage for being applied in the case that the base station is battery-operated so that operating the base station receiver is optimized with regard to energy consumption.

As has already been mentioned, the embodiments described herein can be used to transfer data between the participants of the communication system based on the telegram splitting method. In telegram splitting methods, data like a telegram or data packet, are split into a plurality of sub-data packets (or partial data packets or partial packets) and the sub-data packets are transferred from one participant to another participant (like from the base station to the terminal point or from the terminal point to the base station) of the communication system distributed in time and/or frequency using a time and/or frequency hopping pattern, wherein the participant which receives the sub-data packets assembles (or combines) same again to obtain the data packet. Each of the sub-data packets contains only a part of the data packet. Additionally, the data packet can be channel-encoded so that not all the sub-data packets, but only a part of the sub-data packets is required for error-free decoding of the data packet.

When transferring data based on the telegram splitting method, the sub-data packets can be transferred distributed in a subset (like a selection) of the available resources of the network-specific channel access pattern. In detail, the sub-data packets can be transferred based on the relative channel access pattern, that is in the resources of the relative channel access pattern. Exemplarily, one sub-data packet can be transferred per resource.

Further embodiments provide a base station of a communication system, wherein the communication system wirelessly communicates in a frequency band [e.g. a license-free and/or permission-free frequency band; e.g. the ISM bands] that is used for communication by a plurality of communication systems, wherein the base station is configured to transmit a signal [e.g. a beacon signal], wherein the signal comprises information about a channel access pattern, wherein the channel access pattern indicates a frequency hop-based and/or time hop-based occupancy [e.g. of resources] of the frequency band that is usable for the communication of the communication system [e.g. a temporal sequence of frequency resources (e.g. distributed across the frequency band) that are usable for the communication of the communication system], wherein the information describes a state of a numerical sequence generator [e.g. a periodic numerical sequence generator or a deterministic random number generator] for generating a numerical sequence, or wherein the information describes a number [e.g. a time slot index and/or a beacon index] of a numerical sequence [e.g. a periodic time slot index sequence and/or a periodic beacon index sequence], wherein the numerical sequence determines the channel access pattern.

In embodiments, the channel access pattern may differ from another channel access pattern on the basis of which at least one other communication system of the plurality of other communication systems accesses the frequency band.

In embodiments, the base station may be configured to operate uncoordinatedly with respect to the other communication systems.

In embodiments, the base station may be configured to communicate with a participant of the communication system by using the resources determined by the channel access pattern or a subset thereof.

In embodiments, the base station may be configured to emit the signal with the information about the channel access pattern multiple times [e.g. periodically], wherein the information about the channel access pattern transferred with consecutive emissions of the signal describe different [e.g. consecutive or immediately consecutive] states of the numerical sequence generator or different numbers of the numerical sequence.

In embodiments, the information transferred with the emissions of the signal may describe only a subset of the states of the numerical sequence generator or of the numbers of the numerical sequence [e.g. only every n-th state or every n-th index number is transferred, wherein n is a natural number larger than or equal to two].

In embodiments, the information about the channel access pattern may be the state of the numerical sequence generator or information derived therefrom [e.g. a part of the state of the numerical sequence generator (e.g. LSBs of the state of the numerical sequence generator)].

In embodiments, the information about the channel access pattern may be the number of the numerical sequence or information derived therefrom [e.g. a part of the state of the numerical sequence (e.g. LSBs of the number of the numerical sequence)].

In embodiments, the base station may be configured to identify the channel access pattern as a function of the state of the numerical sequence generator or of a number of the numerical sequence derived from the state of the numerical sequence generator.

In embodiments, states of the numerical sequence generator [e.g. directly] following the state of the numerical sequence generator may be identifiable on the basis of the state of the numerical sequence generator, wherein the base station may be configured to identify the channel access pattern as a function of the following states of the numerical sequence generator or following numbers of the numerical sequence derived therefrom.

In embodiments, the base station may be configured to identify the channel access pattern as a function of individual information of the communication system [e.g. intrinsic information of the communication system such as a network-specific identifier].

In embodiments, the individual information of the communication system may be intrinsic information of the communication system.

In embodiments, the intrinsic information of the communication system may be a network-specific identifier.

In embodiments, the network-specific identifier may be an identification of the communication system.

In embodiments, the base station may be configured to map, by using a mapping function,
the state of the numerical sequence generator or a number of the numerical sequence derived from the state of the numerical sequence generator, or the number of the numerical sequence, and
the individual information of the communication system, onto time information and frequency information, wherein the time information and the frequency information describe a resource of the channel access pattern.

In embodiments, the time index information may describe a time slot or a time slot index.

In embodiments, when mapping the time information, the mapping function may consider an activity rate of the communication system, wherein the activity rate is specified before the execution, or wherein the signal or a further signal transmitted by the base station comprises information about the activity rate.

In embodiments, when mapping onto the time information, the mapping function may consider different activity rates of the communication system so that the channel access pattern comprises regions of different activity rates, wherein the signal or the further signal comprises information about the activity rates.

In embodiments, the base station may be configured to dynamically adapt the activity rate as a function of a current or predicted utilization situation of the communication system.

In embodiments, when mapping onto the time information, the mapping function may adhere to a specified minimum distance [e.g. of one or several time slots or time slot indices] between [e.g. directly] consecutive time slots or time slot indices of the channel access pattern.

In embodiments, the frequency information may describe a frequency channel or a frequency channel index.

In embodiments, the frequency information may describe a distance between [e.g. directly] consecutive frequency channels or frequency channel indices of the channel access pattern.

In embodiments, when mapping onto the frequency information, the mapping function may adhere to a specified minimum distance between [e.g. directly] consecutive frequency channels or frequency channel indices of the channel access pattern.

In embodiments, when mapping onto the frequency information, the mapping function may consider an interference-prone frequency channel or a range of interference-prone frequency channels of the frequency band so that the interference-prone frequency channel or the range of interference-prone frequency channels is not or less occupied by the channel access pattern.

In embodiments, the frequency information may describe a bundling of frequency resources of the frequency band including at least two directly adjacent or spaced apart frequency channels or frequency channel indices.

In embodiments, the base station may be configured to identify a pseudo random number R as a function of:
the state of the numerical sequence generator, or a number of the numerical sequence derived from the state of the numerical sequence generator, or the number of the numerical sequence, and
individual information of the communication system, wherein the pseudo random number R determines the channel access pattern.

In embodiments, the base station may be configured to identify a resource [e.g. a frequency channel and/or time slot, or a frequency channel index and/or time slot index] of the channel access pattern on the basis of the pseudo random number R.

In embodiments, the signal may a beacon signal.

In embodiments, the numerical sequence generator may be a periodic numerical sequence generator for generating a periodic numerical sequence.

In embodiments, the numerical sequence generator may be a deterministic random number generator for generating a pseudo-random numerical sequence.

In embodiments, the state of the numerical sequence generator may be a periodic beacon index and/or a periodic time slot index.

In embodiments, a number derived from the state of the numerical sequence generator may be a periodic beacon index and/or a periodic time slot index.

In embodiments, the number of the numerical sequence may be a periodic beacon index and/or a periodic time slot index.

In embodiments, an occupancy of the frequency band defined by the channel access pattern may at least partially overlap an occupancy of the frequency band by another communication system.

Furth embodiments provide a terminal point of a communication system, wherein the communication system wirelessly communicates in a frequency band [e.g. a license-free and/or permission-free frequency band; e.g. the ISM bands] that is used for communication by a plurality of communication systems, wherein the terminal point is configured to receive a signal [e.g. a beacon signal], wherein the signal comprises information about a channel access pattern, wherein the channel access pattern indicates a frequency hop-based and/or time hop-based occupancy [e.g. of resources] of the frequency band that is usable for the communication of the communication system [e.g. a temporal sequence of frequency resources (e.g. distributed across the frequency band) that are usable for the communication of the communication system], wherein the terminal point is configured to identify the channel access pattern on the basis of the information about the channel access pattern, wherein the information describes a state of a numerical sequence generator [e.g. a periodic numerical sequence generator or a deterministic random number generator] for generating a numerical sequence, or wherein the information describes a number [e.g. a time slot index and/or a beacon index] of a numerical sequence [e.g. a periodic time slot index sequence and/or a periodic beacon index sequence], wherein the numerical sequence determines the channel access pattern.

In embodiments, the channel access pattern may differ from another channel access pattern on the basis of which at least one other communication system of the plurality of other communication systems accesses the frequency band.

In embodiments, the terminal point may be configured to operate uncoordinatedly with respect to the other communication systems.

In embodiments, the terminal point may be configured to communicate with a participant of the communication system by using the resources determined by the channel access pattern or a subset thereof.

In embodiments, the terminal point may be configured to receive the signal with the information about the channel access pattern multiple times [e.g. periodically], wherein the information about the channel access pattern transferred with consecutive emissions of the signal describe different [e.g. consecutive or immediately consecutive] states of the numerical sequence generator or different numbers of the numerical sequence, wherein the terminal point may be configured to identify the channel access pattern on the basis of the information about the channel access pattern [e.g. on the basis of the different states of the numerical sequence generator or the different numbers of the numerical sequence].

In embodiments, the information transferred with the emissions of the signal may describe only a subset of the states of the numerical sequence generator or of the numbers of the numerical sequence [e.g. only every n-th state or every n-th index number is transferred, wherein n is a natural number larger than or equal to two].

In embodiments, the information about the channel access pattern may be the state of the numerical sequence generator or information derived therefrom [e.g. a part of the state of the numerical sequence generator (e.g. LSBs of the state of the numerical sequence generator)], In embodiments, the information about the channel access pattern may be the number of the numerical sequence or information derived therefrom [e.g. a part of the state of the numerical sequence (e.g. LSBs of the number of the numerical sequence)].

In embodiments, the terminal point may be configured to identify the channel access pattern as a function of the state of the numerical sequence generator or of a number of the numerical sequence derived from the state of the numerical sequence generator.

In embodiments, states of the numerical sequence generator [e.g. directly] following the state of the numerical sequence generator may be identifiable on the basis of the state of the numerical sequence generator, wherein the terminal point may be configured to identify the channel access pattern as a function of the following states of the numerical sequence generator or following numbers of the numerical sequence derived therefrom.

In embodiments, the terminal point may be configured to identify the channel access pattern as a function of individual information of the communication system [e.g. intrinsic information of the communication system such as a network-specific identifier].

In embodiments, the individual information of the communication system may be intrinsic information of the communication system.

In embodiments, the intrinsic information of the communication system may be a network-specific identifier.

In embodiments, the network-specific identifier may be an identification of the communication system.

In embodiments, the terminal point may be configured to map, by using a mapping function, the state of the numerical sequence generator or a number of the numerical sequence derived from the state of the numerical sequence generator, or the number of the numerical sequence, and the individual information of the communication system onto time information and frequency information, wherein the time information and the frequency information describe a resource of the channel access pattern.

In embodiments, the time index information may describe a time slot or a time slot index.

In embodiments, when mapping the time information, the mapping function may consider an activity rate of the communication system, wherein the activity rate is specified before the execution, or wherein the signal or a further received signal comprises information about the activity rate.

In embodiments, when mapping onto the time information, the mapping function may consider different activity rates of the communication system so that the channel access pattern comprises regions of different activity rates, wherein the signal or the further signal comprises information about the activity rates.

In embodiments, the signal comprises information about the activity rates of the communication system.

In embodiments, the terminal point may be configured to receive a further signal, wherein the further signal comprises information about the activity rates of the communication system.

In embodiments, when mapping onto the time information, the mapping function may adhere to a specified minimum distance [e.g. of one or several time slots or time slot indices] between [e.g. directly] consecutive time slots or time slot indices of the channel access pattern.

In embodiments, the frequency information may describe a frequency channel or a frequency channel index.

In embodiments, the frequency information may describe a distance between [e.g. directly] consecutive frequency channels or frequency channel indices of the channel access pattern.

In embodiments, when mapping onto the frequency information, the mapping function may adhere to a specified minimum distance between [e.g. directly] consecutive frequency channels or frequency channel indices of the channel access pattern.

In embodiments, when mapping onto the frequency information, the mapping function may consider an interference-prone frequency channel or a range of interference-prone frequency channels of the frequency band so that the interference-prone frequency channel or the range of interference-prone frequency channels is not or less occupied by the channel access pattern.

In embodiments, the frequency information may describe at least two directly adjacent or spaced apart frequency channels or frequency channel indices.

In embodiments, the terminal point may be configured to identify a pseudo random number R as a function of:
- the state of the numerical sequence generator, or a number of the numerical sequence derived from the state of the numerical sequence generator, or the number of the numerical sequence, and
- individual information of the communication system, wherein the pseudo random number R determines the channel access pattern.

In embodiments, the terminal point may be configured to identify a resource [e.g. a frequency channel and/or time slot, or a frequency channel index and/or time slot index] of the channel access pattern on the basis of the pseudo random number R.

In embodiments, the signal may be a beacon signal.

In embodiments, the numerical sequence generator may be a periodic numerical sequence generator for generating a periodic numerical sequence.

In embodiments, the numerical sequence generator may be a deterministic random number generator for generating a pseudo-random numerical sequence.

In embodiments, the state of the numerical sequence generator may be a periodic beacon index and/or a periodic time slot index, In embodiments, a number derived from the state of the numerical sequence generator may be a periodic beacon index and/or a periodic time slot index.

In embodiments, the number of the numerical sequence may be a periodic beacon index and/or a periodic time slot index.

In embodiments, an occupancy of the frequency band that is defined by the channel access pattern may at least partially overlap an occupancy of the frequency band by another communication system.

Further embodiments provide a communication system having one of the above-described base stations and at least one of the above-described terminal points.

Further embodiments provide a method for operating a base station of a communication system, wherein the communication system wirelessly communicates in a frequency band that is used for communication by a plurality of communication systems. The method includes a step of transmitting a signal, wherein the signal comprises information about a channel access pattern, wherein the channel access pattern indicates a frequency hop-based and/or time hop-based occupancy of the frequency band that is usable for the communication of the communication system, wherein the information describes a state of a numerical sequence generator for generating a numerical sequence, or wherein the information describes a number of a numerical sequence, wherein the numerical sequence determines the channel access pattern.

Further embodiments provide a method for operating a terminal point of a communication system, wherein the communication system wirelessly communicates in a frequency band that is used for communication by a plurality of communication systems. The method includes a step of receiving a signal, wherein the signal comprises information about a channel access pattern, wherein the channel access pattern indicates a frequency hop-based and/or time hop-based occupancy of the frequency band that is usable for the communication of the communication system. In addition, the method includes a step of identifying the channel access pattern on the basis of the information about the channel access pattern, wherein the information describes a state of a numerical sequence generator for generating a numerical sequence, or wherein the information describes a number of a numerical sequence, wherein the numerical sequence determines the channel access pattern.

Further embodiments provide a controller for a participant of a communication system, wherein the communication system wirelessly communicates in a frequency band that is used for communication by a plurality of communication systems, wherein the controller is configured to identify a channel access pattern, wherein the channel access pattern indicates a frequency hop-based and/or time hop-based occupancy of the frequency band that is usable for the communication of the communication system, wherein the controller is configured to identify the channel access pattern as a function of a state of a numerical sequence generator for generating a numerical sequence or a number of a numerical sequence.

In embodiments, the controller may be configured to identify the channel access pattern as a function of the state of the numerical sequence generator, or of a number of the numerical sequence derived from the state of the numerical sequence generator.

In embodiments, states of the numerical sequence generator [e.g. directly] following the state of the numerical sequence generator may be identifiable on the basis of the state of the numerical sequence generator, wherein the controller may be configured to identify the channel access pattern as a function of the following states of the numerical sequence generator, or of following numbers of the numerical sequence derived therefrom.

In embodiments, the controller may be configured to identify the channel access pattern as a function of individual information of the communication system [e.g. intrinsic information of the communication system such as a network-specific identifier].

In embodiments, the controller may be configured to map, by using a mapping function,
the state of the numerical sequence generator or a number of the numerical sequence derived from the state of the numerical sequence generator, or the number of the numerical sequence, and
the individual information of the communication system onto time information and frequency information, wherein the time information and the frequency information describe a resource of the channel access pattern.

In embodiments, the controller may be configured to identify a pseudo random number R as a function of:
the state of the numerical sequence generator, or a number of the numerical sequence derived from the state of the numerical sequence generator, or the number of the numerical sequence, and
individual information of the communication system, wherein the pseudo random number R determines the channel access pattern.

In embodiments, the controller may be configured to identify a resource [e.g. a frequency channel and/or time slot, or a frequency channel index and/or time slot index] of the channel access pattern on the basis of the pseudo random number R.

Further embodiments provide a method for generating a channel access pattern. The method includes a step of generating the channel access pattern, where the channel access pattern indicates a frequency hop-based and/or time hop-based occupancy of the frequency band that is usable for the communication of a communication system, wherein the communication system wirelessly communicates in a frequency band that is used for communication by a plurality of communication systems, wherein the channel access pattern is generated as a function of a state of a numerical sequence generator for generating a numerical sequence or a number of a numerical sequence.

Further embodiments provide a communication system, wherein the communication system is configured to wirelessly communicate in a frequency band [e.g. a license-free and/or permission-free frequency band; e.g. the ISM bands] that is used for communication by a plurality of communication systems, wherein the communication system is configured to use different frequencies or frequency channels of the frequency band [e.g. into which the frequency band is divided] per portion [e.g. per time slot] for the communication on the basis of a channel access pattern, regardless of whether they are used by another communication system, wherein the channel access pattern differs from another channel access pattern on the basis of which at least one other communication system of the plurality of other communication systems accesses the frequency band.

In embodiments, the channel access pattern may indicate a frequency hop-based and/or time hop-based occupancy [e.g. of resources] of the frequency band [e.g. a temporal sequence of frequency resources (e.g. distributed across the frequency band) that are usable for the communication of the communication system] that is usable for the communication of the communication system.

In embodiments, the communication system may be configured to communicate uncoordinatedly with respect to the other communication systems in the frequency band.

In embodiments, the communication system may be configured to identify the channel access pattern.

In embodiments, the channel access pattern may depend on individual [e.g. intrinsic] information of the communication system.

In embodiments, the channel access pattern and the other channel access pattern may overlap in less than 20% of the resources specified therein.

In embodiments, participants of the communication system may transfer data amongst themselves per portion in the different channels of the frequency band on the basis of the channel access pattern.

In embodiments, a reception bandwidth of participants of the communication system may be narrower than a bandwidth of the frequency band.

Further embodiments provide a method for operating a communication system, wherein the communication system is configured to wirelessly communicate in a frequency band [e.g. a license-free and/or permission-free frequency band; e.g. the ISM bands] that is used for communication by a plurality of communication systems. The method includes a step of transferring data between participants of the communication system per portion in different channels of the frequency band on the basis of a channel access pattern, regardless of whether they or a subset thereof are used by another communication system, wherein the channel access pattern differs from another channel access pattern on the basis of which at least one other communication system of the plurality of other communication systems accesses the frequency band.

Further embodiments provide a communication arrangement having a first communication system, and a second communication system, wherein the first communication system and the second communication system are configured to wirelessly communicate in the same frequency band [e.g. in a license-free and/or permission-free frequency band; e.g. the ISM bands] [e.g. used for communication by a plurality of communication systems], wherein the first communication system is configured to use, by using a first channel access pattern, different channels of the frequency band [e.g. into which the frequency band is divided] per portion [e.g. per time slot] for the communication, regardless of whether they or a subset thereof are used by another communication system, wherein the second communication system is configured to use, by using a second channel access pattern, different channels of the frequency band [e.g. into which the frequency band is divided] per portion [e.g. per time slot] for the communication, regardless of whether they or a subset thereof are used by another communication system, wherein the first channel access pattern and the second channel access pattern are different.

In embodiments, the first communication system and the second communication system may be mutually not coordinated.

In embodiments, participants of the first communication system may transfer data amongst themselves on the basis of the first channel access pattern per portion in the different channels of the frequency band.

In embodiments, participants of the second communication system may transfer data amongst themselves on the basis of the second channel access pattern per portion in the different channels of the frequency band.

In embodiments, the first communication system and the second communication system may not communicate with each other.

Further embodiments provide a method for operating two communication systems in a frequency band that is used for wireless communication by a plurality of communication systems. The method includes a step of transferring data between participants of the first communication system on the basis of a first channel access pattern per portion in different channels of the frequency band, regardless of whether they or a subset thereof are used by another communication system. In addition, the method includes a step of transferring data between participants of the second communication system on the basis of a second channel access pattern per portion in different channels of the frequency band, regardless of whether they or a subset thereof are used by another communication system, wherein the first channel access pattern and the second channel access pattern are different.

Further embodiments provide a terminal point of a communication system, wherein the communication system wirelessly communicates in a frequency band [e.g. a license-free and/or permission-free frequency band; e.g. an ISM band] used for communication by a plurality of communication systems, wherein the terminal point is configured to receive a signal [e.g. a beacon signal], wherein the signal comprises information about a network-specific channel access pattern, wherein the network-specific channel access pattern indicates a frequency hop-based and/or time hop-based occupancy of resources of the frequency band that is usable for the communication of the communication system [e.g. a temporal sequence of frequency resources (e.g. distributed across the frequency band) usable for the communication of the communication system], wherein the terminal point is configured to transfer [e.g. to transmit or to receive] data by using a relative channel access pattern, wherein, from the usable frequency hop-based and/or time hop-based occupancy of resources of the network-specific channel access pattern, the relative channel access pattern indicates an occupancy of resources that is to be used for the transfer [e.g. the relative channel access pattern indicates which of the resources cleared or usable for the communication of the communication system by the network-specific channel access pattern is to be actually used for the transfer of data by the terminal point].

In embodiments, the occupancy of resources of the relative channel access pattern that is to be used for the transfer may be a subset of the usable frequency hop-based and/or time hop-based occupancy of resources of the network-specific channel access pattern [e.g. wherein the relative channel access pattern only comprises a subset of the resources of the network-specific channel access pattern].

In embodiments, the relative channel access pattern may differ from another relative channel access pattern based on which another participant [e.g. a terminal point and/or a base station; e.g. a base station at another participant] of the communication system transfers [e.g. transmits and/or receives] data, wherein the other relative channel access pattern indicates, from the usable frequency hop-based and/or time hop-based occupancy of resources of the network-specific channel access pattern, an occupancy of resources that is to be used for the transfer by the other participant.

In embodiments, the network-specific channel access pattern may indicate the frequency hop-based and/or time hop-based occupancy of resources of the frequency band, usable for the communication of the communication system, in frequency channels [e.g. into which the frequency band is divided] and associated time slots or in frequency channel indices and associated time slot indices.

In embodiments, the network-specific channel access pattern may indicate in the frequency direction [e.g. per time slot or time slot index] a plurality of adjacent or spaced apart resources [e.g. frequency channels or frequency channel indices] of the frequency band.

In embodiments, the relative channel access pattern may indicate in the frequency direction at the most a subset [e.g. at the most one resource, that is one or no resource] of the plurality of adjacent or spaced apart resources of the network-specific channel access pattern.

In embodiments, the relative channel access pattern may indicate for at least one time hop [e.g. for at least one time slot or time slot index] in the frequency direction a different resource of the plurality of adjacent or spaced apart resources of the network-specific channel access pattern than another relative channel access pattern based on which another participant [e.g. a terminal point and/or a base station; e.g. a base station at another participant] of the communication system transfers [e.g. transmits and/or receives] data, wherein the other relative channel access pattern indicates, from the usable frequency hop-based and/or time hop-based occupancy of resources of the network-specific channel access pattern, an occupancy of resources that is to be used for the transfer by the other participant.

In embodiments, different symbol rates and/or different numbers of symbols may be allocated in the frequency direction to at least two resources [e.g. frequency channels or frequency channel indices] of the plurality of adjacent or spaced apart resources.

In embodiments, the plurality of adjacent resources may form in the frequency direction a block [e.g. a cluster] of connected resources, wherein different symbol rates and/or different numbers of symbols are allocated to different parts of the block of connected resources.

In embodiments, the terminal point may be configured to select the relative channel access pattern from a set [e.g. a supply] of M relative channel access patterns, wherein the M relative channel access patterns indicate, from the usable frequency hop-based and/or time hop-based occupancy of resources of the network-specific channel access pattern, an occupancy of resources that is to be used for the transfer, wherein the M relative channel access patterns are different [e.g. different at least in the occupancy of one resource].

In embodiments, the terminal point may be configured to randomly select the relative channel access pattern from the set of M relative channel access patterns.

In embodiments, the terminal point may be configured to select the relative channel access pattern from the set of M relative channel access patterns on the basis of an intrinsic parameter.

In embodiments, the intrinsic parameter may be a digital signature of the telegram [e.g. a CMAC (One-key MAC)] or a code word for the detection of transfer errors [e.g. a CRC].

In embodiments, the terminal point may be configured to select, from a set of relative channel access patterns with different transfer characteristics [e.g. different latency, or different robustness against interferences], the relative channel access pattern as a function of requirements of the data to be transferred with respect to transmission characteristics [e.g. latency, or robustness against interferences].

In embodiments, the terminal point may be configured to transfer [e.g. to transmit or to receive], according to the relative channel access pattern, as data a data packet divided into a plurality of sub-data packets, wherein the plurality of sub-data packets each comprises only a part of the data packet.

In embodiments, the information may describe a state of a numerical sequence generator [e.g. a periodic numerical sequence generator or a deterministic numerical sequence generator] for generating a numerical sequence, wherein the numerical sequence determines the channel access pattern.

In embodiments, the information may describe a number [e.g. a time slot index and/or a beacon index] of a numerical sequence [e.g. a periodic time slot index sequence and/or a periodic beacon index sequence], wherein the numerical sequence determines the channel access pattern.

Further embodiments provide a base station of a communication system, wherein the communication system wirelessly communicates in a frequency band [e.g. a license-free and/or permission-free frequency band; e.g. an ISM band] used for communication by a plurality of communication systems, wherein the base station is configured to transmit a signal [e.g. a beacon signal], wherein the signal comprises information about a network-specific channel access pattern, wherein the network-specific channel access pattern indicates a frequency hop-based and/or time hop-based occupancy of resources of the frequency band that is usable for the communication of the communication system [e.g. a temporal sequence of frequency resources (e.g. distributed across the frequency band) usable for the communication of the communication system], wherein the base station is configured to transfer [e.g. to transmit or to receive] data by using a relative channel access pattern, wherein the relative channel access pattern indicates, from the usable frequency hop-based and/or time hop-based occupancy of resources of the network-specific channel access pattern, an occupancy of resources that is to be used for the transfer [e.g. the relative channel access pattern indicates which of the resources cleared or usable for the communication of the communication system by the network-specific channel access pattern is to be actually used for the transfer of data by the base station].

In embodiments, the occupancy of resources of the relative channel access pattern that is to be used for the transfer may be a subset of the usable frequency hop-based and/or time hop-based occupancy of resources of the network-specific channel access pattern [e.g. wherein the relative channel access pattern only comprises a subset of the resources of the network-specific channel access pattern].

In embodiments, the base station does not know in advance which relative hopping pattern is used by a terminal point.

In embodiments, the base station may be configured to identify the relative hopping pattern used by means of detection [e.g. by a correlation and a threshold value decision].

In embodiments, the relative channel access pattern may differ from another relative channel access pattern based on which the base station transfers [e.g. transmits and/or receives, e.g. transmits to another participant or receives from another participant] other data, wherein the other relative channel access pattern indicates, from the usable frequency hop-based and/or time hop-based occupancy of resources of the network-specific channel access pattern, an occupancy of resources that is to be used for the transfer.

In embodiments, the network-specific channel access pattern may indicate the frequency hop-based and/or time hop-based occupancy of resources of the frequency band to be used for the communication of the communication system in frequency channels [e.g. into which the frequency band is divided] and associated time slots or in frequency channel indices and associated time slot indices.

In embodiments, the network-specific channel access pattern may indicate in the frequency direction [e.g. per time slot or time slot index] a plurality of adjacent or spaced apart resources [e.g. frequency channels or frequency channel indices] of the frequency band.

In embodiments, the relative channel access pattern may indicate in the frequency direction at the most a subset [e.g. at the most one resource, that is one or no resource] of the plurality of adjacent or spaced apart resources of the network-specific channel access pattern.

In embodiments, the relative channel access pattern may indicate for at least one time hop [e.g. for at least one time slot or time slot index] in the frequency direction a different resource of the plurality of adjacent or spaced apart resources of the network-specific channel access pattern than another relative channel access pattern based on which the base station transfers [e.g. transmits and/or receives, e.g. transmits to another participant or receives from another participant] other data, wherein the other relative channel access pattern indicates, from the usable frequency hop-based and/or time hop-based occupancy of resources of the network-specific channel access pattern, an occupancy of resources that is to be used for the transfer.

In embodiments, different symbol rates and/or a different number of symbols may be allocated in the frequency direction to at least two resources [e.g. frequency channels or frequency channel indices] of the plurality of adjacent or spaced apart resources.

In embodiments, the plurality of adjacent resources may form in the frequency direction a block [e.g. a cluster] of connected resources, wherein different symbol rates and/or different numbers of symbols are allocated to different parts of the block of connected resources.

In embodiments, the base station may be configured to select the relative channel access pattern from a set [e.g. a supply] of M relative channel access patterns, wherein the M relative channel access patterns indicate, from the usable frequency hop-based and/or time hop-based occupancy of resources of the network-specific channel access pattern, an occupancy of resources that is to be used for the transfer, wherein the M relative channel access patterns are different [e.g. different at least in the occupancy of one resource].

In embodiments, the base station may be configured to randomly select the relative channel access pattern from the set of M relative channel access patterns.

In embodiments, the base station may be configured to select the relative channel access pattern from the set of M relative channel access patterns on the basis of an intrinsic parameter.

In embodiments, the intrinsic parameter may be a digital signature of the telegram [e.g. a CMAC (One-key MAC)] or a code word for the detection of transfer errors [e.g. a CRC].

In embodiments, the base station may be configured to select, from a set of relative channel access patterns with different transfer characteristics [e.g. a different latency, or a different robustness against interferences], the relative channel access pattern as a function of requirements of the data to be transferred with respect to transmission characteristics [e.g. latency, or robustness against interferences].

In embodiments, the base station may be configured to generate the relative channel access pattern as a function of requirements of the data to be transferred with respect to transfer characteristics [e.g. latency, or robustness against interferences].

In embodiments, the base station may be configured to transfer [e.g. to transmit or to receive], according to the relative channel access pattern, as data a data packet divided into a plurality of sub-data packets, wherein the plurality of sub-data packets each comprises only a part of the data packet.

In embodiments, the information may describe a state of a numerical sequence generator [e.g. a periodic numerical sequence generator or a deterministic numerical sequence generator] for generating a numerical sequence, wherein the numerical sequence determines the channel access pattern.

In embodiments, the information may describe a number [e.g. a time slot index and/or a beacon index] of a numerical sequence [e.g. a periodic time slot index sequence and/or a periodic beacon index sequence], wherein the numerical sequence determines the channel access pattern.

Further embodiments provide a communication system with at least one of the above-described terminal points and one of the above-described base stations.

Further embodiments provide a method for operating a terminal point of a communication system, wherein the communication system wirelessly communicates in a frequency band [e.g. a license-free and/or permission-free frequency band; e.g. an ISM band] used for communication by a plurality of communication systems. The method includes a step of receiving a signal [e.g. a beacon signal], wherein the signal comprises information about a network-specific channel access pattern, wherein the network-specific channel access pattern indicates a frequency hop-based and/or time hop-based occupancy of resources of the frequency band that is usable for the communication of the communication system [e.g. a temporal sequence of frequency resources (e.g. distributed across the frequency band) usable for the communication of the communication system]. The method further includes a step of transferring data by using a relative channel access pattern, wherein the relative channel access pattern indicates, from the usable frequency hop-based and/or time hop-based occupancy of resources of the network-specific channel access pattern, an occupancy of resources that is to be used for the transfer [e.g. the relative channel access pattern indicates which of the resources cleared or usable for the communication of the communication system by the network-specific channel access pattern is to be actually used for the transfer of data by the terminal point].

Further embodiments provide a method for operating a base station of a communication system, wherein the communication system wirelessly communicates in a frequency band [e.g. a license-free and/or permission-free frequency band; e.g. an ISM band] used for communication by a plurality of communication systems. The method includes a step of transmitting a signal [e.g. a beacon signal], wherein the signal comprises information about a network-specific channel access pattern, wherein the network-specific channel access pattern indicates a frequency hop-based and/or time hop-based occupancy of resources of the frequency band that is usable for the communication of the communication system [e.g. a temporal sequence of frequency resources (e.g. distributed across the frequency band) usable for the communication of the communication system]. The method further includes a step of transferring data by using a relative channel access pattern, wherein the relative channel access pattern indicates, from the usable frequency hop-based and/or time hop-based occupancy of resources of the network-specific channel access pattern, an occupancy of resources that is to be used for the transfer [e.g. the relative channel access pattern indicates which of the resources cleared or usable for the communication of the communication system by the network-specific channel access pattern is to be actually used for the transfer of data by the base station].

Further embodiments provide a controller for a participant of a communication system, wherein the communication system wirelessly communicates in a frequency band used for communication by a plurality of communication systems, wherein the controller is configured to identify a network-specific channel access pattern, wherein the network-specific channel access pattern indicates a frequency hop-based and/or time hop-based occupancy of resources of the frequency band that is usable for the communication of the communication system, wherein the controller is configured to identify a relative channel access pattern, wherein the relative channel access pattern indicates, from the usable frequency hop-based and/or time hop-based occupancy of resources of the network-specific channel access pattern, an occupancy of resources that is to be used for the transfer of data of the participant.

In embodiments, the occupancy of resources of the relative channel access pattern that is to be used for the transfer may be a subset of the usable frequency hop-based and/or time hop-based occupancy of resources of the network-specific channel access pattern [e.g. wherein the relative channel access pattern only comprises a subset of the resources of the network-specific channel access pattern].

In embodiments, the relative channel access pattern may differ from another relative channel access pattern based on which the participant transfers [e.g. transmits and/or receives] other data or based on which another participant [e.g. an end point and/or a base station] of the communication system transfers [e.g. transmits and/or receives] data, wherein the other relative channel access pattern indicates, from the usable frequency hop-based and/or time hop-based occupancy of resources of the network-specific channel access pattern, an occupancy of resources that is to be used for the transfer.

In embodiments, the network-specific channel access pattern may indicate the frequency hop-based and/or time hop-based occupancy of resources of the frequency band to be used for the communication of the communication system in frequency channels [e.g. into which the frequency band is divided] and associated time slots or in frequency channel indices and associated time slot indices.

In embodiments, the network-specific channel access pattern may indicate in the frequency direction [e.g. per time slot or time slot index] a plurality of adjacent or spaced apart resources [e.g. frequency channels or frequency channel indices] of the frequency band.

In embodiments, the relative channel access pattern may indicate in the frequency direction at the most a subset [e.g. at the most one resource, that is one or no resource] of the plurality of adjacent or spaced apart resources of the network-specific channel access pattern.

In embodiments, the relative channel access pattern may indicate in the frequency direction a different resource of the plurality of adjacent or spaced apart resources of the network-specific channel access pattern than another relative channel access pattern based on which the participant transfers [e.g. transmits and/or receives] other data or based on which another participant [e.g. an end point and/or a base station] of the communication system transfers [e.g. transmits and/or receives] data, wherein the other relative channel access pattern indicates, from the usable frequency hop-based and/or time hop-based occupancy of resources of the network-specific channel access pattern, an occupancy of resources that is to be used for the transfer.

In embodiments, different symbol rates and/or a different number of symbols may be allocated in the frequency direction to at least two resources [e.g. frequency channels or frequency channel indices] of the plurality of adjacent or spaced apart resources.

In embodiments, the plurality of adjacent resources may form in the frequency direction a block [e.g. a cluster] of connected resources, wherein different symbol rates and/or different numbers of symbols are allocated to different parts of the block of connected resources.

In embodiments, the controller may be configured to select the relative channel access pattern as a function of requirements of the data to be transferred with respect to transfer characteristics [e.g. latency, or robustness against interferences] from a set of relative channel access patterns with different transfer characteristics [e.g. different latency, or different robustness against interferences]

In embodiments, the controller may be configured to generate the relative channel access pattern as a function of requirements of the data to be transferred with respect to transfer characteristics [e.g. latency, or robustness against interferences].

In embodiments, the controller may be configured to pseudo-randomly identify the channel access pattern as a function of a state of a numerical sequence generator for generating a numerical sequence or a number of a numerical sequence.

In embodiments, the controller may be configured to identify the channel access pattern as a function of the state of the numerical sequence generator or a number of the numerical sequence derived from the state of the numerical sequence generator.

In embodiments, states of the numerical sequence generator [e.g. immediately] following the state of the numerical sequence generator are identifiable on the basis of the state of the numerical sequence generator, wherein the controller may be configured to identify the channel access pattern as a function of the following states of the numerical sequence generator or following numbers of the numerical sequence derived therefrom.

In embodiments, the controller may be configured to identify the channel access pattern as a function of individual information of the communication system [e.g. intrinsic information of the communication system such as a network-specific identifier].

In embodiments, the controller may be configured to map, by using a mapping function:
the state of the numerical sequence generator, or a number of the numerical sequence derived from the state of the numerical sequence generator, or the number of the numerical sequence, and
the individual information of the communication system onto time information and frequency information, wherein the time information and the frequency information describe a resource of the channel access pattern.

In embodiments, the controller may be configured to identify a pseudo random number R as a function of:
the state of the numerical sequence generator, or a number of the numerical sequence derived from the state of the numerical sequence generator, or the number of the numerical sequence, and
individual information of the communication system, wherein the pseudo random number R determines the channel access pattern.

In embodiments, the controller may be configured to identify a resource [e.g. a frequency channel and/or a time slot, or a frequency channel index and/or a time slot index] of the channel access pattern on the basis of the pseudo random number R.

Further embodiments provide a method for operating a participant of a communication system, wherein the communication system wirelessly communicates in a frequency band used for communication by a plurality of communication systems. The method includes a step of determining a network-specific channel access pattern, wherein the network-specific channel access pattern indicates a frequency hop-based and/or time hop-based occupancy of resources of the frequency band that is usable for the communication of the communication system. The method further includes a step of determining a relative channel access pattern, wherein the relative channel access pattern indicates, from the usable frequency hop-based and/or time hop-based occupancy of resources of the network-specific channel access pattern, an occupancy of resources that is to be used for the transfer of data of the participant.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described within the context of or as a method step also represent a description of a corresponding block or detail or feature of a corresponding device. Some or all of the method steps may be performed while using a hardware device, such as a microprocessor, a programmable computer or an electronic circuit. In some embodiments, some or several of the most important method steps may be performed by such a device.

Depending on specific implementation requirements, embodiments of the invention may be implemented in hardware or in software. Implementation may be effected while using a digital storage medium, for example a floppy disc, a DVD, a Blu-ray disc, a CD, a ROM, a PROM, an EPROM, an EEPROM or a FLASH memory, a hard disc or any other magnetic or optical memory which has electronically readable control signals stored thereon which may cooperate, or cooperate, with a programmable computer system such that the respective method is performed. This is why the digital storage medium may be computer-readable.

Some embodiments in accordance with the invention thus comprise a data carrier which comprises electronically readable control signals that are capable of cooperating with a programmable computer system such that any of the methods described herein is performed.

Generally, embodiments of the present invention may be implemented as a computer program product having a program code, the program code being effective to perform any of the methods when the computer program product runs on a computer.

The program code may also be stored on a machine-readable carrier, for example.

Other embodiments include the computer program for performing any of the methods described herein, said computer program being stored on a machine-readable carrier.

In other words, an embodiment of the inventive method thus is a computer program which has a program code for performing any of the methods described herein, when the computer program runs on a computer.

A further embodiment of the inventive methods thus is a data carrier (or a digital storage medium or a computer-readable medium) on which the computer program for performing any of the methods described herein is recorded. The data carrier, the digital storage medium, or the recorded medium are typically tangible, or non-volatile.

A further embodiment of the inventive method thus is a data stream or a sequence of signals representing the computer program for performing any of the methods described herein.

The data stream or the sequence of signals may be configured, for example, to be transmitted via a data communication link, for example via the internet.

A further embodiment includes a processing unit, for example a computer or a programmable logic device, configured or adapted to perform any of the methods described herein.

A further embodiment includes a computer on which the computer program for performing any of the methods described herein is installed.

A further embodiment in accordance with the invention includes a device or a system configured to transmit a computer program for performing at least one of the methods described herein to a receiver. The transmission may be electronic or optical, for example. The receiver may be a computer, a mobile device, a memory device or a similar device, for example. The device or the system may include a file server for transmitting the computer program to the receiver, for example.

In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device. Said hardware device may be any universally applicable hardware such as a computer processor (CPU), or may be a hardware specific to the method, such as an ASIC.

For example, the apparatuses described herein may be implemented using a hardware device, or using a computer, or using a combination of a hardware device and a computer.

The apparatuses described herein, or any components of the apparatuses described herein, may at least be partially implement in hardware and/or software (computer program).

For example, the methods described herein may be implemented using a hardware device, or using a computer, or using a combination of a hardware device and a computer.

The methods described herein, or any components of the methods described herein, may at least be partially implement by performed and/or software (computer program).

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A terminal point of a communication system, the terminal point comprising a receiver,
    wherein the receiver is configured to receive a reference signal, wherein the reference signal comprises information on a control signal, wherein the control signal is emitted in the communication system for coordinating the participants of the communication system, the control signal being transferred distributed in correspondence with a frequency hop-based occupancy of resources of a frequency band, indicated by a control signal hopping pattern,
    wherein a receive bandwidth of the receiver is smaller by at least a factor 3 than a bandwidth of the frequency hop-based occupancy of resources of the frequency band, indicated by the control signal hopping pattern;
    wherein the receiver is configured to receive the control signal based on the information on the control signal,
    wherein the information on the control signal, which comprise the reference signal, comprise information on the control signal hopping pattern or information on the resources of the frequency band usable by the communication system for transferring the control signal,
    wherein the reference signal is transferred in a predetermined frequency range of the frequency band,
    wherein the reference signal comprises a plurality of partial reference data packets which comprise the information on the control signal, wherein the reference signal is transferred in correspondence with a reference signal hopping pattern, wherein the reference signal hopping pattern indicates a frequency hop and/or time hop-based occupancy of resources of the predetermined frequency range, and
    wherein the receiver is configured to receive the reference signal in correspondence with the reference signal hopping pattern to acquire at least a part of the plurality of partial reference data packets sufficient for decoding.

2. The terminal point in accordance with claim 1,
    wherein a reference data packet, which comprises the information on the control signal, is split into the plurality of partial reference data packets so that each of the partial reference data packets comprises only a part of the reference data packet.

3. The terminal point in accordance with claim 2,
    wherein the predetermined frequency range is predetermined fixedly and known to the terminal point.

4. The terminal point in accordance with claim 2,
    wherein the predetermined frequency range comprises at least one frequency channel of the frequency band,
    or wherein the predetermined frequency range comprises a plurality of frequency channels, wherein at least two frequency channels of the plurality of frequency channels are spaced apart from one another at most to such an extent that the at least two frequency channels are within a frequency bandwidth which corresponds to the receive bandwidth of the receiver.

5. The terminal point in accordance with claim 4,
    wherein a reference data packet, which comprises the information on the control signal is split into the plurality of partial reference data packets such that each of the plurality of partial reference data packets comprises only a part of the reference data packet,
    wherein the plurality of partial reference data packets is channel-encoded such that only a subset of the plurality of partial reference data packets is required for successfully decoding the reference data packet, and
    wherein the terminal point is configured to receive and decode at least a part of the plurality of partial reference data packets to acquire the reference data packet comprising the information on the control signal.

6. The terminal point in accordance with claim 5,
    wherein the predetermined frequency range comprises one or more partial frequency ranges, and wherein the predetermined frequency range is broader than the receive bandwidth of the receiver of the terminal point, and
    wherein at least as many of the plurality of partial reference data packets are transferred per partial frequency range within the predetermined frequency range in correspondence with the reference signal hopping pattern as are required for successfully decoding the reference data packet, wherein each of the one or more partial frequency ranges corresponds to the receive bandwidth of the receiver of the terminal point.

7. The terminal point in accordance with claim 1, wherein a receive bandwidth of the receiver is smaller by at least a factor 5 than a bandwidth of the frequency hop-based occupancy of resources of the frequency band, indicated by the control signal hopping pattern, or wherein a receive bandwidth of the receiver is smaller by at least a factor 10 than a bandwidth of the frequency hop-based occupancy of resources of the frequency band, indicated by the control signal hopping pattern.

8. The terminal point in accordance with claim 1, wherein the terminal point is configured to switch a receive frequency of the receiver of the terminal point to the respective resources of the frequency band, indicated by the control signal hopping pattern, based on the control signal hopping pattern to receive the control signal.

9. The terminal point in accordance with claim 1, wherein the information on the control signal comprise information on the time and frequency position of the control signal relative to the reference signal.

10. The terminal point in accordance with claim 1, wherein the terminal point is configured to synchronize a timer and/or frequency generator of the terminal point to the reference signal.

11. The terminal point in accordance with claim 1, wherein the reference signal and the control signal are temporally mutually synchronized.

12. The terminal point in accordance with claim 1, wherein the receiver of the terminal point comprises a receive bandwidth which corresponds to a bandwidth of two to ten directly adjacent frequency channels which the frequency band is divided into.

13. The terminal point in accordance with claim 12, wherein the receiver of the terminal point comprises a receive bandwidth which corresponds to a bandwidth of two to four directly adjacent frequency channels which the frequency band is divided into.

14. The terminal point in accordance with claim 1, wherein the receiver of the terminal point comprises a receive bandwidth of 250 kHz or less.

15. The terminal point in accordance with claim 14, herein the receiver of the terminal point comprises a receive bandwidth of 100 kHz or less.

16. The terminal point in accordance with claim 1, wherein the terminal point is battery-operated.

17. The terminal point in accordance with claim 1, wherein the reference signal is emitted in predetermined distances, and
wherein the reference signal is emitted alternatingly in at least two predetermined partial frequency ranges of the predetermined frequency range known to the terminal point.

18. The terminal point in accordance with claim 17, wherein the at least two predetermined partial frequency ranges are spaced apart from one another in frequency to such an extent that inadvertent synchronization, due to a frequency offset, to the respective other predetermined partial frequency range is not possible.

19. The terminal point in accordance with claim 1, wherein the reference signal is transferred in correspondence with the reference signal hopping pattern, wherein the reference signal hopping pattern indicates the frequency hop and/or time hop-based occupancy of resources of the predetermined frequency range,
wherein the resources of the predetermined frequency range are defined by frequency channels, and
wherein at least two adjacent frequency channels of the frequency channels occupied in correspondence with the reference signal hopping pattern are spaced apart from one another in frequency to such an extent that these do not overlap, not even with a frequency offset.

20. The terminal point in accordance with claim 1, wherein the reference signal is transferred in correspondence with the reference signal hopping pattern, wherein the reference signal hopping pattern indicates the frequency hop and/or time hop-based occupancy of resources of the predetermined frequency range, and
wherein an occupancy of resources indicated by the reference signal hopping pattern does not comprise any repetitive identical distances between the resources in time and/or frequency.

21. The terminal point in accordance with claim 1, wherein the reference signal comprises the plurality of partial reference data packets,
wherein at least two of the plurality of partial reference data packets comprise information known to the terminal point, and
wherein the terminal point is configured to perform synchronization based on the known information.

22. The terminal point in accordance with claim 21, wherein the at least two of the plurality of partial reference data packets comprise partial synchronization sequences which are known to the terminal point, and
wherein the terminal point is configured to perform synchronization based on the partial synchronization sequences and the known information.

23. The terminal point in accordance with claim 22, wherein, within the at least two of the plurality of partial reference data packets, the respective partial synchronization sequence and the respective known information form virtual synchronization sequences, and
wherein the terminal point is configured to perform synchronization based on the virtual synchronization sequences of the at least two of the plurality of partial reference data packets.

24. The terminal point in accordance with claim 22, wherein, within the at least two of the plurality of partial reference data packets, the respective partial synchronization sequence and the respective known information comprise a predetermined mutual distance.

25. The terminal point in accordance with claim 1, wherein the communication system communicates wirelessly in the frequency band which is used for communication by a plurality of communication systems.

26. The terminal point in accordance with claim 1, wherein the control signal and/or the reference signal comprise information on a network-specific channel access pattern, wherein the network-specific channel access pattern indicates a frequency hop and/or time hop-based occupancy of resources of the frequency band, usable for communication of the communication system.

27. The terminal point in accordance with claim 1, wherein the information on the control signal comprise information on a network-specific channel access pattern, wherein the network-specific channel access pattern indicates a frequency hop and/or time hop-based occupancy of resources of the frequency band, usable for communication of the communication system,
wherein the control signal hopping pattern is a relative channel access pattern, and wherein the control signal is transferred in correspondence with the relative channel access pattern in at least a subset of the resources of the frequency band indicated by the network-specific channel access pattern.

28. The terminal point in accordance with claim 27,
wherein the control signal is transferred in correspondence with the relative channel access pattern in the first resources of the resources of the frequency band indicated by the network-specific channel access pattern.

29. The terminal point in accordance with claim 27,
wherein the terminal point is configured to split a data packet ready for transmission into a plurality of sub-data packets which are each shorter than the data packet, and to transmit a data signal which comprises the plurality of sub-data packets, in correspondence with the relative channel access pattern in a subset of the usable frequency hop and/or time hop-based occupancy of resources of the frequency band, indicated by the network-specific channel access pattern.

30. The communication system comprising:
the terminal point in accordance with claim 1; and
a base station comprising a transmitter,
wherein the transmitter is configured to transmit the control signal for coordinating the participants of the communication system, wherein the control signal is transferred distributed in correspondence with the frequency hop-based occupancy of resources of the frequency band, indicated by the control signal hopping pattern,
wherein the transmitter is configured to transmit the reference signal in the predetermined frequency range of the frequency band, wherein the reference signal comprises the information on the control signal,
wherein the predetermined frequency range is smaller by at least the factor 3 than the frequency range of the frequency band in which the control signal is transferred distributed in correspondence with the control signal hopping pattern,
wherein the information on the control signal, which comprise the reference signal, comprise the information on the control signal hopping pattern or information on the resources of the frequency band usable by the communication system for transferring the control signal,
wherein the transmitter is configured to provide the reference signal with the plurality of partial reference data packets which comprise the information on the control signal, and
herein the transmitter is configured to transmit the reference signal in correspondence with the reference signal hopping pattern, wherein the reference signal hopping pattern indicates the frequency hop and/or time hop-based occupancy of resources of the predetermined frequency range.

31. A base station of a communication system, the base station comprising a transmitter,
wherein the transmitter is configured to transmit a control signal for coordinating the participants of the communication system, wherein the control signal is transferred distributed in correspondence with a frequency hop-based occupancy of resources of a frequency band, indicated by a control signal hopping pattern,
wherein the transmitter is configured to transmit a reference signal in a predetermined frequency range of the frequency band, wherein the reference signal comprises information on the control signal,
wherein the predetermined frequency range is smaller by at least a factor 3 than a frequency range of the frequency band in which the control signal is transferred distributed in correspondence with the control signal hopping pattern,
wherein the information on the control signal, which comprise the reference signal, comprise information on the control signal hopping pattern or information on the resources of the frequency band usable by the communication system for transferring the control signal,
wherein the transmitter is configured to provide the reference signal with a plurality of partial reference data packets which comprise the information on the control signal, and
wherein the transmitter is configured to transmit the reference signal in correspondence with a reference signal hopping pattern, wherein the reference signal hopping pattern indicates a frequency hop and/or time hop-based occupancy of resources of the predetermined frequency range.

32. The base station in accordance with claim 31,
wherein a reference data packet, which comprises the information on the control signal, is split into the plurality of partial reference data packets so that each of the plurality of partial reference data packets comprises only a part of the reference data packet.

33. The base station in accordance with claim 31,
wherein the base station is configured to transmit the reference signal in the predetermined frequency range of the frequency band.

34. The base station in accordance with claim 33,
wherein the predetermined frequency range is adjusted to a receive bandwidth of a receiver of a terminal point, and
wherein the frequency range of the frequency band in which the control signal is transferred distributed in correspondence with the control signal hopping pattern is greater by a factor 3 than the predetermined frequency range.

35. The base station in accordance with claim 33,
wherein the predetermined frequency range comprises at least one frequency channel of the frequency band,
or wherein the predetermined frequency range comprises a plurality of frequency channels, wherein at least two frequency channels of the plurality of frequency channels are spaced apart from one another at most to such an extent that the at least two frequency channels are within a frequency bandwidth which corresponds to a receive bandwidth of a receiver of a terminal point of the communication system.

36. The base station in accordance with claim 31,
wherein the information on the control signal comprise information on a time and frequency position of the control signal relative to the reference signal.

37. The base station in accordance with claim 31,
wherein the transmitter is configured to transmit the reference signal and the control signal in a temporally mutually synchronized manner.

38. The base station in accordance with claim 31,
wherein the transmitter is configured to split a reference data packet comprising the information on the control signal into the plurality of partial reference data packets so that each of the plurality of partial reference data packets comprises only a part of the reference data packet, and
wherein the plurality of partial reference data packets are channel-encoded so that only a subset of the plurality of partial reference data packets is required for successfully decoding the reference data packet.

39. The base station in accordance with claim 38,
wherein the predetermined frequency range comprises one or more partial frequency ranges, and wherein the predetermined frequency range is broader than a receive bandwidth of a receiver of a terminal point of the communication system, and
wherein the transmitter is configured to transmit at least as many of the plurality of partial reference data packets per partial frequency range within the predetermined frequency range in correspondence with the reference signal hopping pattern as are required for successfully decoding the reference data packet, wherein each of the one or more partial frequency ranges corresponds to the receive bandwidth of the receiver of the terminal point.

40. The base station in accordance with claim 31,
wherein the transmitter is configured to transmit the reference signal in predetermined distances, and
wherein the transmitter is configured to transmit the reference signal alternatingly in at least two predetermined partial frequency ranges of the predetermined frequency range known to a terminal point.

41. The base station in accordance with claim 40,
wherein the at least two predetermined partial frequency ranges are spaced apart from one another in frequency to such an extent that an inadvertent synchronization, due to a frequency offset, to the respective other predetermined partial frequency range is not possible.

42. The base station in accordance with claim 31,
wherein the reference signal is transferred in correspondence with the reference signal hopping pattern, wherein the reference signal hopping pattern indicates the frequency hop and/or time hop-based occupancy of resources of the predetermined frequency range,
wherein the resources of the predetermined frequency range are defined by frequency channels, and
wherein at least two adjacent frequency channels of the frequency channels occupied in correspondence with the reference signal hopping pattern are spaced apart from one another in frequency to such an extent that these do not overlap, not even with a frequency offset.

43. The base station in accordance with claim 31,
wherein the reference signal is transferred in correspondence with the reference signal hopping pattern, wherein the reference signal hopping pattern indicates the frequency hop and/or time hop-based occupancy of resources of the predetermined frequency range, and
wherein an occupancy of resources indicated by the reference signal hopping pattern does not comprise any repetitive identical distances between the resources in time and/or frequency.

44. The base station in accordance with claim 31,
wherein the transmitter is configured to transmit the reference signal in predetermined distances, and
wherein the transmitter is configured to adjust a distance between at least two successive emissions of the reference signal dynamically to a number of new terminal points to be registered, or wherein the transmitter is configured to additionally transmit the reference signal responsive to an external event.

45. The base station in accordance with claim 31,
wherein the transmitter is configured to provide the reference signal with the plurality of partial reference data packets, and
wherein the transmitter is configured to adjust a number of the plurality of partial reference data packets which the reference signal is provided with, dynamically to a number of new terminal points to be registered.

46. The base station in accordance with claim 45,
wherein the transmitter is configured to distribute the plurality of partial reference data packets to different frequency channels of the predetermined frequency range in correspondence with the reference signal hopping pattern, and
wherein the transmitter is configured to adjust a number of different frequency channels of the predetermined frequency range which the plurality of partial reference data packets is distributed to, dynamically to the number of new terminal points to be registered.

47. The base station in accordance with claim 31,
wherein the transmitter is configured to emit the reference signal repeatedly,
wherein the transmitter is configured to provide the reference signal with the plurality of partial reference data packets, and
wherein the transmitter is configured to temporally interleave the plurality of partial reference data packets of at least two emissions of the reference signal in correspondence with respective reference signal hopping patterns.

48. The base station in accordance with claim 47,
wherein the respective reference signal hopping patterns are versions of one another mutually shifted in time and frequency.

49. The base station in accordance with claim 47,
wherein a temporal distance between the plurality of partial reference data packets of the respective reference signal hopping patterns corresponds to the number of repetitions.

50. The base station in accordance with claim 31,
wherein the transmitter is configured to provide the reference signal with the plurality of partial reference data packets, and
wherein at least two of the plurality of partial reference data packets comprise data known to a terminal point.

51. The base station in accordance claim 50,
wherein the at least two of the plurality of partial reference data packets comprise partial synchronization sequences which are known to the terminal point.

52. The base station in accordance with claim 51,
wherein, within the at least two of the plurality of partial reference data packets, the respective partial synchronization sequence and the respective known data form virtual synchronization sequences.

53. The base station in accordance with claim 51,
wherein, within the at least two of the plurality of partial reference data packets, the respective partial synchronization sequence and the respective known data comprise a predetermined mutual distance.

54. The base station in accordance with claim 51,
wherein the transmitter is configured to split the data known to the terminal point in an interleaved manner to the at least two of the plurality of partial reference data packets so that each of the at least two of the plurality of partial reference data packets comprises a part of the known data.

55. The base station in accordance with claim 31,
wherein the transmitter is configured to provide the reference signal with the plurality of partial reference data packets, and
wherein the transmitter is configured to adjust a number of the plurality of partial reference data packets to an error protection code used for the control signal.

56. The base station in accordance with claim 55, wherein the transmitter is configured to provide the reference signal and the control signal with the same error protection code or with error protection codes of comparable performance.

57. The base station in accordance with claim 55, wherein the plurality of partial reference data packets are symbol-identical.

58. The base station in accordance with claim 31, wherein the communication system communicates wirelessly in the frequency band which is used for communication by a plurality of communication systems.

59. The base station in accordance with claim 31, wherein the control signal or the reference signal comprises information on a network-specific channel access pattern, wherein the network-specific channel access pattern indicates a frequency hop and/or time hop-based occupancy of resources of the frequency band usable for communication of the communication system.

60. The base station in accordance with claim 31, wherein the communication system communicates based on a network-specific channel access pattern, wherein the network-specific channel access pattern indicates a frequency hop and/or time hop-based occupancy of resources of the frequency band usable for communication of the communication system, wherein the control signal hopping pattern is a relative channel access pattern, and wherein the transmitter is configured to transmit the control signal in correspondence with the relative channel access pattern in at least a subset of the resources of the frequency band indicated by the network-specific channel access pattern.

61. The base station in accordance with claim 60, wherein the transmitter is configured to transmit the control signal in correspondence with the relative channel access pattern in a first resources of the resources of the frequency band indicated by the network specific channel access pattern.

62. The base station in accordance with claim 31, wherein the frequency range of the frequency band in which the control signal is transferred distributed in correspondence with the control signal hopping pattern is greater by a factor 5 than the predetermined frequency range.

63. The base station in accordance with claim 31, wherein the frequency range of the frequency band in which the control signal is transferred distributed in correspondence with the control signal hopping pattern is greater by a factor 10 than the predetermined frequency range.

64. A method for operating a terminal point of a communication system, wherein a control signal is emitted in the communication system for coordinating the participants of the communication system, wherein the control signal is transferred distributed in correspondence with a frequency hop-based occupancy of resources of a frequency band, indicated by a control signal hopping pattern, wherein the terminal point comprises a receiver, wherein a receive bandwidth of the receiver is smaller by at least a factor 3 than a bandwidth of the frequency hop-based occupancy of resources of the frequency band, indicated by the control signal hopping pattern, the method comprising:
receiving a reference signal, wherein the reference signal comprises information on the control signal, and
receiving the control signal based on the information on the control signal,
wherein the information on the control signal, which comprise the reference signal, comprise information on the control signal hopping pattern or information on the resources of the frequency band usable by the communication system for transferring the control signal,
wherein the reference signal is transferred in a predetermined frequency range of the frequency band,
wherein the reference signal comprises a plurality of partial reference data packets which comprise the information on the control signal, wherein the reference signal is transferred in correspondence with a reference signal hopping pattern, wherein the reference signal hopping pattern indicates a frequency hop and/or time hop-based occupancy of resources of the predetermined frequency range, and
wherein the reference signal is received in correspondence with the reference signal hopping pattern to acquire at least a part of the plurality of partial reference data packets sufficient for decoding.

65. A method for operating a base station of a communication system, the method comprising:
transmitting a control signal for coordinating the participants of the communication system, wherein the control signal is transferred distributed in correspondence with a frequency hop-based occupancy of resources of a frequency band, indicated by a control signal hopping pattern, and
transmitting a reference signal in a predetermined frequency range of the frequency band, wherein the reference signal comprises information on the control signal,
wherein the predetermined frequency range is smaller by at least a factor 3 than a frequency range of the frequency band in which the control signal is transferred distributed in correspondence with the control signal hopping pattern,
wherein the information on the control signal, which comprise the reference signal, comprise information on the control signal hopping pattern or information on the resources of the frequency band usable by the communication system for transferring the control signal,
wherein the reference signal is provided with a plurality of partial reference data packets which comprises the information on the control signal, and
wherein the reference signal is transferred in correspondence with a reference signal hopping pattern, wherein the reference signal hopping pattern indicates a frequency hop and/or time hop-based occupancy of resources of the predetermined frequency range.

66. A non-transitory digital storage medium comprising instructions that, when executed by a computer, cause the computer to perform a method for operating a terminal point of a communication system, wherein a control signal is emitted in the communication system for coordinating the participants of the communication system, wherein the control signal is transferred distributed in correspondence with a frequency hop-based occupancy of resources of a frequency band, indicated by a control signal hopping pattern, wherein the terminal point comprises a receiver, wherein a receive bandwidth of the receiver is smaller by at least a factor 3 than a bandwidth of the frequency hop-based occupancy of resources of the frequency band, indicated by the control signal hopping pattern, the method comprising:
receiving a reference signal, wherein the reference signal comprises information on the control signal, and receiving the control signal based on the information on the control signal, wherein the information on the control signal, which comprise the reference signal, comprise information on the control signal hopping pattern or information on the resources of the frequency band usable by the communication system for transferring the control signal, wherein the reference signal is transferred in a predetermined frequency range of the frequency band, wherein the reference signal comprises a plurality of partial reference data packets which comprise the information on the control signal, wherein the reference signal is transferred in correspondence with a reference signal hopping pattern, wherein the reference signal hopping pattern indicates a frequency hop and/or time hop-based occupancy of resources of the predetermined frequency range, and wherein the reference signal is received in correspondence with the reference signal hopping pattern to acquire at least a part of the plurality of partial reference data packets sufficient for decoding.

67. A non-transitory digital storage medium comprising instructions that, when executed by a computer, cause the computer to perform a method for operating a base station of a communication system, the method comprising:

transmitting a control signal for coordinating the participants of the communication system, wherein the control signal is transferred distributed in correspondence with a frequency hop-based occupancy of resources of a frequency band, indicated by a control signal hopping pattern, and transmitting a reference signal in a predetermined frequency range of the frequency band, wherein the reference signal comprises information on the control signal, wherein the predetermined frequency range is smaller by at least a factor 3 than a frequency range of the frequency band in which the control signal is transferred distributed in correspondence with the control signal hopping pattern, wherein the information on the control signal, which comprise the reference signal, comprise information on the control signal hopping pattern or information on the resources of the frequency band usable by the communication system for transferring the control signal, wherein the reference signal is provided with a plurality of partial reference data packets which comprises the information on the control signal, and wherein the reference signal is transferred in correspondence with a reference signal hopping pattern, wherein the reference signal hopping pattern indicates a frequency hop and/or time hop-based occupancy of resources of the predetermined frequency range.

* * * * *